INVENTORS:
Biagio F. Ambrosio
David F. Rutland
Rein Turn
By Smyth, Roston & Pavitt
Attorneys.

DATA COMPOSER

Filed Dec. 30, 1960

24 Sheets-Sheet 2

INVENTORS:
Biagio F. Ambrosio
David F. Rutland
Rein Turn

By Smyth, Roston & Pavitt
Attorneys.

DATA COMPOSER

Filed Dec. 30, 1960 24 Sheets-Sheet 3

INVENTORS:
Biagio F. Ambrosio
David F. Rutland
Rein Turn
By Smyth, Roston & Pavitt
Attorneys.

Fig. 5 (Input Control)
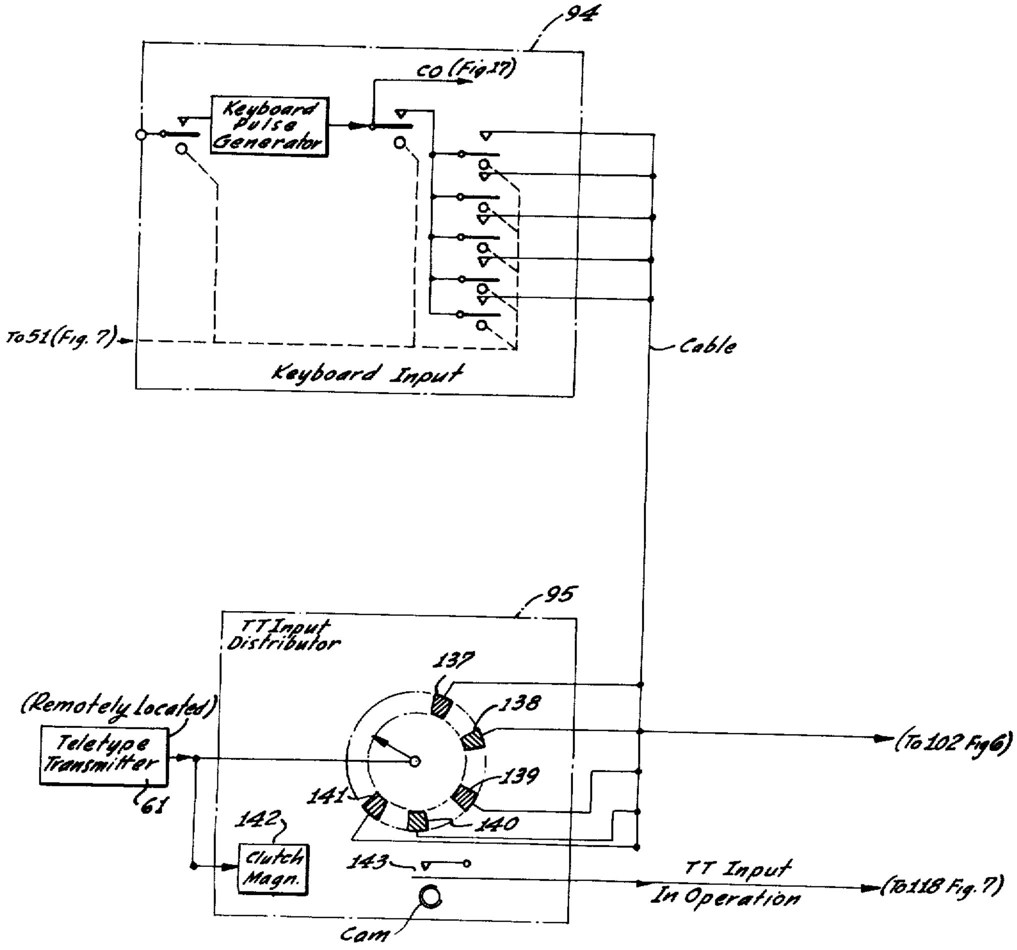
INVENTORS:
Biagio F. Ambrosio
David F. Rutland
Rein Turn
By Smyth, Roston & Pavitt
Attorneys.

INVENTORS:
Biagio F. Ambrosio
David F. Rutland
Rein Turn

By Smyth, Roston & Pavitt
Attorneys.

DATA COMPOSER

Filed Dec. 30, 1960 24 Sheets-Sheet 6

INVENTORS:
Biagio F. Ambrosio
David F. Rutland
Rein Turn
By Smyth, Roston & Pavitt
Attorneys.

DATA COMPOSER

Filed Dec. 30, 1960 24 Sheets-Sheet 7

INVENTORS:
Biagio F. Ambrosio
David F. Rutland
Rein Turn

By Smyth, Roston & Pavitt
Attorneys.

DATA COMPOSER

Filed Dec. 30, 1960 24 Sheets-Sheet 8

INVENTORS:
Biagio F. Ambrosio
David F. Rutland
Rein Turn

By Smyth, Roston & Pavitt
Attorneys.

DATA COMPOSER

Filed Dec. 30, 1960

Part of Control Logic 118

INVENTORS:
Biagio F. Ambrosio
David F. Rutland
Rein Turn

By Smyth, Roston & Pavitt
Attorneys

INVENTORS:
Biagio F. Ambrosio
David F. Rutland
Rein Turn
By Smyth, Roston & Pavitt
Attorneys Jan. 19, 1965 D. F. RUTLAND ETAL 3,166,636

DATA COMPOSER

Filed Dec. 30, 1960 24 Sheets-Sheet 11

INVENTORS:
Biagio F. Ambrosio
David F. Rutland
Rein Turn

By Smyth, Roston & Pavitt

Attorneys.

Jan. 19, 1965 D. F. RUTLAND ETAL 3,166,636

DATA COMPOSER

Filed Dec. 30, 1960 24 Sheets-Sheet 12

INVENTORS:
Biagio F. Ambrosio
David F. Rutland
Rein Turn

By Smyth, Roston & Pavitt
Attorneys

DATA COMPOSER

Filed Dec. 30, 1960

INVENTORS:
Biagio F. Ambrosio
David F. Rutland
Rein Turn
By Smyth, Roston & Pavitt
Attorneys.

Jan. 19, 1965 D. F. RUTLAND ETAL 3,166,636

DATA COMPOSER

Filed Dec. 30, 1960 24 Sheets-Sheet 14

INVENTORS:
Biagio F. Ambrosio
David F. Rutland
Rein Turn

By [signature]
Attorneys.

DATA COMPOSER

Filed Dec. 30, 1960 24 Sheets-Sheet 15

INVENTORS:
Biagio F. Ambrosio
David F. Rutland
Rein Turn

By Smyth, Roston & Pavitt
Attorneys.

Fig. 19 Function Decoder -124-
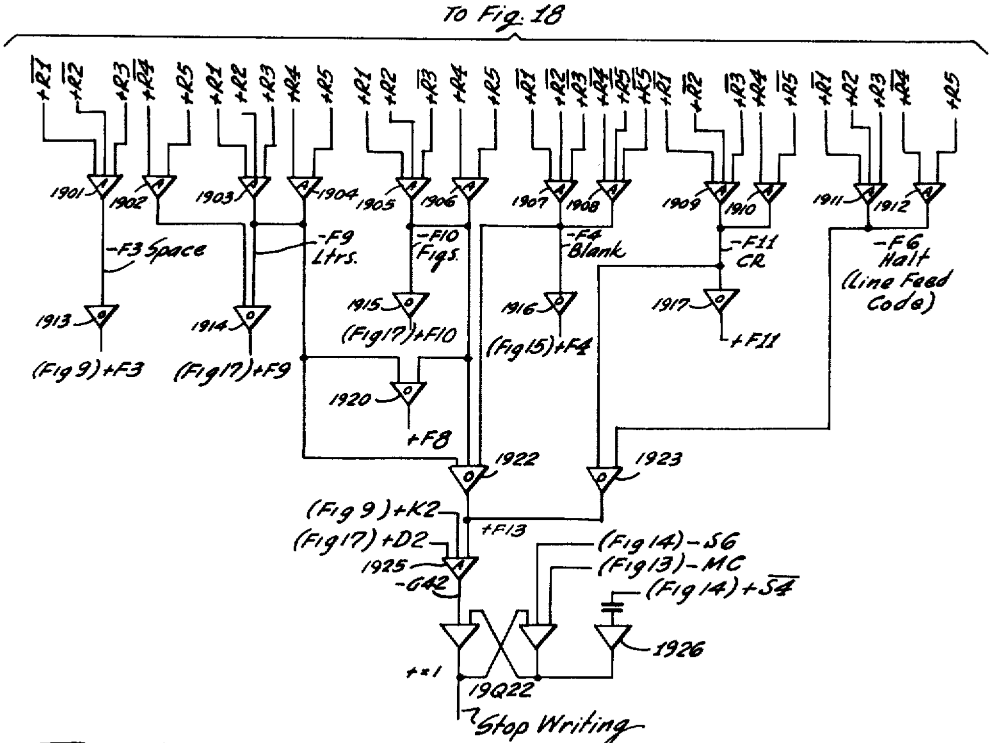
Fig. 20 Function Encoder -95-
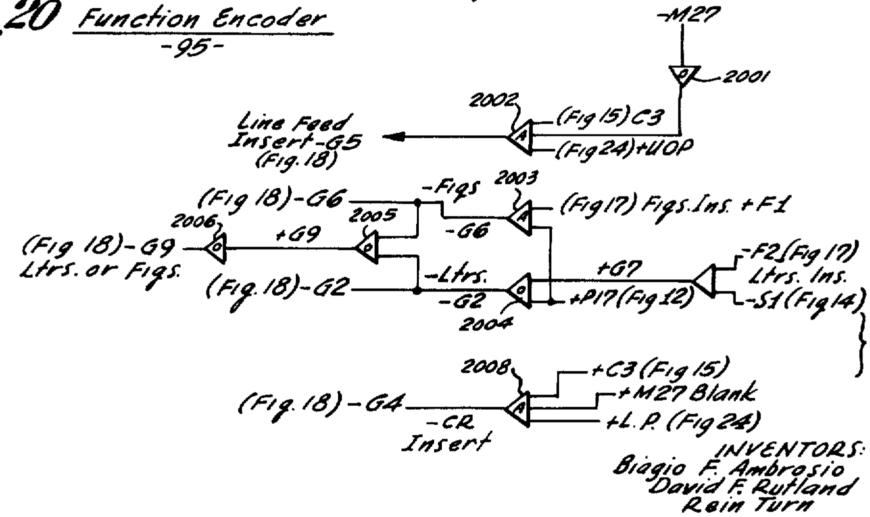
INVENTORS:
Biagio F. Ambrosio
David F. Rutland
Rein Turn
By Smyth, Roston & Pavitt
Attorneys.

DATA COMPOSER

INVENTORS:
Biagio F. Ambrosio
David F. Rutland
Rein Turn

By Smyth, Roston & Pavitt
Attorneys.

DATA COMPOSER

INVENTORS:
Biagio F. Ambrosio
David F. Rutland
Rein Turn

By Smyth, Roston & Pavitt
Attorneys.

INVENTORS:
Biagio F. Ambrosio
David F. Rutland
Rein Turn

By Smyth, Roston & Pavitt

Attorneys.

INVENTORS:
Biagio F. Ambrosio
David F. Rutland
Rein Turn
By Smyth, Roston & Pavitt
Attorneys.

DATA COMPOSER

Filed Dec. 30, 1960

INVENTORS:
Biagio F. Ambrosio
David F. Rutland
Rein Turn
By Smyth, Roston & Pavitt
Attorneys.

INVENTORS:
Biagio F. Ambrosio
David F. Rutland
Rein Turn
By Smyth, Roston & Pavitt
Attorneys.

INVENTORS:
Biagio F. Ambrosio
David F. Rutland
Rein Turn

By Smyth, Roston & Pavitt
Attorneys.

INVENTORS:
Biagio F. Ambrosio
David F. Rutland
Rein Turn

By Smyth, Roston & Pavitt
Attorneys.

United States Patent Office 3,166,636
Patented Jan. 19, 1965

3,166,636
DATA COMPOSER

David F. Rutland, Sherman Oaks, Biagio F. Ambrosio, Tarzana, and Rein Turn, Van Nuys, Calif., assignors to The Electrada Corporation, Beverly Hills, Calif., a corporation of Delaware Filed Dec. 30, 1960, Ser. No. 79,884
42 Claims. (Cl. 178—24)

This invention relates generally to transmission systems and more particularly to a combined transmitting and receiving apparatus having display and data composing facilities.

Some conventional transmission systems have means for displaying the message to be transmitted so that its accuracy can be checked before transmission. These systems are however relatively rigid from the standpoint of message composition. For example, in conventional Teletype systems a teletypewriter may be utilized for preparing a punched tape which functions as the input of a transmitting apparatus. The punched tape, which provides a visual indication of the message to be transmitted, is prepared by successively operating the character keys of the teletypewriter. The data composition is rigid because there is no composing of the type utilizing prerecorded message or portions of incoming messages. The speed and accuracy of the transmission accordingly depends mainly upon and is limited by the ability of the particular human operator.

In a specific illustrative embodiment of this invention a data composer apparatus is provided which may be utilized as a terminal apparatus in systems designated by the trademark "Teletype." The data composer apparatus is a high speed flexible instrument in which facilities are provided for displaying all incoming and outgoing messages and for facilitating the composition of new messages for transmission. The display means includes a cathode ray tube which provides images of two multi-line messages, illustratively one above the other. All incoming messages may be entered to the upper portion of the display, and all outgoing messages may first be entered to the lower portion of the display. Various novel features of this invention relate to means for transferring information between the two portions of the display and also between the display and prerecorded message storage means.

The main storage facility of the data composer apparatus may be a magnetic drum having illustratively two display tracks and two message or permanent store tracks. During the idle condition of the apparatus the information recorded in the display tracks is displayed at the display tube. One-half of each of the two display tracks is utilized for the upper display and one-half is utilized for the lower display. The information is transferred in two parallel paths to and from either the display or the message tracks to reduce the bit density in the tracks.

The internal coding of the apparatus may be the conventional five-bit Teletype with an addition of a sixth bit to indicate the shift status, FIGS or LTRS, for each character. Another feature of this invention relates to the provision of means for receiving conventional Teletype signals, and for recognizing functional code characters indicating a change in shift status. The recognizing means controls circuitry for entering the sixth bit to each character as it is received, and thereafter three bits of the received character are entered to each of the two drum display tracks. This feature permits the provision of a display without spaces between letters and figures which is otherwise required if conventional Teletype functional coding is utilized.

Still other features of this invention pertain to the provision of address marks for both the upper and lower display and the two permanent store messages. These marks may be recorded in a pair of mark tracks on the drum; one track for the two display tracks, and one track for the two message tracks. The two marks for the upper and lower displays are also displayed on the cathode ray tube to provide visual indications of the message address. A keyboard is provided having a number of command keys and a number of character keys, with some of the command keys being utilized for controlling the addresses of the two display marks. Each of the two display marks may readily be moved to any message address.

The marks are automatically advanced for incoming and outgoing messages and for transferring message or portions of the messages between the displays or between a display and a message track. Under control of the command keys any character, word, line or the entire message in the upper display may be copied into the lower display. A portion, or all, of an incoming message may accordingly be utilized in composing the outgoing message. Further, under control of the command keys, either of the messages in the permanent store tracks may be utilized for composing a message. New messages may also be entered to the message tracks from the display. In all of these transfer functions the address of the various marks is automatically changed.

Still other features of this invention relates to the provision of control logic circuits for determining the suboperations for each of the commands and for placing them in sequence in proper order. When any command is initiated the display is interrupted but it resumes when the command terminates. The display of the two address marks is not however interrupted. A command is also initiated when any of the character keys are operated. The character keys enter information to the lower display.

Information transfer is accomplished character by character. Each information transfer operation is separated into two main sequences of operation; one to provide the character to a six bit read register; and the other to provide the character in the read register to its proper destination. Character after character is processed in this manner until the particular selected transfer function is terminated. Erasure of characters is generally unnecessary because new characters are "typed over" or recorded over old characters.

During transmission, encoding means are provided for automatically inserting conventional Teletype functional codes wherever necessary even though they are not recorded as such on the drum. Further, during transmission or during any command the keyboard is disabled until the command is accomplished, and when a "blank" is read, it generates a carriage return operation to reduce the message transmission.

These various features provide for a highly flexible and high speed data composing apparatus. The composition is both flexible and fast because information can readily be copied from the upper display to the lower display, transferred thereto from the message tracks, or entered thereto under control of the character keys. All operations are also readily checked by the operator as all information passes through the display.

Various other advantages and features of this invention will become apparent upon consideration of the following description when read in conjunction with the drawing wherein.

Figure 4:
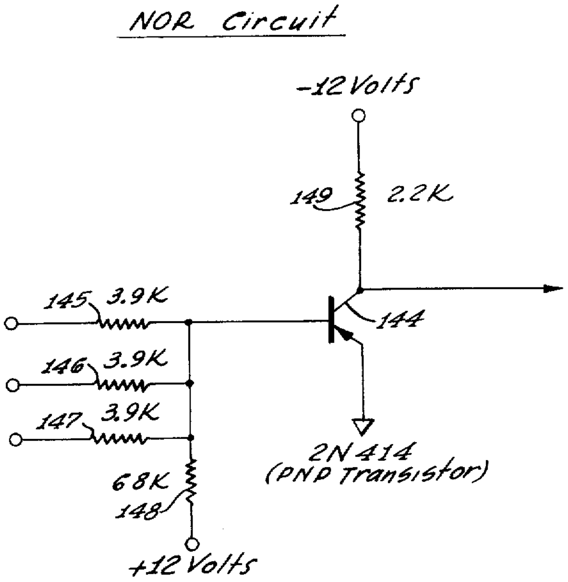
FIGURE 4 is a circuit representation of a NOR gate circuit which is utilized as one of the main functional units in the data composer apparatus.
Figure 4A:
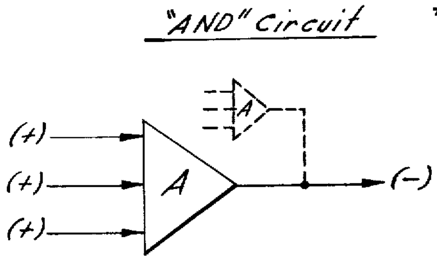
Figure 4C:
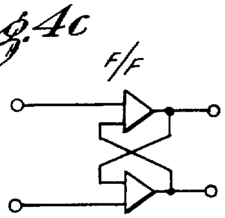
Figure 4B:
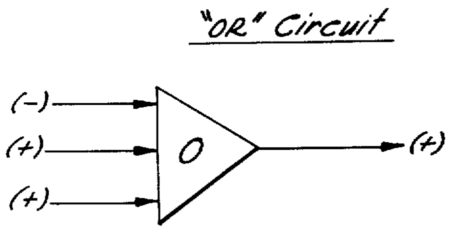
Figure 6:
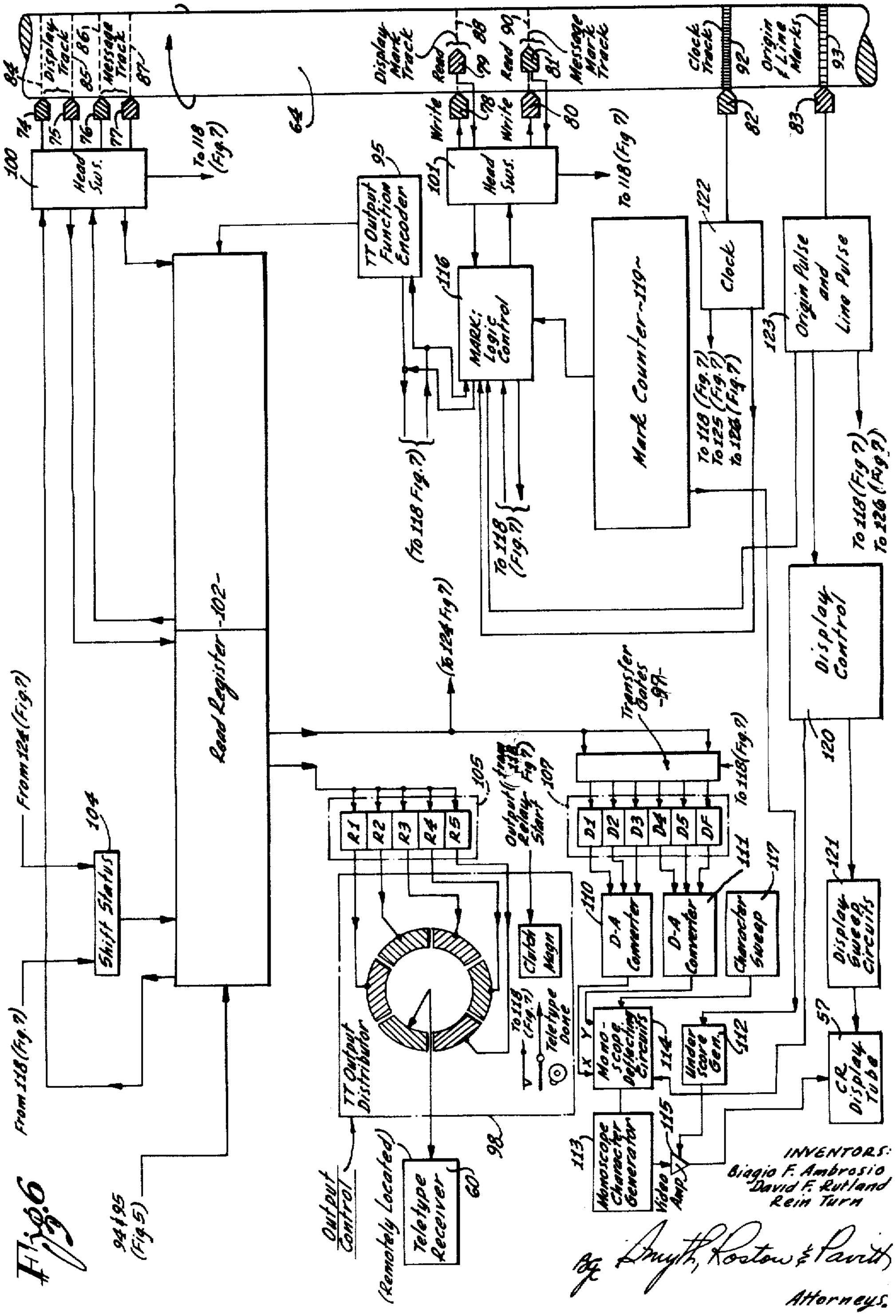
Figure 7:
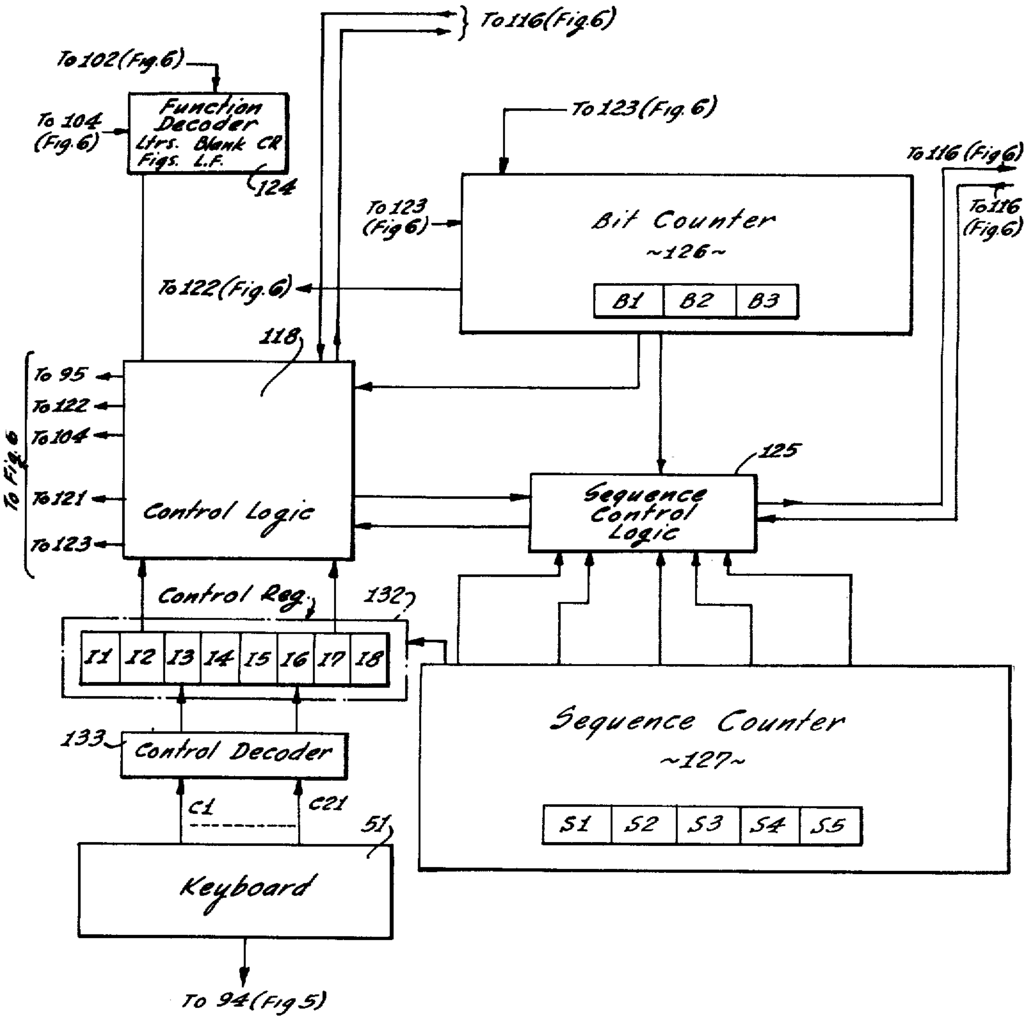

FIGURE 4*a* is a functional representation of the NOR gate circuit of FIGURE 4 illustrating its use as an AND gate;

FIGURE 4*b* is a functional representation of the NOR gate circuit of FIGURE 4 illustrating its use as an OR gate;

FIGURE 4*c* is a functional representation of a flip-flop circuit utilized throughout the data composer apparatus of this invention;

FIGURES 5, 6 and 7 together are a general functional or block diagram of the data composer apparatus, wherein:

FIGURE 5 illustrates the keyboard and input distributor;

FIGURE 6 illustrates the read register, magnetic drum and display circuits; and

FIGURE 7 illustrates the control logic, the sequence logic and the function decoder.

Figure 8:
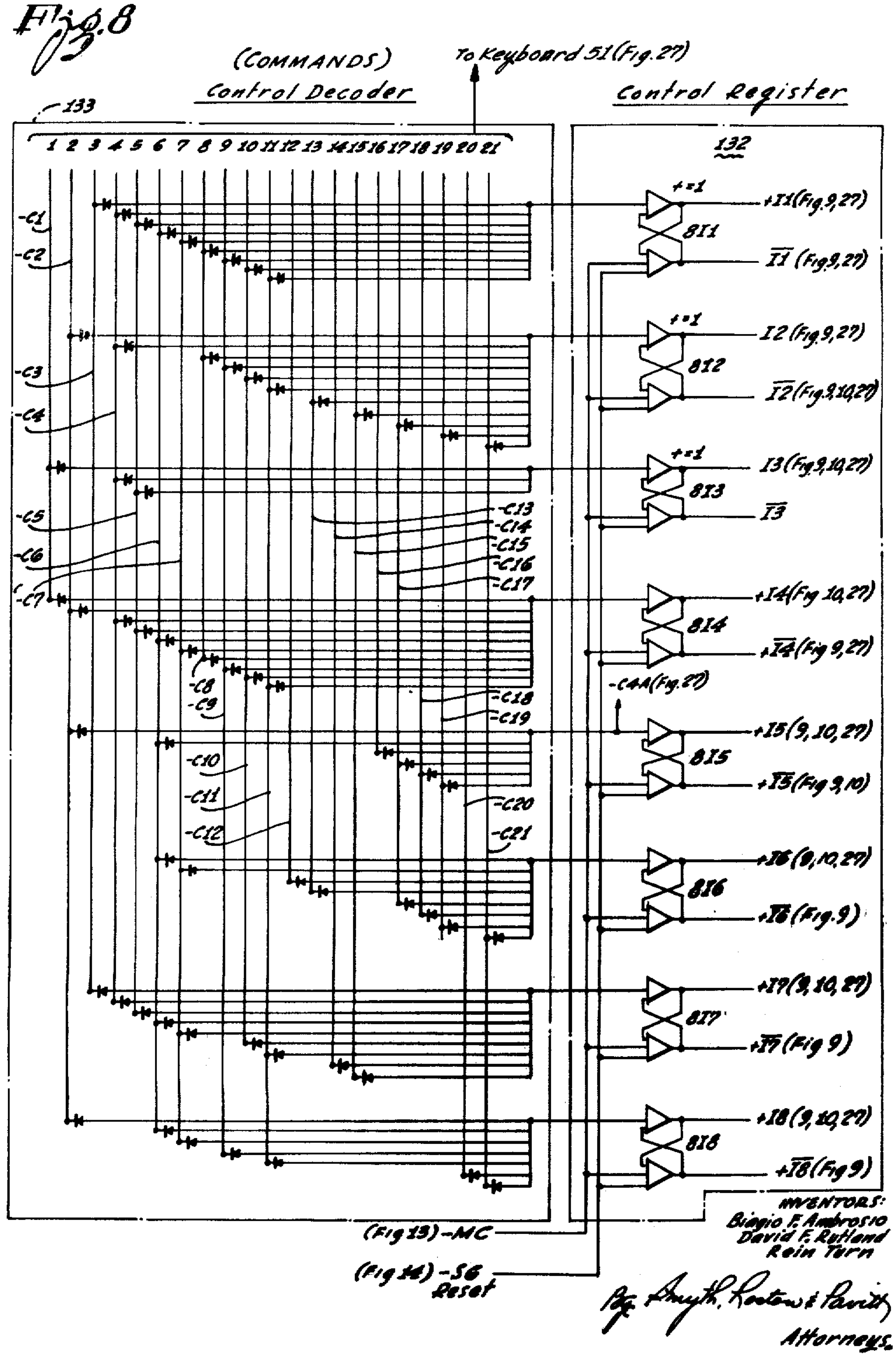
Figure 14:
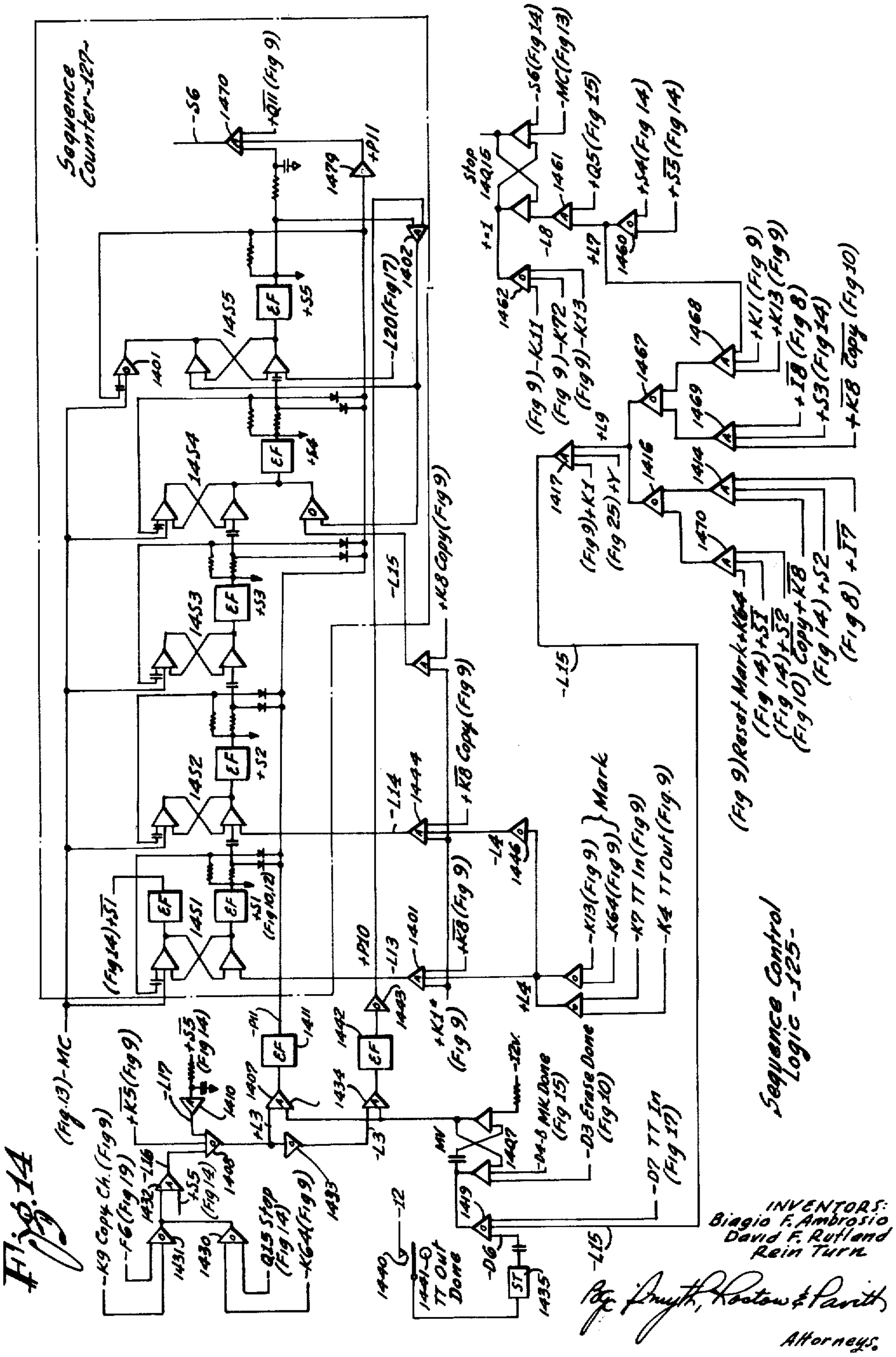
Figure 15:
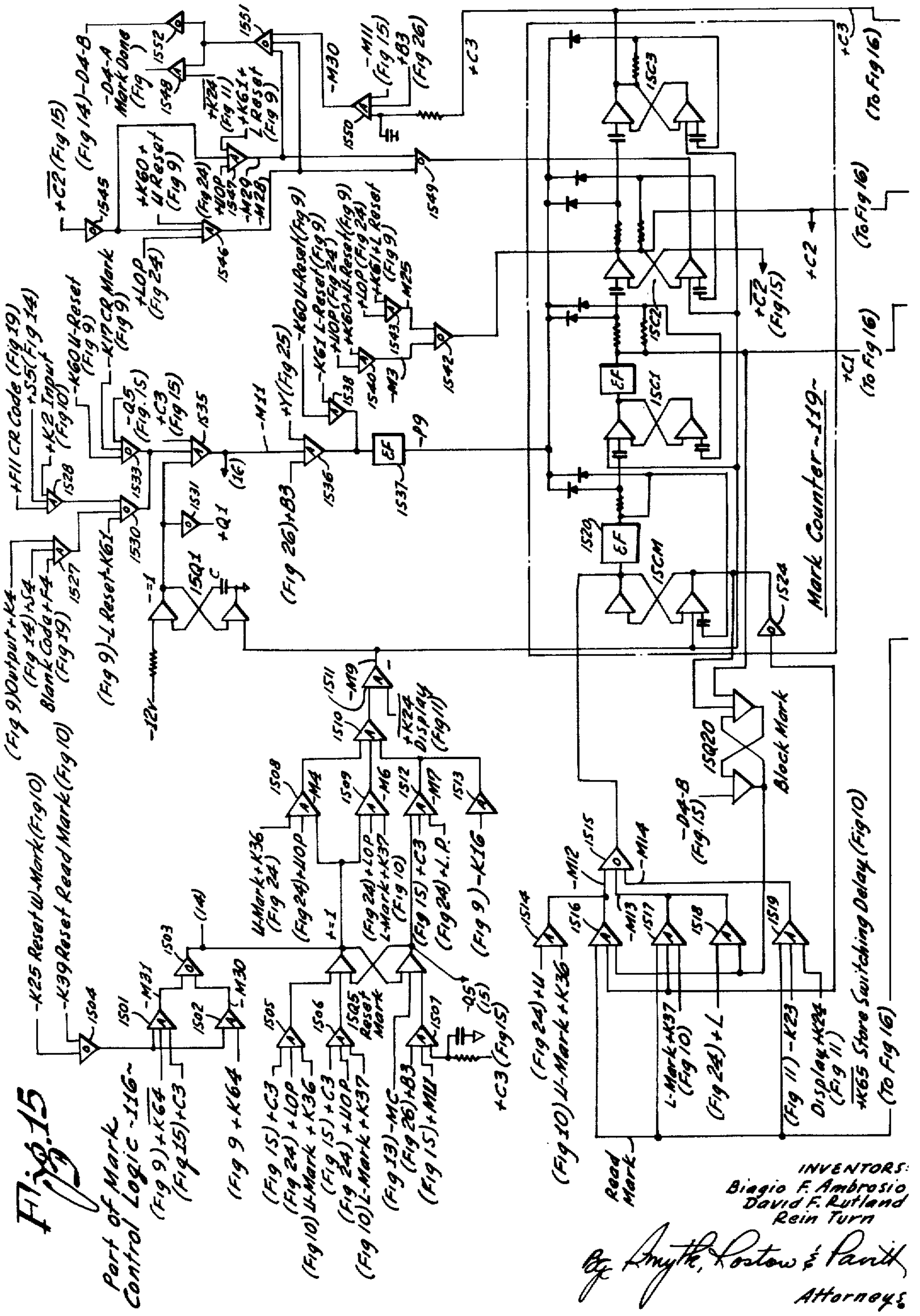
Figure 16:
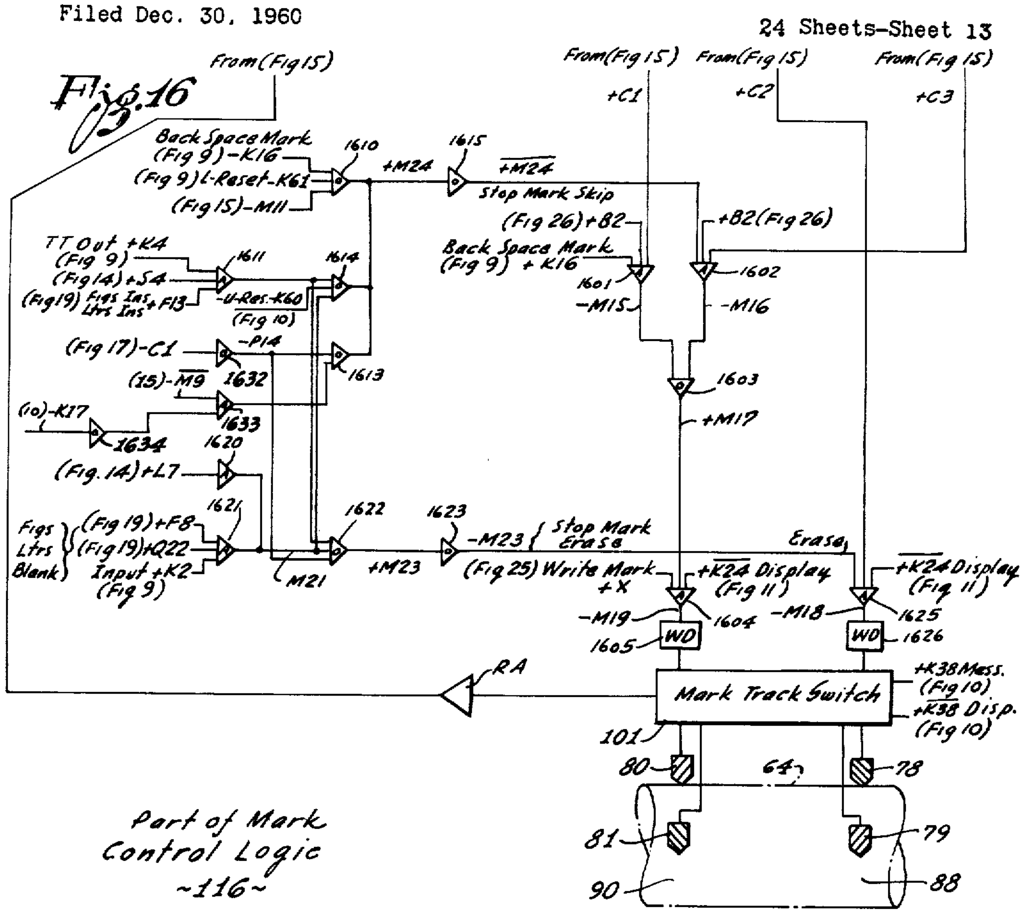
Figure 17:
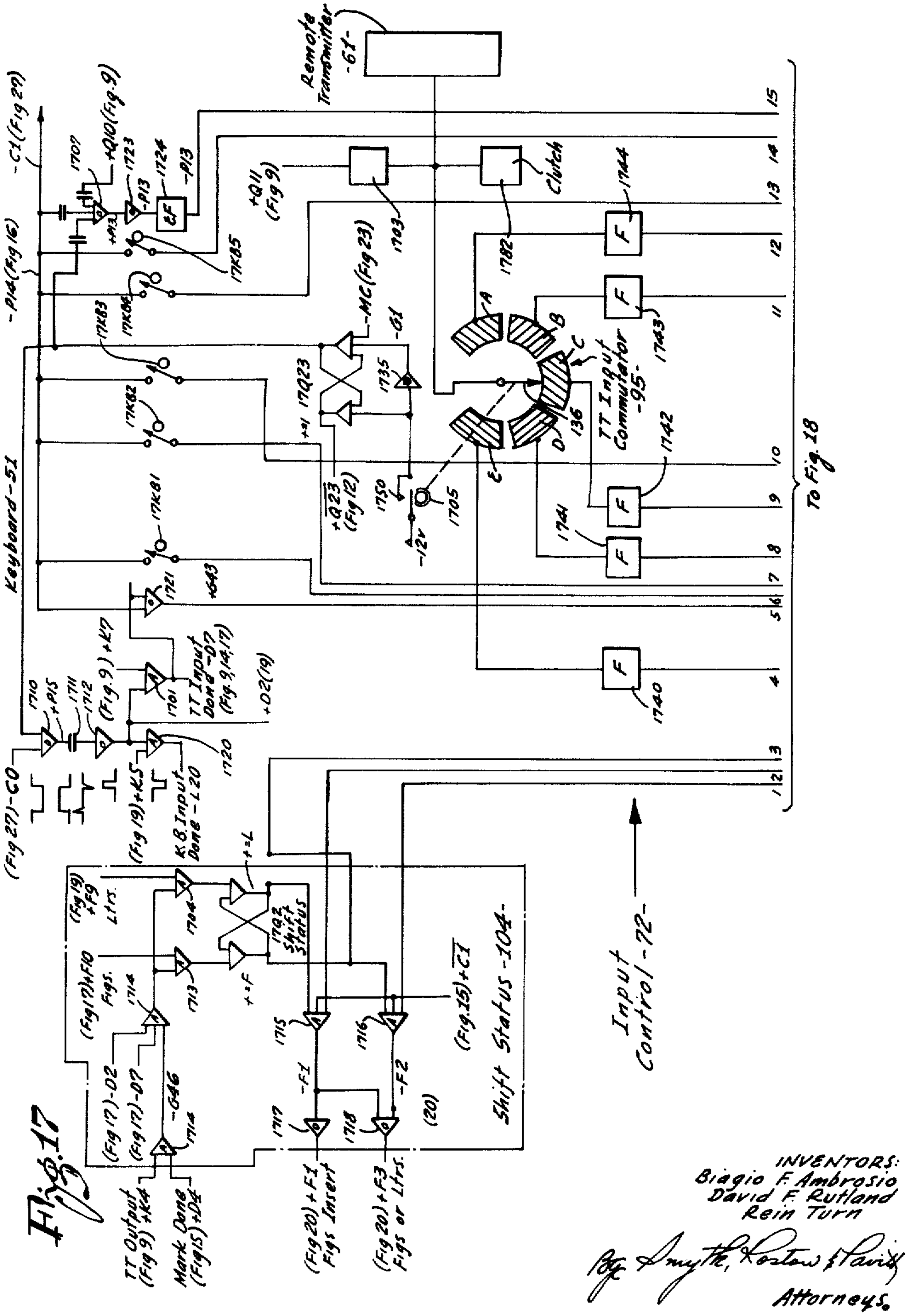
Figure 18:
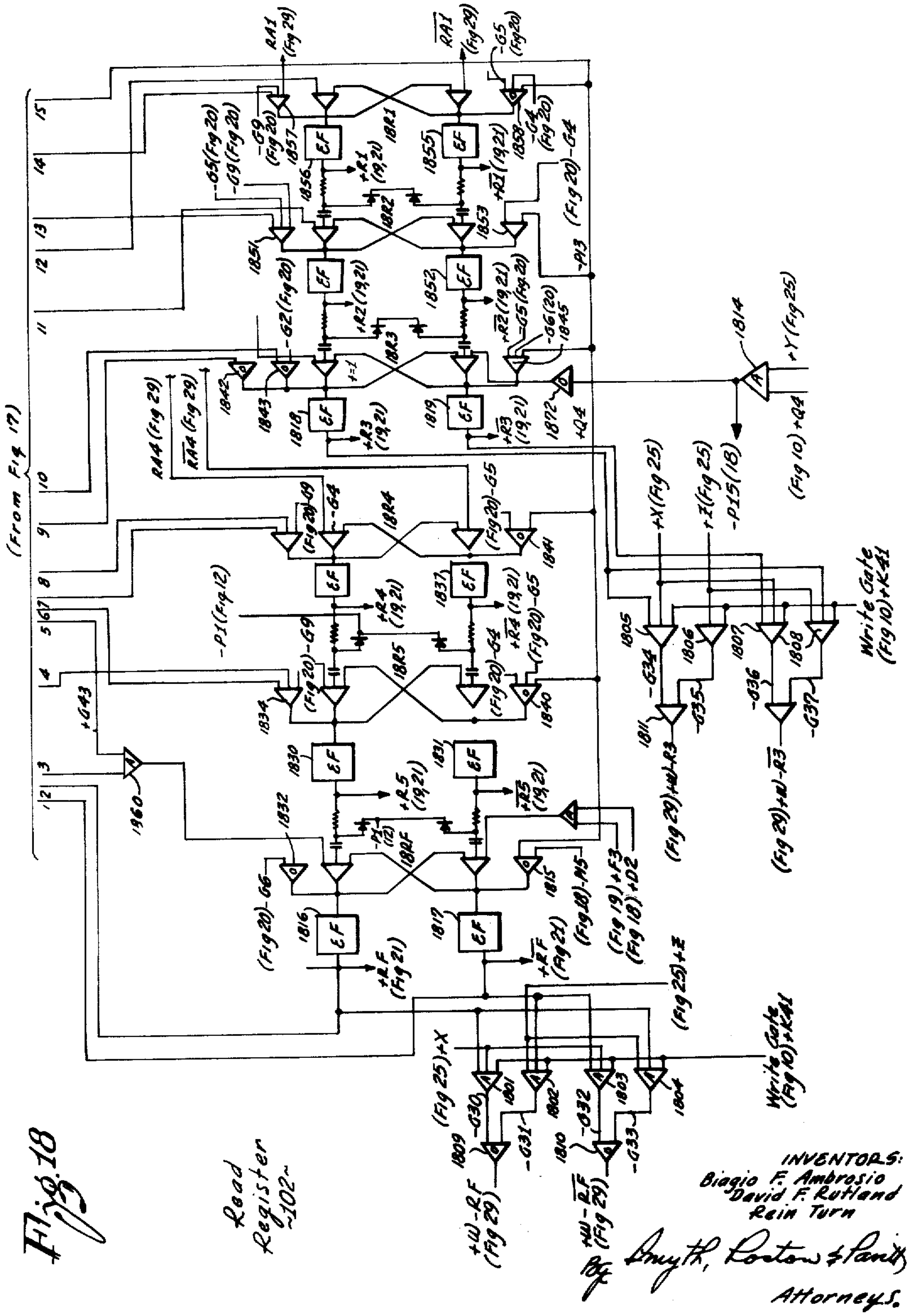
Figure 21:
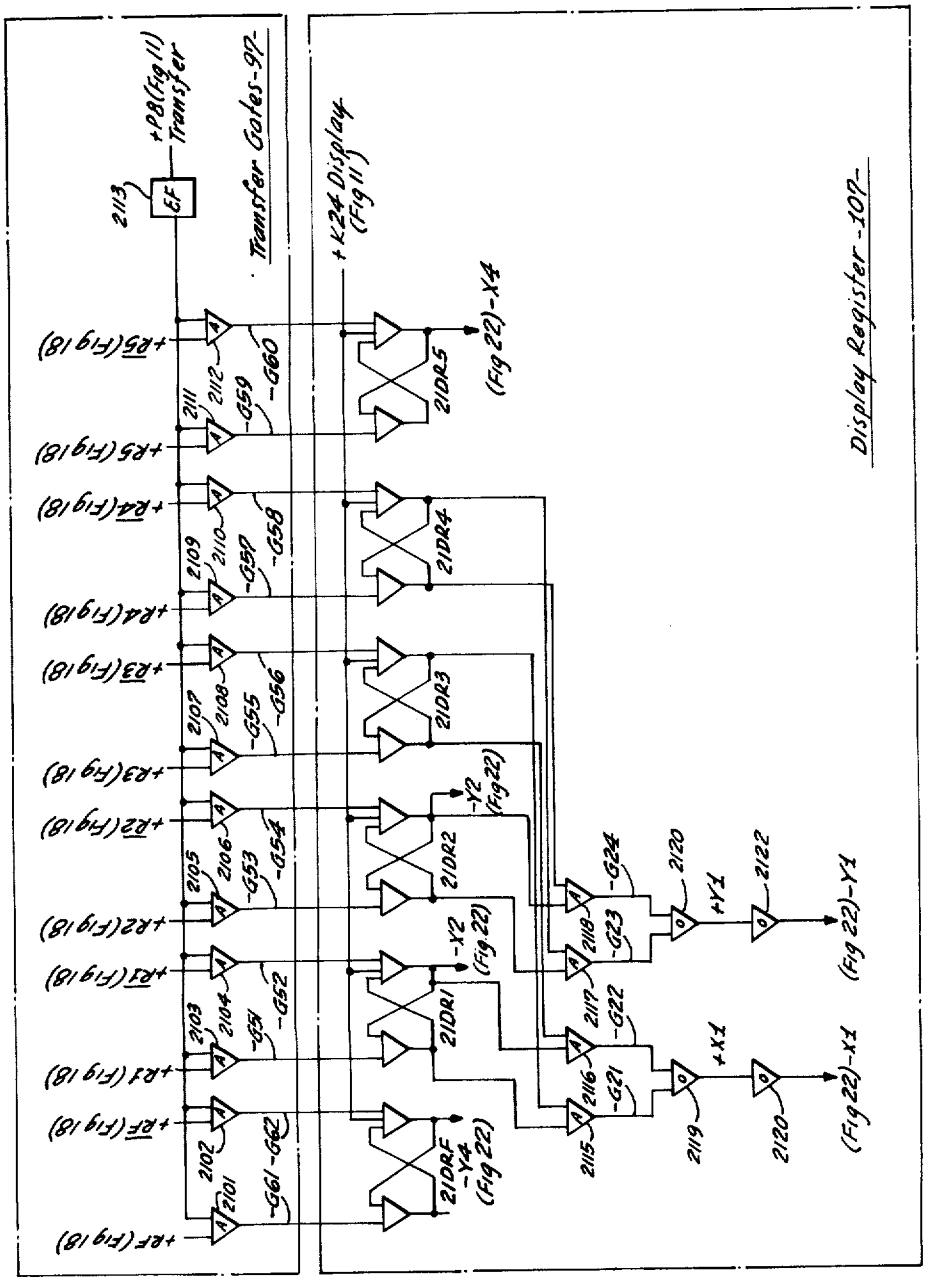
Figure 22:
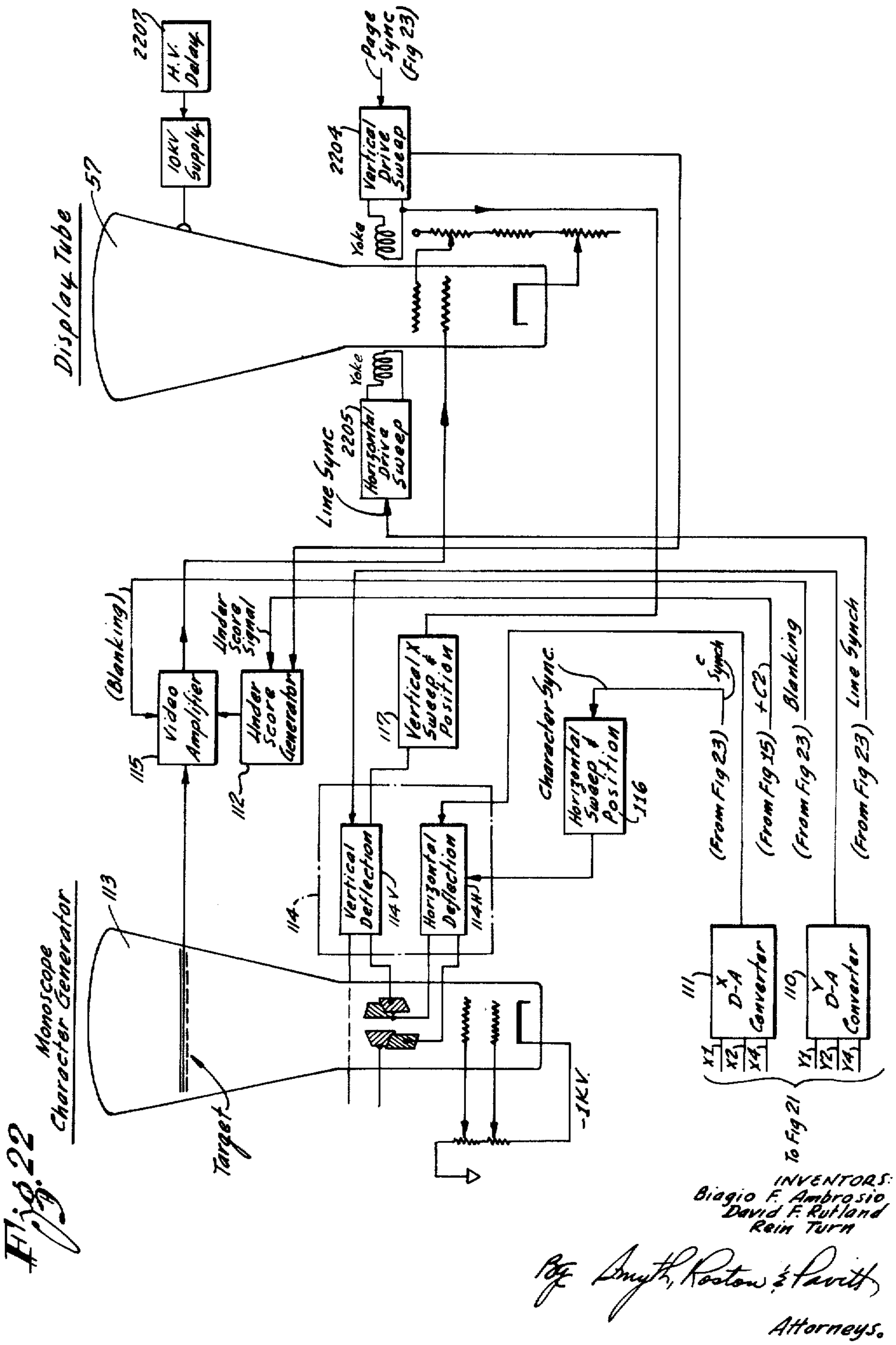
Figure 27:
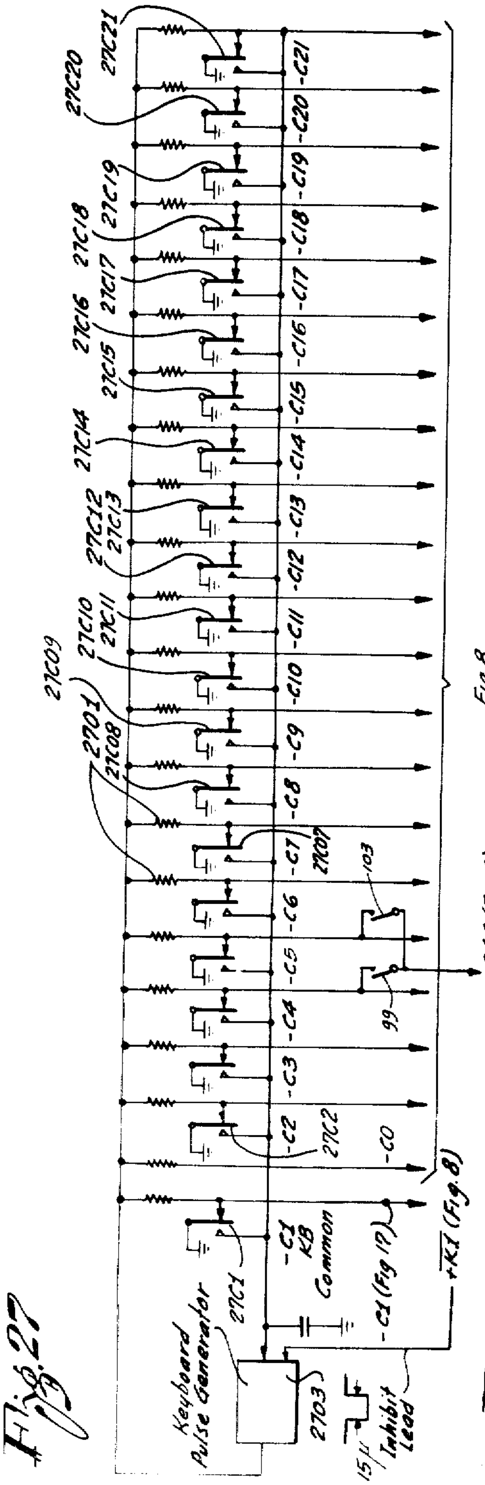
Figure 23:
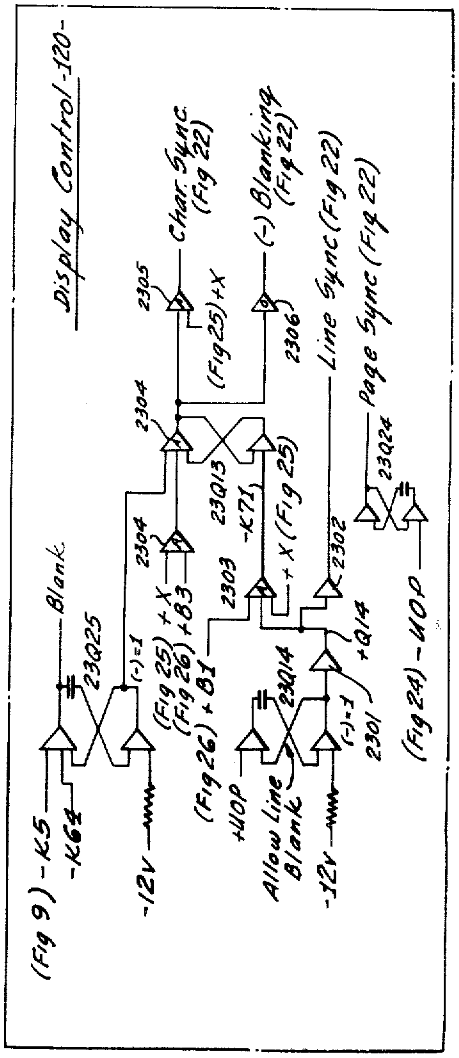
Figures 24, 25, 26:
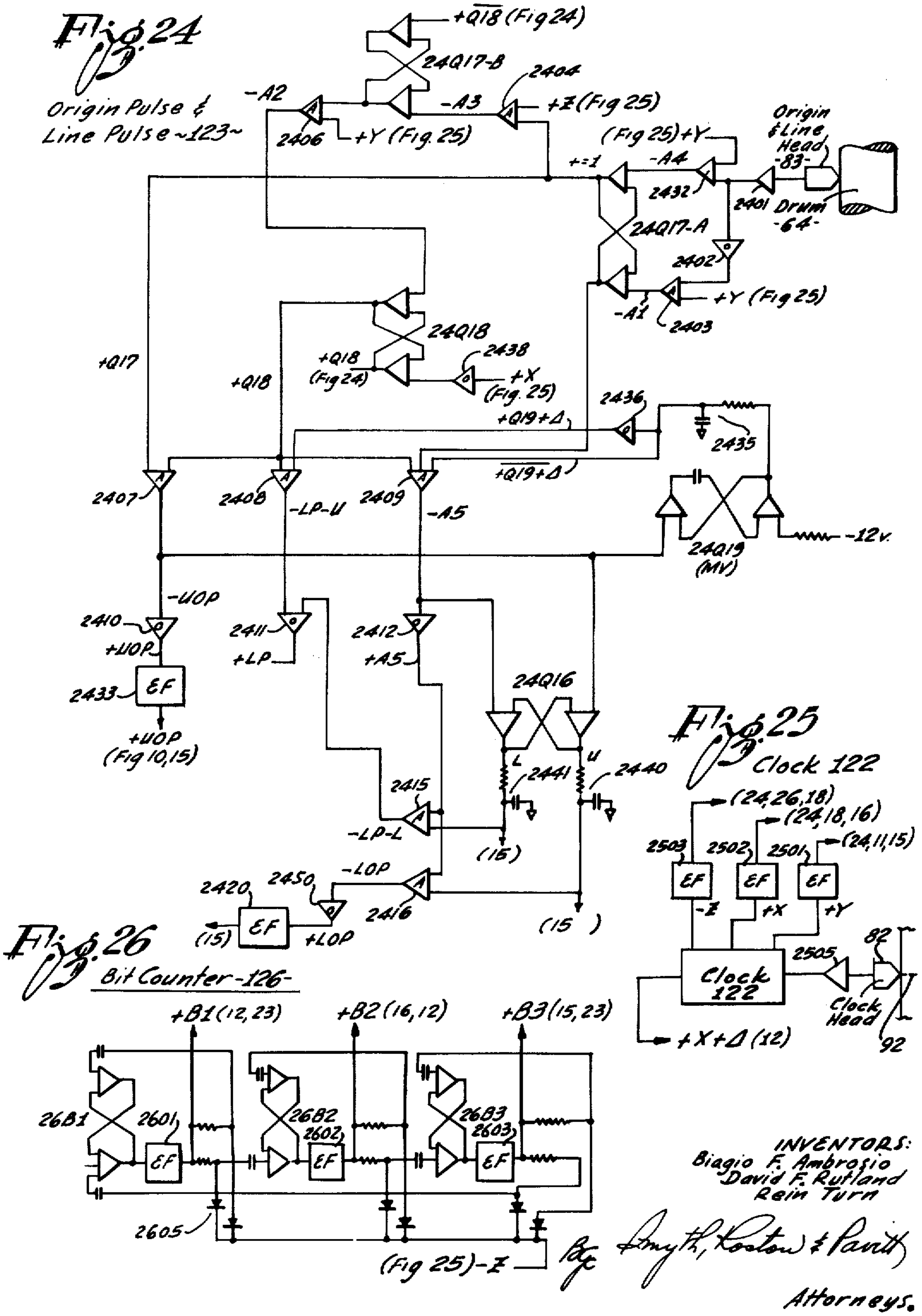
Figures 28, 29:
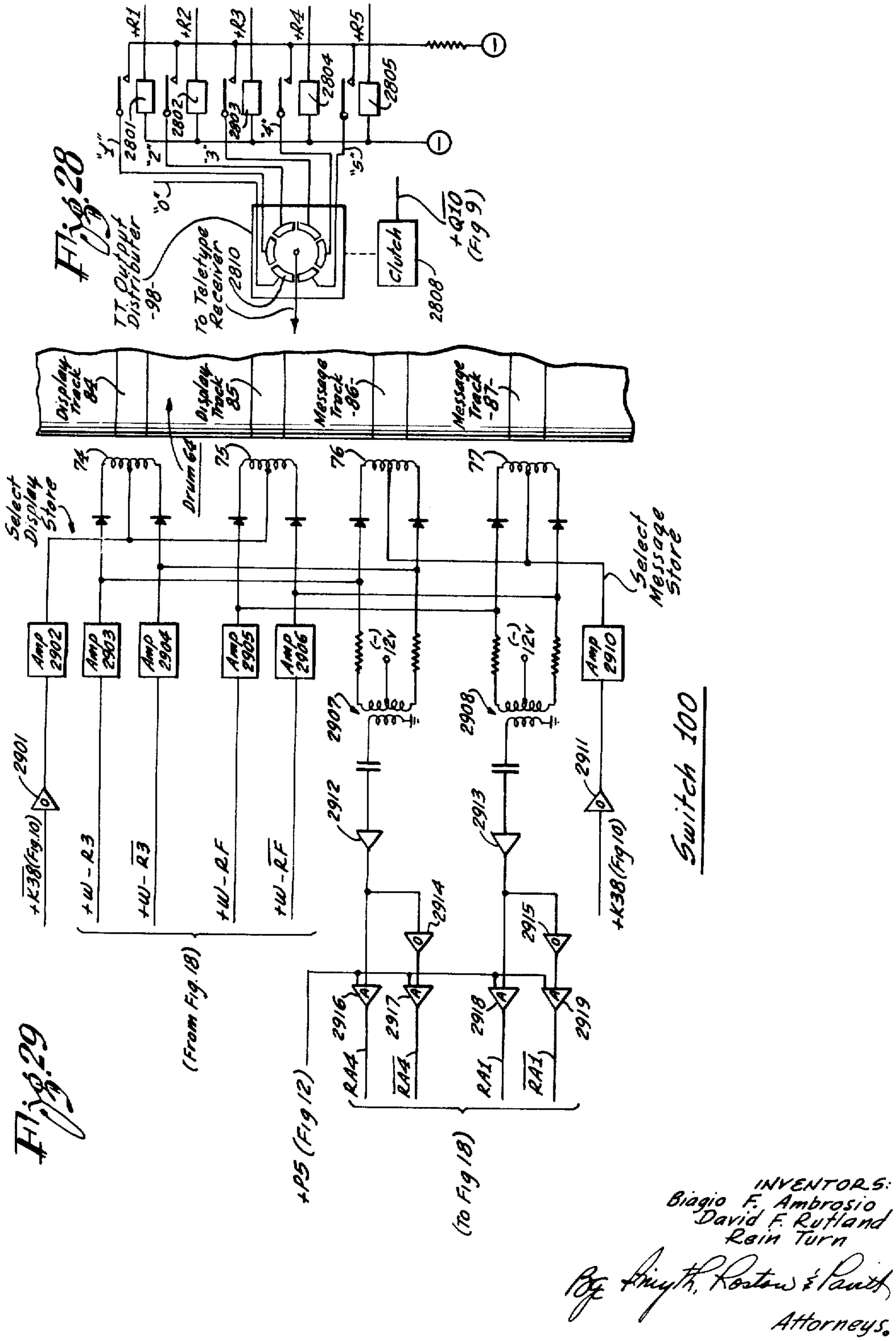

FIGURES 8 through 29 together are a detailed functional or detailed block diagram of the data composer apparatus, wherein:

FIGURE 8 illustrates the control decoder and the control register;

FIGURES 9 through 13 together illustrate the control logic;

FIGURE 14 illustrates the sequence counter and the sequence control logic;

FIGURE 15 illustrates the mark counter and a portion of the mark control logic;

FIGURE 16 illustrates the rest of the mark control logic;

FIGURE 17 illustrates the input control;

FIGURE 18 illustrates the read register;

FIGURE 19 illustrates the function decoder;

FIGURE 20 illustrates the function encoder;

FIGURE 21 illustrates the transfer gates and the display register;

FIGURE 22 illustrates the character generator, the display tube and the deflection circuits associated therewith;

FIGURE 23 illustrates the display control;

FIGURE 24 illustrates the origin pulse and line pulse generator;

FIGURE 25 illustrates the clock pulse generator;

FIGURE 26 illustrates the bit counter;

FIGURE 27 illustrates part of the keyboard;

FIGURE 28 illustrates the output distributor; and

Figures 30, 33:
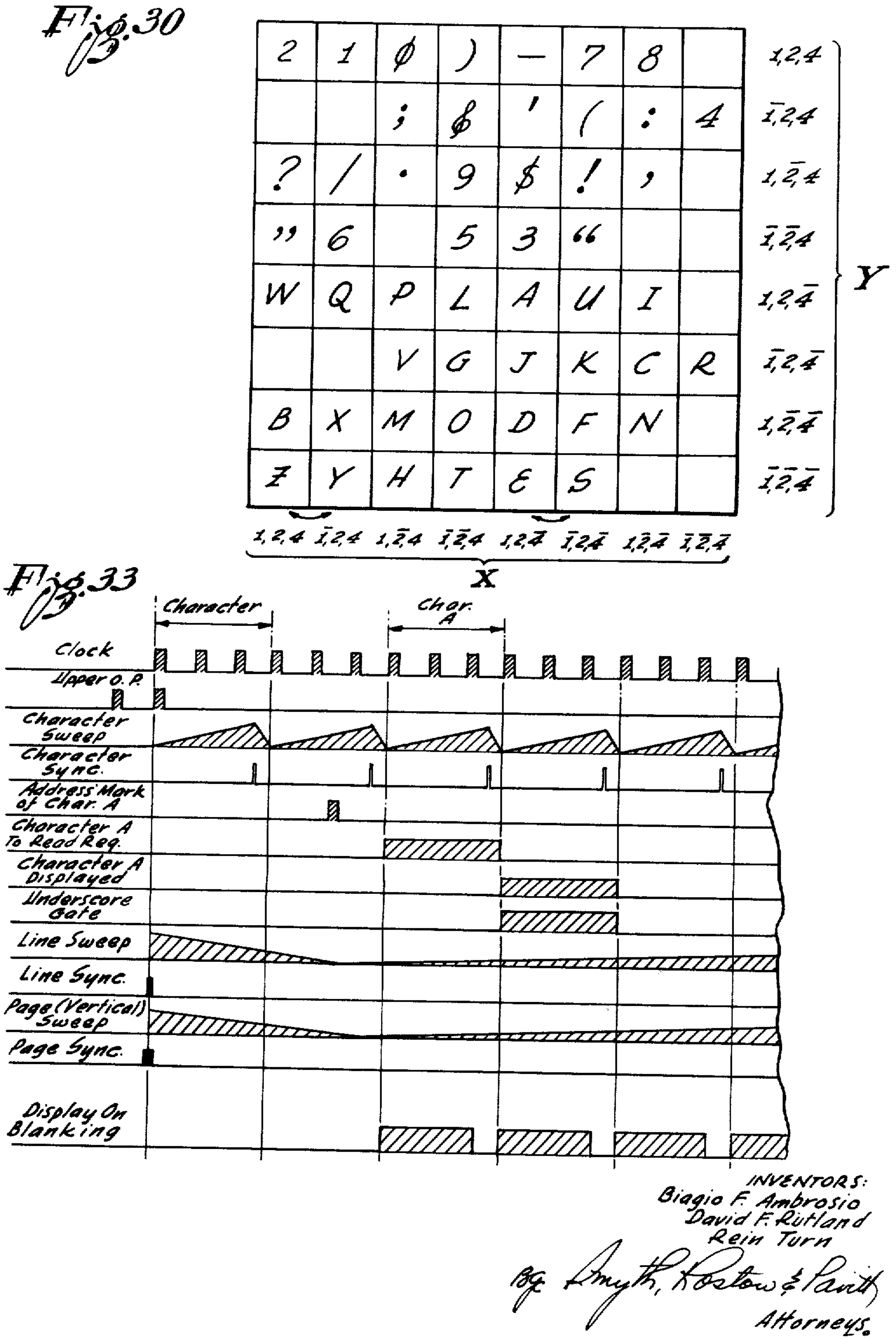
Figure 31:
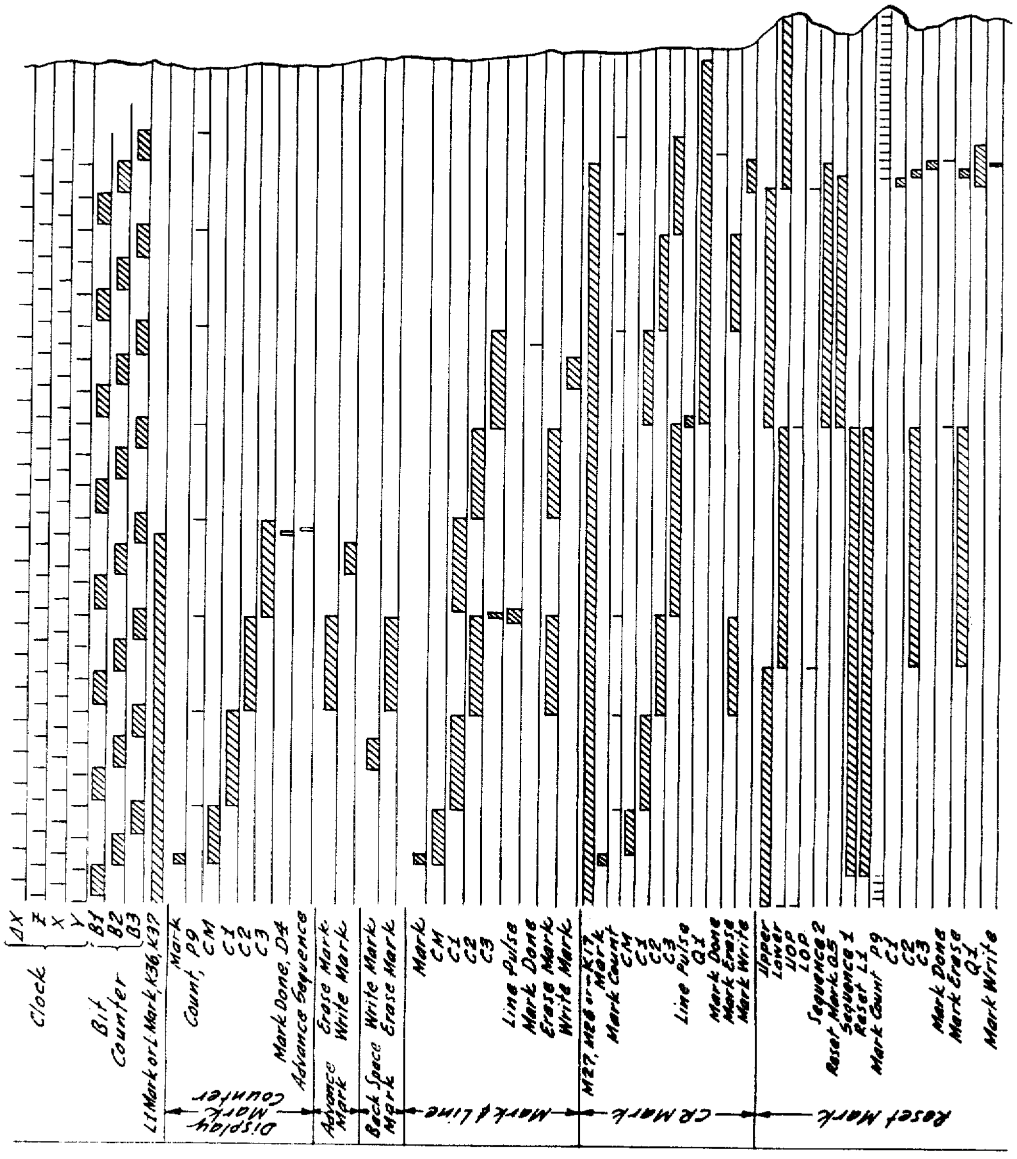
Figure 32:
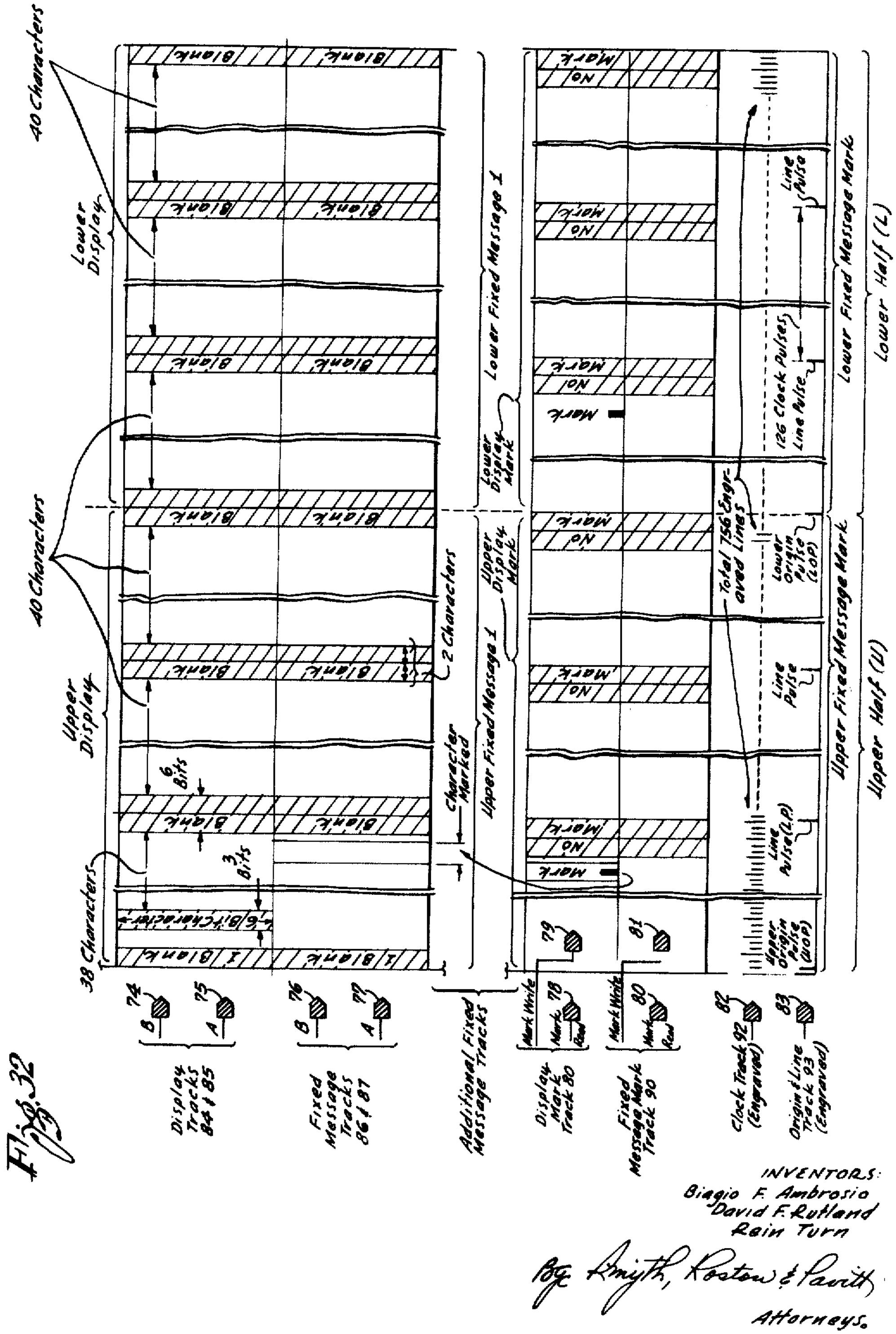

FIGURE 29 illustrates one of the drum switches;

FIGURE 30 illustrates the target of the character generator;

FIGURE 31 is a series of curves illustrating the operation of the data composer apparatus of this invention;

FIGURE 32 is an exploded layout of the magnetic drum 64; and

FIGURE 33 is a series of curves illustrating the operation of the display control circuits.

GENERAL DESCRIPTION

Figure 1:
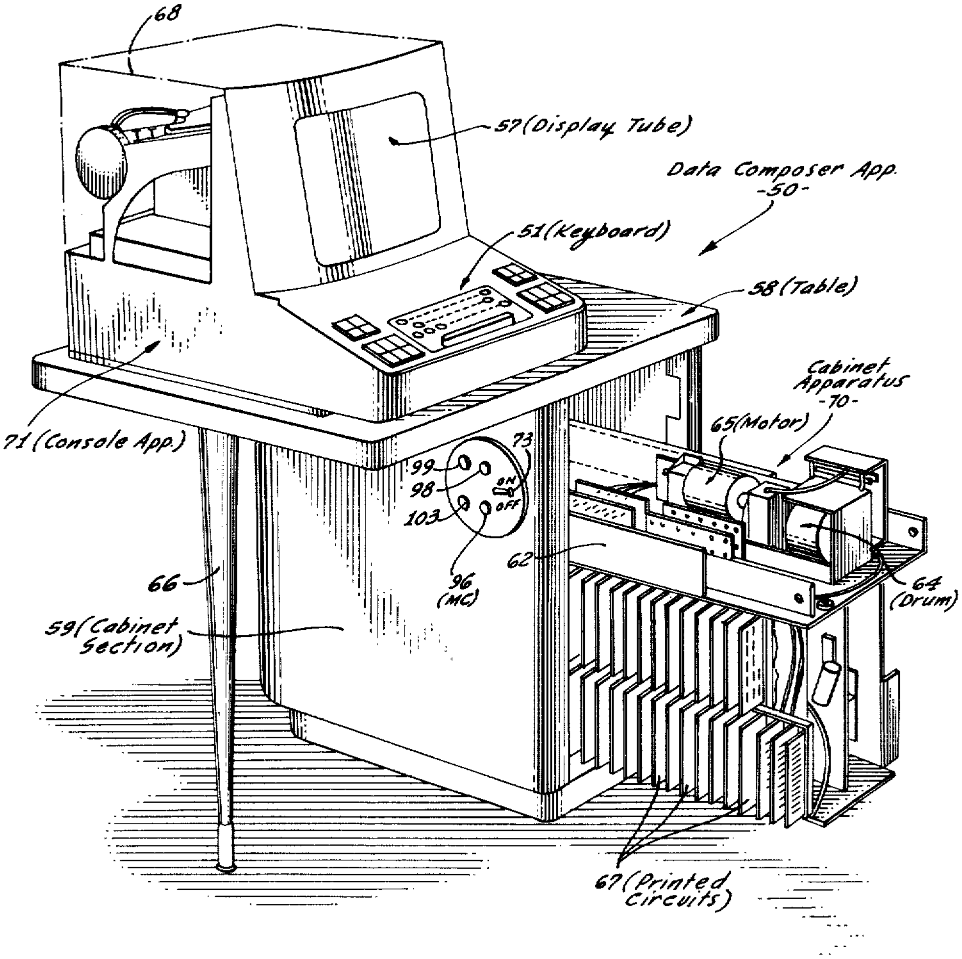
FIGURE 1 is a pictorial view of the data composer apparatus of this invention with a front panel removed and the cabinet apparatus pulled out, and with a top panel of the console apparatus show in phantom.

Referring first to FIGURE 1, the physical arrangement of the data composer apparatus 50 of this invention is illustrated. Before proceeding with a functional description of the apparatus 50, the physical arrangement thereof is first briefly described.

The data composer apparatus 50 includes a console apparatus 71 which is supported on the table or cabinet 58. The table 58 includes a cabinet section 59 which encloses the cabinet apparatus 70. In FIGURE 1, the apparatus 70 is shown pulled out and supported by slider brackets 62 to permit ready access to the apparatus 70. The cabinet apparatus 70 includes a number of printed circuit boards 67 and a magnetic drum 64 which is driven by a motor 65. As hereinafter described, the magnetic drum 64 functions as the main memory component of the data composer apparatus 50.

When the cabinet apparatus 70 is moved into the cabinet 59, a front panel, not shown, is fitted in front of the apparatus 70 to complete the enclosure by the cabinet section 59. The console apparatus 71 includes a keyboard 51 for entering information to the data composer apparatus 50, and a display tube 57 which may be a cathode-ray tube. A top section 68, shown in phantom, is fitted over the back of the console apparatus 71 to complete its enclosure. The section 68 may be removable to permit ready access to the apparatus 71. An operator may be seated in front of the keyboard 51 of the console apparatus 71 for operating the keyboard 51 and also a number of buttons or switches 73, 96, 98, 99 and 103 on the side of the cabinet section 59. The switch 73 is an on-off switch which is operated to energize the various components and electronic circuits in the data composer apparatus 50. The buttons 96, 98, 99 and 103, which are hereinafter described, are utilized to switch information paths in the apparatus 50 or to clear or reset the apparatus 50.

Figure 3:
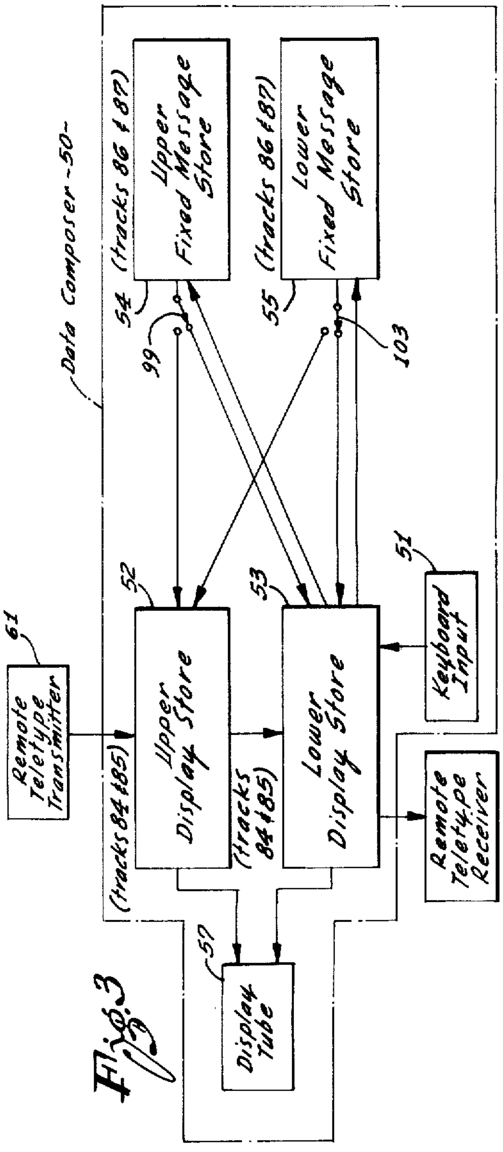
FIGURE 3 is a functional representation of some of the data composer apparatus of this invention illustrating the flow of information between the different storage facilities of the apparatus.

The data composer apparatus 50 is a high speed data transmission terminal for transmitting and receiving messages in the conventional Teletype code. All incoming and outgoing messages are displayed at the display tube 57. Each message may have 120 characters, either letters or digits, and the message can be received from punched paper tape readers or a remote Teletype transmitter of conventional type. A Teletype transmitter 61 in FIGURE 3 is illustrative of such equipment. Illustratively, four such 120 character messages can be stored on the magnetic drum 64 at any time. Two of these four messages are displayed continuously on the face of the display tube 57, one above the other. The operator may compose and transmit messages, receive messages, correct and expand received messages, or send messages composed from pre-recorded messages with each operation being displayed at the tube 57. Utilizing the keyboard 51, messages can be composed, or previously received messages altered, or stored or pre-recorded messages altered. All of these functions are performed under control of the keyboard 51 and the buttons on the side of the cabinet section 59 in FIGURE 1.

The two messages displayed on the display tube 57 are displayed one above another in two areas referred to as the upper and lower stores or displays, respectively. In general, the messages which are to be transmitted are displayed in the lower store, and the incoming or received messages are displayed in the upper store. The character keys 130 of the keyboard 51 illustrated in FIGURE 2 are connected to control the lower display only and thus operates on the data displayed in the lower display.

FIGURE 3 illustrates the various information transfer possibilities. The received messages from the remotely located transmitter 61 are stored in upper display store 52 and they may be transferred under control of the keyboard 51 to the lower display store 53. The two fixed messages identified as the upper fixed message store 54 and the lower fixed message store 55 may be transferred to the lower display store 53. By operating the switches 99 and 103 the messages in the stores 54 and 55 may be transferred to the upper display store 52. As indicated above, the switches 99 and 103 in FIGURE 1 are on the side of the cabinet section 59. These stores 52 through 55 relate to tracks on the magnetic drum 64 as is further hereinafter described.

In its idle state, that is when no keyboard commands have been initiated, the data composer apparatus 50 continuously displays information recorded in the upper display and lower display stores 52 and 53. The initiation of a keyboard command by operating any one of the character keys 130 or command keys 2C2 through 2C21 in FIGURES 1 and 2 interrupts the character display.

Figure 2:
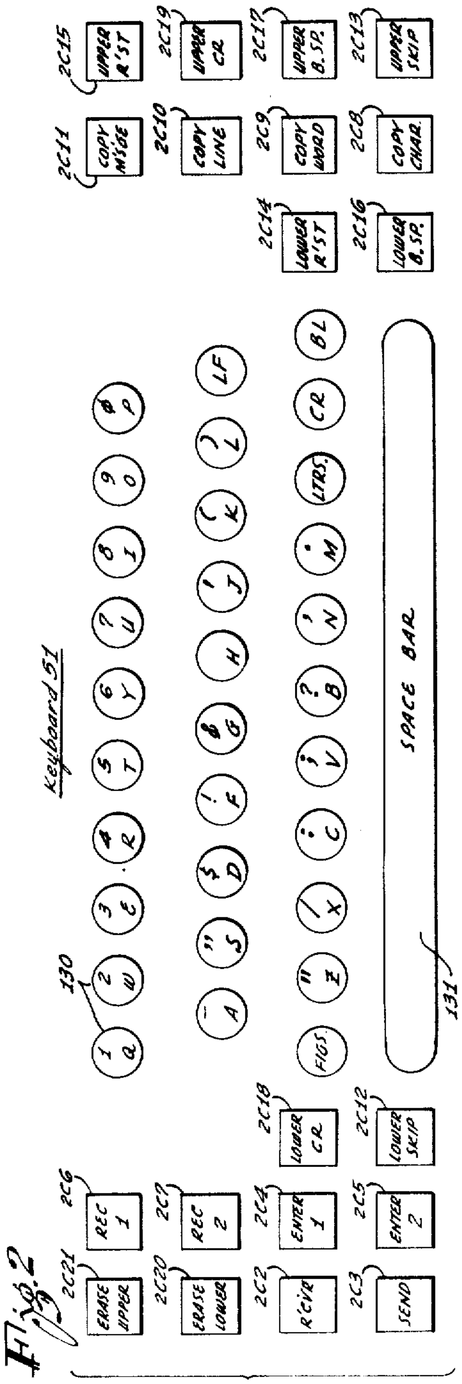
FIGURE 2 is a plan view of the keyboard which is part of the console apparatus of the data composer apparatus of this invention.

As indicated in FIGURE 2, the command keys 2C2 through 2C21 are utilized to initiate particular functions in the data composer apparatus 50. These functions are as follows:

| Key | Function |
|---|---|
| 2C2 | Receive Teletype signals. |
| 2C3 | Transmit Teletype signals. |
| 2C4 | Enter store 54 to lower display. |
| 2C5 | Enter store 55 to lower display. |
| 2C6 | Record lower display in store 54. |
| 2C7 | Record lower display in store 55. |
| 2C8 | Copy a character. |
| 2C9 | Copy a word. |
| 2C10 | Copy a line. |
| 2C11 | Copy a message. |
| 2C12 | Skip lower mark. |
| 2C13 | Skip upper mark. |
| 2C14 | Reset lower mark. |
| 2C15 | Reset upper mark. |
| 2C16 | Backspace lower mark. |
| 2C17 | Backspace upper mark. |
| 2C18 | Carriage return lower mark. |
| 2C19 | Carriage return upper mark. |
| 2C20 | Erase lower display. |
| 2C21 | Erase upper display. |

The command keys 2C8–2C11 are for copying portions or all of the upper display to the lower display. To record in either display it is not necessary to first erase, because the new character, word, line or message is effectively "typed-over" or recorded over the old. The command keys 2C12 through 2C19 are for changing the position of address marks for the two display stores 52 and 53. These two marks are displayed and illustratively may be underscore dashes in two character spaces respectively in the upper and lower portions of the face of the display tube 57. The various functions initiated by depressing the various command keys 2C2–2C21 are further hereinafter described both in the general description section of the specification and in the detail description section of the specification which follows the general description section.

All these different controls, the keys 2C2–2C21, the 31 character keys 130 and the switches 96, 98, 99 and 103 provide for a highly flexible apparatus which operates efficiently at high speeds.

Reference is now made to FIGURES 5, 6 and 7, which together are a functional or block representation of the data composer apparatus 50. The magnetic drum 64 in FIGURE 6 and mentioned above in reference to FIGURE 1 is utilized for recording the two display messages and the two fixed messages. In particular two tracks 84 and 85 are display tracks, and two tracks 86 and 87 are fixed message tracks. In addition to these four tracks, the drum 64 also includes two tracks 88 and 90 for storing address marks for the other four tracks 84 through 87. The drum 64 also includes a clock track 92 for generating timing pulses, and a mark track 93 for generating pulses indicating the beginning of the upper and lower stores and the beginning of each line on the display 57. In all therefore, a total of eight tracks are provided on the magnetic drum 64. As will become evident this number of tracks is merely illustrative, for example, more message tracks may be provided for storing additional messages.

One-half of the circumferential length of the magnetic drum 64 in each of the eight tracks 84 through 87, 88, 90, 92 and 93 is utilized for the upper store and the other half of the circumferential length is utilized for the lower store. The display of the characters stored on the magnetic drum 64 takes place one character at a time serially with the character stored on the drum 64 being displayed once every revolution of the drum 64. The display rate and the speed of revolution of the drum 64 is respectively 60 times per second and 60 revolutions per second so as to be fast enough to avoid flicker at the display tube 57 also shown in FIGURE 6.

In FIGURE 6, eight magnetic heads are shown associated respectively with the eight tracks 84–88, 90, 92 and 93 on the drum 64. The heads 74 through 77 are associated respectively with the tracks 84 through 87, two heads 78 and 79 are associated with track 88, two heads 80 and 81 are associated with track 90 and the two heads 82 and 83 are associated respectively with the two tracks 92 and 93. The internal code of the apparatus 50 is the conventional five bit teletypewriter code with the addition of a sixth bit to indicate the shift status. The following table illustrates the internal coding:

TABLE C.—TELETYPE CODES

| Character | F | 5 | 4 | 3 | 2 | 1 | Character | F | 5 | 4 | 3 | 2 | 1 |
|---|---|---|---|---|---|---|---|---|---|---|---|---|---|
| A | 0 | 0 | 0 | 0 | 1 | 1 | - | 1 | 0 | 0 | 0 | 1 | 1 |
| B | 0 | 1 | 1 | 0 | 0 | 1 | ? | 1 | 1 | 1 | 0 | 0 | 1 |
| C | 0 | 0 | 1 | 1 | 1 | 0 | : | 1 | 0 | 1 | 1 | 1 | 0 |
| D | 0 | 0 | 1 | 0 | 0 | 1 | $ | 1 | 0 | 1 | 0 | 0 | 1 |
| E | 0 | 0 | 0 | 0 | 0 | 1 | 3 | 1 | 0 | 0 | 0 | 0 | 1 |
| F | 0 | 0 | 1 | 1 | 0 | 1 | ! | 1 | 0 | 1 | 1 | 0 | 1 |
| G | 0 | 1 | 1 | 0 | 1 | 0 | & | 1 | 1 | 1 | 0 | 1 | 0 |
| H | 0 | 1 | 0 | 1 | 0 | 0 | | | | | | | |
| I | 0 | 0 | 0 | 1 | 1 | 0 | 8 | 1 | 0 | 0 | 1 | 1 | 0 |
| J | 0 | 0 | 1 | 0 | 1 | 1 | ' | 1 | 0 | 1 | 0 | 1 | 1 |
| K | 0 | 0 | 1 | 1 | 1 | 1 | ( | 1 | 0 | 1 | 1 | 1 | 1 |
| L | 0 | 1 | 0 | 0 | 1 | 0 | ) | 1 | 1 | 0 | 0 | 1 | 0 |
| M | 0 | 1 | 1 | 1 | 0 | 0 | . | 1 | 1 | 1 | 1 | 0 | 0 |
| N | 0 | 0 | 1 | 1 | 0 | 0 | , | 1 | 0 | 1 | 1 | 0 | 0 |
| O | 0 | 1 | 1 | 0 | 0 | 0 | 9 | 1 | 1 | 1 | 0 | 0 | 0 |
| P | 0 | 1 | 0 | 1 | 1 | 0 | Ø | 1 | 1 | 0 | 1 | 1 | 0 |
| Q | 0 | 1 | 0 | 1 | 1 | 1 | 1 | 1 | 1 | 0 | 1 | 1 | 1 |
| R | 0 | 0 | 1 | 0 | 1 | 0 | 4 | 1 | 0 | 1 | 0 | 1 | 0 |
| S | 0 | 0 | 0 | 1 | 0 | 1 | " | 1 | 0 | 0 | 1 | 0 | 1 |
| T | 0 | 1 | 0 | 0 | 0 | 0 | 5 | 1 | 1 | 0 | 0 | 0 | 0 |
| U | 0 | 0 | 0 | 1 | 1 | 1 | 7 | 1 | 0 | 0 | 1 | 1 | 1 |
| V | 0 | 1 | 1 | 1 | 1 | 0 | ; | 1 | 1 | 1 | 1 | 1 | 0 |
| W | 0 | 1 | 0 | 0 | 1 | 1 | 2 | 1 | 1 | 0 | 0 | 1 | 1 |
| X | 0 | 1 | 1 | 1 | 0 | 1 | / | 1 | 1 | 1 | 1 | 0 | 1 |
| Y | 0 | 1 | 0 | 1 | 0 | 1 | 6 | 1 | 1 | 0 | 1 | 0 | 1 |
| Z | 0 | 1 | 0 | 0 | 0 | 1 | " | 1 | 1 | 0 | 0 | 0 | 1 |
| LTRS | 0 | 1 | 1 | 1 | 1 | 1 | FIGS | 0 | 1 | 1 | 0 | 1 | 1 |
| Space | 0 | 0 | 0 | 1 | 0 | 0 | CR | 0 | 0 | 1 | 0 | 0 | 0 |
| LF | 0 | 0 | 0 | 0 | 1 | 0 | Blank | 0 | 0 | 0 | 0 | 0 | 0 |

The reason for using the six bit code instead of the conventional five bit Teletype code in the apparatus 50 is to provide for a continuous display. If the conventional 5 bit code is used, separate character spaces on the drum 64 must be used for the two functional shift codes; LTRS and FIGS. During the normal display sequence, as is hereinafter described, both display messages are provided to the display tube 57 during a single revolution of the drum 64. If the conventional shift codes were utilized, a space would occur in the display at the tube 57 for each shift code. Utilizing the sixth bit accordingly permits shift code changes without requiring a blank space in the display.

On the magnetic drum 64 two tracks 84 and 85 are utilized for the display and two tracks 86 and 87 are utilized for the fixed message tracks in order to reduce bit density on the drum 64 and to increase the speed of recovering a character from the drum. As is further hereinafter described three bits of each display character are recorded in each of the tracks 84 and 85 and similarly three bits of each message character are recorded in each of the tracks 86 and 87. Each of the four messages recorded on the drum 64 can be displayed as three lines of 40 characters each. With two messages being displayed at the tube 57, six lines are accordingly displayed, three for the upper display and three for the lower display. As depicted particularly in FIGURE 32, each message line is stored as forty characters or 120 bits along the circumference of the drum 64. One hundred twenty bits are stored in each of the two tracks 84 and 85 for each line of the display. The messages recorded in the tracks 86 and 87 which are not displayed are of similar length. As also depicted in FIGURE 32, there are gaps of two characters on the drum circumference between display lines to allow for retrace time in the cathode-ray tube 57. Thus each 120 character message requires the space needed for 126 characters or 378 bits. The total number of bits around the circumference of the drum 64 for two messages is thus 756. Since the drum rotates at a speed of 3600 r.p.m. or 60 revolutions per second the bit rate is 60×756 or 45,360 bits per second. The diameter of the drum 64 may be four inches so that the bit density is 60 per inch of circumference.

During the idle condition of the data composer apparatus 50 the two messages recorded in the display tracks 84 and 85 are repeatedly displayed on the face of the cathode-ray tube 57. The display of the contents of the display tracks 84 and 85 takes place one character at a time serially so that each character is displayed once every revolution of the drum 64 or at a repetition rate of 60 times per second. Each recorded character is read from the display tracks 84 and 85 by the two transducers or heads 74 and 75 one bit at a time and the reproduced bits from the heads 74 and 75 are provided to a read register 102. The read registor 102 consists essentially of two three-bit shift registers and all information read from the drum 64 or to be written on the drum 64 is first registered character by character in the six bit read register 102.

The signals from and to the heads 74–77 pass through a two position electronic head switch 100. At one position of the head switch 100, the read register 102 is connected to the display track heads 74 and 75 and in a second position of the head switch 100, the read register 102 is connected to the message track heads 76 and 77. The position of the head switch 100 and of a similar head switch 101 connected to the heads 78 and 90 is determined by a control logic circuit 118 in FIGURE 7, which is referred to hereafter simply as the control logic 118.

As illustrated in FIGURE 7, the keyboard 51, also shown in FIGURES 1 and 3, is utilized to set a control register 132. Twenty one commands C1–C21 may be initiated at the keyboard 51. The command C1 is initiated when any one of the character keys 130 of the keyboard 51 is depressed. The commands C2–C21 are provided respectively responsive to the operation of the keys 2C2–2C21 of the keyboard 51.

A control decoder 133 at the output of the keyboard 51 receives the commands and sets a control register 132 in accordance therewith. The control register 132 consists essentially of eight flip-flops which are designated in FIGURE 7 as I1 through I8 and as 8I1 through 8I8 in FIGURE 8 of the detail drawing. The particular combination of flip-flops operated by each command is tabulated in Table A which is included hereafter as part of the detail circuit description. Briefly, to illustrate the operation of the control register 132, the flip-flops I3 and I4 are operated for the keyboard command C1 responsive to the depression of any one of the thirty-one character keys 130 in FIGURE 2. The control register 132, accordingly, as a unique operating condition for the twenty-one different commands. For the normal or idle condition of the data composer apparatus 50, the control register 132 is reset and this condition is a twenty-second condition of the control register 132.

The control register 132 is connected to the input of the control logic 118, mentioned above, which controls the operating condition of the two head switches 100 and 101. The control logic 118 responds to the combination of signals from the control register 132 in accordance with the particular command to initiate various sub-operations in the various other components of the data composer apparatus 50. When the control register 132 is in its reset condition, the control logic 118 provides for continuously displaying the two messages recorded in the display tracks 84 and 85 on the face of the display tube 57 in FIGURE 6. The control by the control logic 118 includes setting the switch 100 to connect the heads 74 and 75 to the read register 102.

Before proceeding with the rest of the description of the normal operating conditions of the data composer apparatus 50, a number of other components shown in FIGURES 5 through 7 are first briefly described. The control logic 118 is associated with two other logic circuits; the sequence control logic 125 in FIGURE 7, and the mark control logic 116 in FIGURE 6. The sequence control logic 125 is, in turn, associated with a five-stage sequence counter 127, and the mark control logic 116 is associated with a four-stage mark counter 119. The purpose of the sequence control logic 125 and the sequence counter 127 is to select and time a number of different sub-operations that are carried out within the framework of a command. Such operations, for example, include reading of a character, writing of a character, resetting a mark, erasing a store, etc. For every command C1 through C21 and for the idle condition of the apparatus 50 as well, a set of these sub-operations are carried out in continuously timed sequence and the selection and timing of these sub-operations is the function of the sequence counter 127 and the sequence control logic 125. A tabulation of these sub-operations for the various commands for each position of the counter 127 is included in Table B in the detail description of the data composer apparatus 50 which follows herein.

The mark control logic 116 and the associated mark counter 119 in FIGURE 6 are utilized for controlling the position of marks recorded in the two tracks 88 and 90 on the drum 64. Each of the four stores in tracks 84 through 87 has an address mark associated therewith which serves the purpose of identifying character positions. In each track 88 and 90, two marks are recorded, one for the upper and one for the lower store. The track 88 is associated with the display tracks 84 and 85 and the track 90 is associated with the message tracks 86 and 87. The purpose of the mark counter 119 is to indicate the time in which the desired character location is under the information read-write heads 74 through 77 and also to advance or back space a mark, to reset it, or to advance it to the beginning of the next line. The operation of the sequence control logic 125 and of the mark control logic 116 are both under control of the control logic 118. In this manner, depending upon the particular command initiating from the keyboard 51, the control logic 118 operates the sequence control logic 125 and the mark control 116 so that the proper sub-operations are initiated and the reading and writing functions are kept track of.

As indicated above, during the idle condition of the data composer apparatus 50, the control logic 118 operates the head switches 100 and 101 so that the read register 102 is connected to the display track heads 74 and 75 and so that the mark control logic 116 is connected to the two heads 78 and 79 associated with the display mark track 88. Two heads 80 and 81 are associated with the track 90 and the two heads 79 and 81 are reading heads, whereas, the two heads 78 and 80 are writing heads. The heads 79 and 81 are utilized for sensing marks recorded in the tracks 88 and 90 respectively, and two heads 78 and 80 are utilized for recording new marks therein.

The read register 102 stores the bits of the character as they are reproduced in parallel from the two tracks 84 and 85 and then at the end of an interval equivalent to three bits the whole character is transferred in parallel from the read register 102 to a display register 107. The bit timing of the various components in the data composer apparatus is under control of the tracks 92 and 93 on the drum 64. The clock track 92 drives a clock circuit 122 which provides four different clock pulses during each bit time. These pulses are designated X, XΔ, Y and Z and are shown at the top of FIGURE 31. The clock pulses are provided to the three control logic circuits 118, 125 and 116. The pulses reproduced from the track 93 drive a generator 123 which develops UOP (upper origin pulse), LOP (lower origin pulse) and LP (line pulses). The layout of the track 93 for providing these pulses is depicted along the bottom of FIGURE 32. The generators 122 and 123 also drive a three stage bit counter 126 in FIGURE 7. The bit counter 126 is a ring counter which continuously operates to time the information characters in the apparatus 50.

Though not shown in FIGURE 6, the clock pulses are also provided to the read register 102. The read register 102 accordingly successively receives the three pairs of bits for a character from the tracks 84 and 85 and then the transfer gates 97 are operated by the control logic 118 to transfer the registered information in parallel to the six stage display register 107. The display register 107 provides the information in parallel to two digital-to-analog converters 110 and 111. The two converters 110 and 111 produces *x* and *y* coordinate potentials particular to the character registered in the display 107, and these coordinate voltages are utilized in a monoscope character generator 113 to select the character image.

The coordinate voltages from the converters 110 and 111 are provided to deflection circuits 114 associated with the character generator 113, and the vertical and horizontal deflection signals to the generator 113 select the character to be displayed. The character generator 113 is a device which generates video signals of the character which are then introduced to the display tube 57 to provide for an image of the character thereat. The generator 113 includes a target depicted in FIGURE 30, and may illustratively be of the type M3–700 manufactured by the Hughes Aircraft Company. The beam in the generator 113 is positioned at the upper left corner of the selected character space in the target, and then the character space is scanned vertically at a relatively high frequency. The scanning is controlled by a display control 120 which also controls the display sweep circuits 121 of the display tube 57. Illustratively the vertical character sweep or frequency may be 200 kilocycles per second and the horizontal line frequency of the display 360 cycles per second, which is six lines for each revolution of the drum.

The horizontal and vertical sweeps of the display tube 57 are synchronized with the rotation of the drum 64 to provide for the selection of the correct position for displaying the character image. The synchronization is provided under the control of the display control circuit 120 which provides control potentials to the display sweep circuits 121 associated with the display tube 57. FIGURE 33 illustrates the various control and sweep signals provided by the circuits 114 and 121 and the control 120. The curves are hereinafter described in the detail description.

This display sequence continues repeatedly with a new character being read serially into the read register 102 and then transferred in parallel into the display register 107. The display register 107 provides for the generation of new coordinates to select the character address at the character generator 113, and the video signals from the character generator 113 provide for the character image at the proper location on the face of the display tube 57. Character image after character image is provided in this manner until both of the 120 character messages are provided to the cathode-ray tube 57. During a single revolution of the drum 64 both the lower and the upper messages are displayed. As long as the keyboard 51, shown in FIGURE 7, is not operated the display sequence continues uninterrupted with both messages being displayed on the face of the cathode-ray tube 57.

In addition to the two messages, the address mark for each of the two messages is also continuously displayed on the face of the display tube 57. As indicated above, these marks serve the purpose of identifying character positions for transferring information under control of the keyboard 51. At the display tube 57 in FIGURE 6, the two marks in the track 88 provide for underscoring one character in each of the upper and lower displays. The underscoring is a dash under the character and it provides a visual indication of the mark address. As hereinafter described and briefly mentioned above, this visual indication of the mark address may be utilized by the operator for transferring messages or portions of messages between the two stores and between the fixed and the display stores under control of the mark logic 116. During the normal condition of the apparatus 50 each time a mark in the track 88 is sensed by the head 79, it operates the control logic 116 to in turn operate the counter 119. The mark counter 119 provides a pulse to an underscore generator 112 which introduces a video signal to the amplifier 115. The underscore video signal is provided to the display tube 57 to control the display tube 57 and provide for the visual indication of the underscore mark on the face of the tube. The two underscore marks, one for the upper display and one for the lower display, are not advanced but remain in their respective positions during the cyclic display of the two messages recorded in the tracks 84 and 85. The marks are displayed even though messages are not recorded in the display tracks 84 and 85 as long as the marks in the track 88 are not erased.

Whenever any one of the commands C1–C21 is initiated at the keyboard 51, it interrupts the display at the display tube 57. During the following description the order of the description is as follows: the operation of the data composer apparatus 50 for the command C2 is first described; then for the command C1; and then successively for the commands C3 to C21.

When the key 2C2 is depressed, it initiates a sequence of operations in the data composer apparatus 50 for receiving Teletype information from the remotely located transmitter 61 in FIGURE 5 and for recording the received information in the upper store of the display tracks 84 and 85 in FIGURE 6. The transmitter 61 was mentioned above in reference to FIGURE 3. The keyboard 51 sets the control register 132 in FIGURE 7 to provide control signals to the control logic 118. Under control of the logic circuits 118, 125 and 116, the upper store of each of the display tracks 84 and 85 is erased and the mark in the upper store of the track 88 is reset. The logic circuits operate the read register 102 to successively provide erase signals ("0" bits) through the head switch 100 to the display tracks 84 and 85.

The erase sequence is initiated by the control logic 118 when the +UOP, upper origin pulse, is provided from the generator 123 and the erase sequence is terminated when the +LOP, lower origin pulse is received therefrom. This erase sequence is accomplished during the first step of the sequence counter 127. During the second step, no sub-operation is performed and the sequence counter 127 is automatically stepped to its third stage. Table B in the detailed description identifies the sub-operations performed during the different stages of the counter operation for the different commands.

During the third stage of the counter 127, the mark in the upper store of the track 88 is reset under control of the mark control logic 116 and the mark counter 119. The old mark is first sensed by the head 79 and then two characters later, when it passes under the write head 78, it is erased. The two heads 78 and 79 are spaced apart by a distance equivalent to two characters to provide for the necessary mark control functions of the type just described. A new mark is not immediately recorded but is recorded under control of the upper origin pulse (+UOP) from the generator 123. The mark is recorded by the head 78 at the reset position of the upper store in the track 88. At the termination of the mark recording sequence for resetting the mark, an indication is provided from the control logic 116 to the sequence control logic 125 which steps the counter 127 to the fourth stage.

During the fourth stage, the control logic 118 provides an enabling signal to the remote Teletype transmitter 61 indicating that the data composer apparatus 50 is ready for receiving a Teletype input. The conventional transmitted Teletype code includes a start pulse and then five bits identifying each character or functional code. The start pulse at the data composer apparatus 50 functions to operate a clutch magnet 142 in FIGURE 5 to initiate the rotation of the armature of the input distributor 95 to successive contact five conductive segments 137 through 141. The rotation of the armature is synchronous with the Teletype input which is at a rate of six characters per second. The speed of the armature is relatively slow compared with the bit rate of the various components in the data composer apparatus 50. For example, as described above the drum 64 rotates at a speed of 60 revolutions per second which is at a rate such that it completes ten revolutions during the time that one character is being transmitted by the transmitter 61. A cam mounted on the armature shaft is also rotated responsive to the operation of the clutch magnet to close a pair of contacts during a period in which the five segments 137 through 141 are contacted. The cam develops a control signal which is utilized to control the operations of the read register 102. The leading edge of the signal developed by the cam is utilized to reset or clear the read register 102.

The five character bits from the distributor 95 are provided to five of the stages of the six stage read register 102. The sixth stage of the read register 102 is utilized to register the shift status of the character. A shift status circuit 104 in FIGURE 6 controls the condition of the sixth stage in the read register 102 and the circuit 104 is in turn controlled by a function decorder 124 in FIGURE 7. The function decoder 124 is connected to the output of the read register 102 and it decodes the characters registered therein. The purpose of the function decoder 124 is to detect the presence of certain codes in the read register 102. These codes are for Fig. (11011), for Ltr. (11111), for CR (00010), for blank (00000), for space (00100), and for line feed or stop (01000). If a functional code for Fig. or Ltr. is detected by the function decoder 124, it operates the shift status circuit 104 to set the sixth stage of the read register 102 in accordance therewith. If a new functional code is not received from the remote Teletype transmitter 61, the condition of the sixth stage in the read register 102 and the condition of the shift status circuit 104 remains the same.

When the cam 143 in FIGURE 5 completes its revolution to indicate that the input character is registered in the read register 102, the sequence control logic 125 in FIGURE 7 is operated to step the sequence counter 127 to its last or fifth stage 35. The sequence counter 127 thereupon operates the control logic 118 to shift the information in the read register 102 in two parallel paths with three bits being serially arranged in each path through the head switch 100 to the recording heads 74 and 75.

The initiation of the recording sequence is also controlled by the mark control logic 116 and the mark counter 119. When the mark in the upper display is sensed, an enabling potential is provided to provide for the operation of the control logic 118. In this manner, the first input character is recorded in the display tracks 84 and 85 at the position indicated by the reset mark in the upper store of the display mark track 88. During this same operation, with the sequence counter at its last or fifth stage, the mark control logic 116 erases the reset mark and records a new mark in the next character position. In other words, when the character is written in the display tracks 84 and 85, the mark is advanced in the mark track 88. As described above, the mark counter 119 is a four-stage counter. When the mark is sensed, it operates the first stage CM and then a stepping sequence is automatically initiated by the mark control logic 116. During the second stage C1 of the mark counter 119 the input character is recorded. During the third stage C2, the mark is erased and during the fourth stage C3, the new mark is recorded. At the completion of the operation of the mark counter 119, the sequence counter 127 is recirculated back to its fourth stage S4. As described above, when the sequence counter 127 is in its fourth stage S4, an input character is received and registered in the read register 102. The sequence of operations continues cyclically in this manner with an input character being registered in the register 102 when the sequence counter 127 is at its fourth stage S4 and then the registered character is recorded in the tracks 84 and 85 when the sequence counter 127 is in its fifth stage S5.

The input sequence of operations continues character after character until a line feed code or stop code is received, or the upper display store is filled, or the message clear switch 96 on the side of the cabinet section 59 in FIGURE 1 is operated. The function decoder 124 detects the line feed code and operates the control logic 125 to terminate the receive operation. The control logic 125 interrupts recirculation of the sequence counter 127 from stage S5 to stage S4. The sequence counter 127 thereupon resets the control register 132 to return the various control logic circuits 118, 125 and 116 to normal. When the data composer apparatus 50 is returned to normal, the display sequence is automatically resumed.

The control logic 118 includes means, not shown, in FIGURE 7 but hereinafter described in the detailed description, for initiating the display between successive input characters. In other words, after an input character is received, it is flashed on the display tube 57 and then the display is interrupted when the next input character is received. In addition to receiving input information from the transmitter 61, input information may also be entered utilizing the character keys 130 on the keyboard 51.

When a character key 130 on the keyboard 51 is operated, a sequence of operations is initiated for recording the particular character in the lower display. The operated character key sets the control register to its command C1 condition to provide for control signals to the control logic 118 and it operates a keyboard input 94 shown in FIGURE 5. The keyboard input 94 provides for a combination of five bits in parallel to the read register 102 responsive to the depression of one of the character keys 130. The character keys 130 of the keyboard 51 may operate in a manner conventional in teletypewriters but provide for the operation of the contacts shown in FIGURE 5 by the selectively moved code bars. The signals generated by the character key are the conventional Teletype signals and these are registered in five stages of the read register 102. The sixth stage is again set in accordance with the shift status of the character under control of the shift status circuit 104 which is, in turn, controlled by the decoder 214 in FIGURE 7.

The six bit character in the read register 102 is then shifted into the lower display store at the position indicated by the address mark in the lower store of the track 88. The writing sequence is initiated under control of the mark counter 119 in a manner described above when the mark in the lower store of the track 88 is sensed. During the operation of the mark counter 119, the mark in the lower store of the track 88 is automatically advanced. The information previously recorded in the display tracks 84 and 85 is not erased as the new character is recorded over the old character, if any, in the display tracks 84 and 85. In this manner, information is entered by the character keys 130 merely by typing over old information recorded in the lower display.

The sequence counter 127 returns the control register 132 to normal at the termination of the mark advance under control of the mark counter 119. Normal display is, accordingly, resumed with the character just entered being also displayed at the display tube 57. If the character keys 130 are operated rapidly in succession, the characters are flashed one after another at the display tube 57 after they are recorded. In addition thereto, all the rest of the information in both displays are also provided at the display tube 57.

Information recorded in the lower display store may be transmitted automatically to a remotely located Teletype operator 60 in FIGURE 6 by depressing the command key 2C3 of the keyboard 51. When the key 2C3 is depressed, the control logic 118 is operated to, in turn, operate a function encoder 95 in FIGURE 6. The function encoder 95 is an apparatus for generating and inserting into the read register 102 particular Teletype codes required during the send operation. The codes which are inserted as required are Fig., Ltr., CR, and Line Feed. Responsive to the operation of the send key 2C3, the function encoder 95 inserts the code for Ltrs. into the read register 102 and this code is provided to a set of the output relays 105 associated with an output distributor 98. The output distributor 98 is operated by the control logic to transmit serially a start pulse and the five bit code for the functional code for Ltrs. to the Teletype receiver 60.

Thereafter, under control of the successive stages of the sequence counter 127, the mark in the lower store of the track 88 is reset, a character is read from the lower store of the display tracks 84 and 85 into the read register 102 and then it is transmitted by the output distributor 98 to the remote Teletype receiver 60. During the time that the character is read from the drum 64, the mark in the track 88 is advanced. The sequence continues in this manner, character after character, until the entire message has been transmitted. The shift status circuit 104 continuously compares the shift bit of the character read into the sixth stage of the read register 102 from the drum 64 with the state of the shift status previously registered thereby. In the event the sixth bit indicates a change in the shift status, the shift status circuit provides for the operation of the function encoder 95 to insert the proper function code Ltr. or Fig. into the read register 102 and the shift function code is now transmitted. During the time that the shift function code is read and transmitted, the mark control logic 116 inhibits the advance of the mark in the display mark track 88. Accordingly, when the sequence counter 127 is recirculated to its fourth stage S4 for the next character, the same character which just provided for the change in shift function is again read into the read register 102. This time, the comparison test by the shift status circuit 104 passes and the character is transmitted. The mark in the lower store of the track 88 is now advanced. The Teletype output continues in this manner with character after character being transmitted until all the characters except blanks have been transmitted.

When a blank character is detected, the encoder 95 is operated to insert the CR carriage return code to the read register 102 and this code is transmitted. The address mark in the track 88 is also advanced automatically to the beginning of the next line under control of the mark control logic 116. A CR code is not inserted at the end of a line if the line does not contain blank characters. If a blank character is detected in the last line, the encoder 95 inserts the line feed code into the third register 102 and it operates the control logic 118 to terminate the sending operation of the data composer apparatus 50. At the termination of this operation, the normal display operation is resumed. By inserting the CR code when a blank is detected the time required for transmitting a message may be materially reduced.

The rest of the commands C4 through C21 will only be very briefly described here in the general description section of the specification. The C4 command provides for the entry of the message recorded in the upper store of the message tracks 86 and 87 into the lower store of the display tracks 84 and 85. The mark in the upper store of the track 90 is reset but the mark in the lower store of the display mark track 88 is not reset. The message in the upper store of the message tracks 86 and 87 is, accordingly, entered, starting from its beginning but it is entered to the lower display starting at the position indicated by the mark for the lower display. Under the control of the stage S4 of the sequence counter 127, a character is read from the upper store of the tracks 86 and 87 into the read register 102 and then, under control of the next stage S5 of the counter 127, it is written into the display tracks 84 and 85. When the information is read, the mark in the upper store of the track 90 is advanced and when the information is recorded, the mark in the lower store of the track 88 is advanced. The mark advance sequences and the timing of the reading and writing functions, as described above, are under control of the mark control logic 116 and the mark counter 119. These circuits are operated through a particular sequence during each stage of the sequence counter 127. The sequence counter 127 is recirculated between its fourth and fifth stages S4 and S5 as character after character is read and then recorded. The message enter sequence is terminated when the end of the lower display store is reached and the data composer apparatus 50 is returned to its normal display condition.

For the C5 command, the sequence of operations is identical as for the C4 command except that the message is entered to the lower display from the lower store of the message tracks 86 and 87 instead of from the upper store. The control register 132 registers the difference in stores and sets the control logic 119 in accordance therewith.

The commands C6 and C7 are similar to the commands C4 and C5 except that the information is transferred from the lower display respectively to either the upper store of the message tracks 86 and 87 or to the lower store thereof.

The buttons or switches 99 and 103 mentioned above in reference to FIGURES 1 and 3 are utilized to switch the path from the upper and from the lower message stores. As shown in FIGURE 3, when these switches are operated the transfer is to the upper display store instead of to the lower display store. The sequence of operations is identical to that briefly described above for the commands C4 and C5 except the terminating store has been changed.

The commands C8 through C11 provide for copying either a character, a word, a line or a message from the upper display in the position indicated by its address mark to the lower display at the position indicated by its address mark. During the copying sequence, the respective marks are automatically advanced. For a copy word sequence, the detection of a space code at the decoder 124 halts the copy function. For a copy line sequence, the detection of a line pulse (LP) halts the sequence and for a copy message function, the detection of a reset signal halts the sequence. The sequences for the copy functions are substantially similar to that described above for the message entry functions in that character after character is first read into the read register 102 during the stage S4 of the sequence counter 127 and then during its next stage S5 it is recorded in the proper store.

The commands C12 through C17 provide for changing the address of the marks for the upper and lower displays. The mark may either be advanced one step, backspaced one step, advanced to the beginning of the next line or reset to the beginning of the store. To backspace the mark, the new mark is written before the old mark is recorded and then, when the old mark passes adjacent the head 78, it is erased. For the rest of the mark address changes, the old mark is first erased. For the advance to the beginning of the next line, the new mark is not recorded until the next LP line pulse is received at the mark control logic 116 from the generator 123. To reset the mark, the new mark is not recorded until the respective +UOP or +LOP is received.

The last two commands C20 and C21 provide respectively for erasing the lower display or the upper display by introducing ("0" bit pulses) from the read register 102 successively to the heads 74 and 75 under control of the generator 123.

The various commands provide for a highly flexible and high speed data composing apparatus 50. The composition is both flexible and fast because information can readily be transferred into the lower display for transmission from the upper display, from either of the message stores, or from the characters keys 130 of the keyboard 51.

DETAIL DESCRIPTION

Referring again briefly to FIGURE 1, the data composer apparatus 50 includes the console or table portion 71, which is supported on the table or cabinet 58, and the cabinet section 59, which enclosed the cabinet apparatus 70. In FIGURE 1, the apparatus 70 is shown pulled out and supported by slide brackets 62 to permit ready access to the components in the apparatus 80. The cabinet apparatus 70 includes a number of printed circuit boards 67 and a magnetic drum 64 which is driven by a motor 65. The magnetic drum 64 functions as the main storage facility of the data composer 50, and includes a number of tracks serving different storage functions. These tracks, which are hereinafter described in detail, are illustrated in different ones of the FIGURES 8 through 29 in accordance with their functions.

The console apparatus 71 includes the keyboard 51, shown partially in FIGURES 17 and 27, for entering information to the data composer 10 and the display tube 57 shown in FIGURE 22, of the detail circuit drawing. All messages which are received at the data composer apparatus 50 or transmitted therefrom are displayed on the face of the tube 57 so that the operator can readily check the data composer operation. An operator may be seated in front of the keyboard 51 of the console apparatus 71 for operating the keyboard 51 and viewing the display tube 57.

A number of switches are supported on the side of the cabinet 59 for initiating various functions in the data composer apparatus 50. An on-off switch 73 is provided, which is shown also in FIGURE 13 and which is utilized to turn on the apparatus 50. Four bottons 96, 98, 99 and 103 are provided on the side of the panel 59 in addition to the switch 73. The button 96 is a master clear or reset button; the button 98 is for switching the display from the display store tracks to the message tracks on the drum 64; and the buttons 99 and 103 are utilized for switching the paths from the permanent message store tracks on the magnetic drum 64. The functions of the buttons 96, 98, 99 and 103 are hereinafter described in detail.

*Designation of components*

Figure 12:
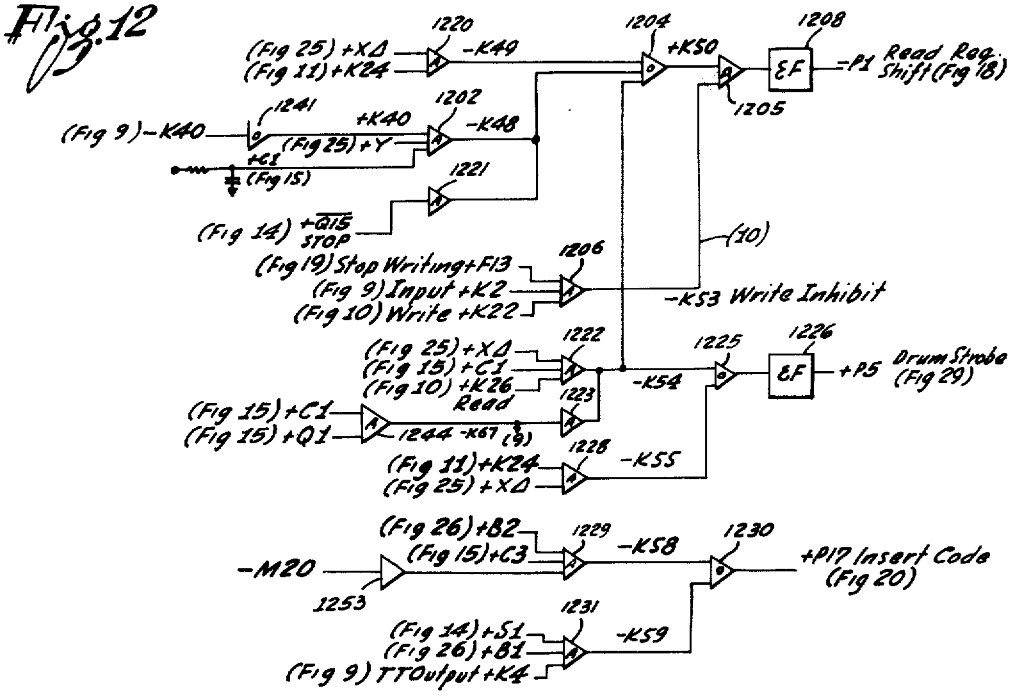
Figure 13:
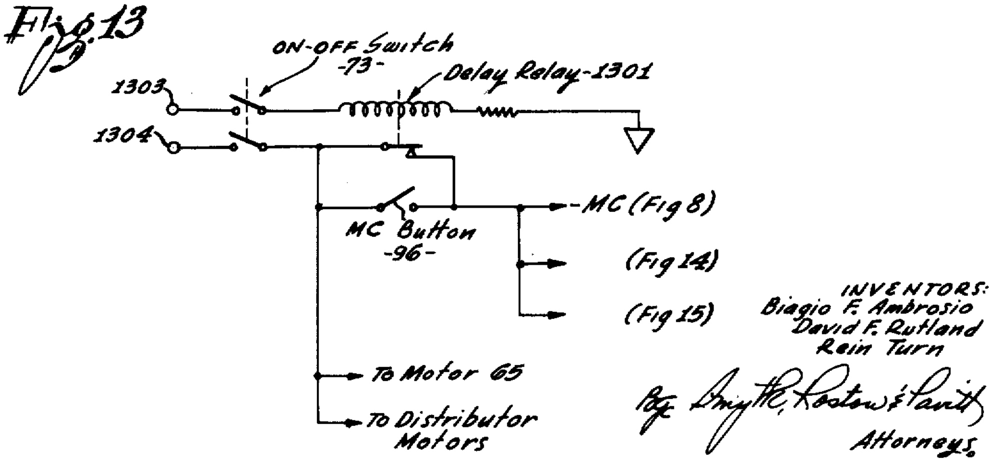

The reference designations in the detail functional diagrams of FIGURES 8 through 39 are the same as in the functional designations of FIGURES 5 through 7 for the major functional components. For example, the function decoder 124 shown in FIGURE 19 has been given the same reference designation as the function decoder in FIGURE 7. For the various detail components in FIGURES 8 through 29, not shown in FIGURES 5 to 7, the reference designations include, in the first digit or digits thereof, an indication of the figure in which the component appears. For example, the potential source 1303 (which is not shown in FIGURES 5 to 7) is shown in FIGURE 13. The connecting leads from one figure to another, however, are designated by letters such as MC or by a combination of letters and numbers. An indication is provided in parenthesis adjacent to the reference designation of the lead which indicates the figure number which includes the continuation of the lead. For example, the lead MC of FIGURE 13 is connected to a similarly designated lead in FIGURE 8. Referring to FIGURE 8, the MC lead is designated MC (FIG. 13) to indicate that the MC lead is connected to FIGURE 13, and in FIGURE 13 the MC lead is designated MC (FIG. 8) to indicate it is connected to FIGURE 8. In addition to the letters and figures, the reference designation of the leads also generally includes either a ± symbol to indicate the operative potential on that lead. For example, the MC lead in FIGURE 13 is prefaced by a minus sign (−) to indicate that when energized to perform a function, a negative potential is provided thereon.

During the following description, the lead designations are also utilized to describe the signals or potentials thereat. For example, a −MC signal is applied on the −MC lead. The same reference designations are, accordingly, used for the leads and for the signals thereon. All leads similarly designated are multipled together or in common. If a lead is connected from one figure to a number of different figures, the reference designation in the one figure includes in the bracket the different figure numbers to which it is connected. For example, the designation +I3 (9, 10) in FIGURE 8 indicates that the lead +I3 or the +I3 signal is connected to FIGURES 9 and 10.

The designation of the leads and signals is also indicative of the source of the signals. The following is a tabulation of the designations for most of the signals utilized in the data composer apparatus 50 together with the source indicated by the designation:

| Signals | Source |
|---|---|
| K | Control logic 118 (9–13). |
| B | Bit counter 126 (26). |
| C | Mark counter 119 (15). |
| F | Function decoder 124 (19). |
| S | Sequence counter 127 (14). |
| L | Sequence control logic 125 (14). |
| Q | Miscellaneous F/F. |
| X | Clock generator 122 (25). |
| Y | Do. |
| Z | Do. |
| ΔX | Do. |
| M | Mark control logic 116 (15–16). |
| I | Control register 132 (8). |
| R | Read register 102 (18). |
| G | Logic of read register 102 (18) and function encoder (20). |
| LOP | Origin and line pulse generator 123 (24). |
| VOP | Do. |
| p | Short duration pulses. |

The numbers in the parenthesis in the above tabulation indicate the figure or figures in the detail circuit drawing of FIGURES 8–29 which includes the source of the signals.

The main basic component or functional unit utilized throughout the data composer apparatus 50 is a NOR circuit illustrated in FIGURE 4. Referring to FIGURE 4, the NOR circuit includes a transistor 144 as its active element. The three input terminals to the NOR circuit are connected respectively by resistors 145 through 147 to the base electrode of the transistor 144. The transistor 144 may be a PNP junction transistor, illustratively, of the type designated 2N414. Biasing potential is provided from a +12 volt source through a resistor 148 to the base electrode of the transistor 144. The emitter electrode is grounded and the collector electrode, from which the output is taken, is connected by a resistor 149 to a −12 volt potential source.

If all three input terminals are at a positive potential, the emitter-to-base junction of the transistor 144 is reverse biased and the output potential is negative. If one of the inputs is negative, the potential at the base electrode of the transistor 144 is negative and the transistor 144 is conductive. The output potential from the collector electrode of the transistor 144 is then relatively positive compared to its output when the transistor 144 is not conductive.

FIGURE 4*a* illustrates the AND gate operation when all three inputs are positive, and FIGURE 4*b* illustrates its OR gate operation when one of the inputs is negative. For either type of operation, the NOR circuit provides for a phase reversal. The AND gate in FIGURE 4*a* is depicted as a triangle with the letter A in the triangle, and the OR gate in FIGURE 4 is depicted as a triangle, with the letter O in the triangle. These designations are used throughout the detail diagrams of FIGURES 8 through 27. The polarity signals + and − also may be utilized to identify the AND and OR gates because generally the output of an OR gate is + or positive, and the output of an AND gate is − or negative.

If two AND gates have their outputs connected together, as indicated by the AND gate in phantom in FIGURE 4*a*, which has its output connected to the output of the AND gate in solid lines, they together form one composite AND gate. All of the inputs of both AND gates must then be energized to provide a negative signal at the joined output.

FIGURE 4*c* is illustrative of the flip-flop utilized throughout the apparatus 50. Each flip-flop comprises two NOR circuits, and a negative input to either NOR circuit forming the flip-flop causes it to be conductive and inhibit the conduction of the associated NOR circuit. For example, a negative pulse to the upper input terminal of the flip-flop provides for a positive potential at the upper output terminal and a negative potential at the lower output terminal. The flip-flop is bistable remaining in either condition until set to the other. A multivibrator is depicted in FIGURES 8 through 29 somewhat similar to the flip-flop but having a capacitor in one of the crossed interconnecting leads. The multivibrator is monostable providing for an output pulse of a particular duration when it is operated.

*On-off switch 73 operated (display operation)*

As described above and shown in FIGURE 1, a number of buttons 96, 99, 99 and 103 and the on-off switch 73 are located on the side of the cabinet section 59. In the detail circuit drawing, the on-off switch is shown in FIGURE 13 and may be considered as part of the control logic shown in FIGURES 9 through 13. When the switch 73 is operated to its on position, it energizes the various components in the data composer apparatus 50 including the motor 65 (FIGURE 1) which rotates the magnetic drum 64. With the drum 64 rotating a display operation is initiated with two messages being displayed at the display tube 57 in FIGURE 22. As shown in FIGURE 13, when the on-off switch 73 is closed, a source of potential 1303 is connected to the winding of a time-delay relay 1301 causing it to operate after a predetermined interval. The on-off switch 73 also completes a path from a minus 12 volt potential source 1304 through the normal armature of the relay 1301 to a lead designated −MC.

During the interval following the operation of the on-off switch 73 and preceding the operation of the time delay relay 1301, the negative potential is provided on the lead −MC as a message clear or reset potential to normalize the data composer apparatus 50. The −MC signal is provided to the control register 132 in FIGURE 8, to the sequence counter 127 in FIGURE 14, to the sequence control logic 125, also in FIGURE 14, to the mark control logic 116 in FIGURES 15 and 16, and to the control logic 118 in FIGURES 9, 10 and 11.

The control register 132 includes eight flip-flop circuits 8I1 through 8I8 and these flip-flop circuits are reset by the message clear signal from the control logic circuit 118 and, in particular, from the portion thereof shown in FIGURE 13. The message clear signal is applied for a duration sufficient to permit the magnetic drum 64, shown partially in the different FIGURES 16, 18, 24 and 25, to come up to speed. The message clear function provided by the −MC signal is only briefly described at this point because it is desired to first describe the register 132, the counter 127, the logic 125, the logic 116 and the logic 118.

Briefly, however, to illustrate the normalizing or reset function of the −MC signal, in the sequence counter 127 the message clear signal insures the reset of the flip-flops 14S1 through 14S4 which form part of the sequence counter 127. As is hereinafter described in detail, the sequence counter 127 is utilized during each of the various commands initiated by the keyboard 51 to sequence the operations of the data composer 50 responsive to the command. The flip-flops 14S1 through 14S5 are reset by the message clear signal from FIGURE 13. At the right of FIGURE 14, the message clear signal from the control logic 118 in FIGURE 13 is also provided to reset a "sequence stop" flip-flop 14Q15.

As another illustration of the function of the −MC signal, it is also provided from the control logic 118 in FIGURE 13 to reset a flip-flop 15Q5 which is part of the mark control logic 116. This flip-flop is shown at the left of FIGURE 15 and it functions to reset the mark on the magnetic drum 64. Throughout the apparatus 50, the various flip-flops are in this manner reset by the message clear signal.

Returning now to the operation of the apparatus 50 responsive to the operation of the on-off switch 73 in FIGURE 13, the switch 73 also energizes the drum motor 65 (FIG. 1) and the motor for the input distributor 95 shown in the input control 72 in FIGURE 17, and the output distributor 98 shown in FIGURE 28. The drive shafts of these distributors or commutators are rotated but their clutch magnets are not energized at this time, so that their respective armatures are not rotated and Teletype signals are not coupled therethrough. The motor 65, which drives the drum 64, is shown in FIGURE 1 and indicated in FIGURE 13 of the detail functional diagram. The motor 65 comes up to speed and, thereafter, the message clear signal −MC is removed by the operation of the relay 1301.

The magnetic drum 64 includes eight different tracks; two display tracks 84 and 85 shown in FIGURE 29; two permanent store tracks 86 and 87 also shown in FIGURE 29; a clock track 92 shown in FIGURE 25; two mark tracks 88 and 90 shown in FIGURE 16; and a synchronizing track 93 shown in FIGURE 24. Though these eight tracks are shown in different figures of the detail drawing, they are part of a single magnetic drum 64 and, accordingly, are synchronized with respect to each other, rotating at the drum velocity. All eight tracks are depicted in FIGURE 32 which is an exploded layout of the magnetic drum 64. The layout in FIGURE 32 illustrates the timing of the characters and the relationship between the various tracks on the drum.

As is evident, the number of tracks is illustrative as more message or permanent store tracks may be provided for storing additional messages. One-half of the circumferential length of the magnetic drum 64 in each of the eight tracks 84 through 87, 88, 90, 92 and 93 is referred to as the upper store, being associated with the upper display on the tube 57 and the other half of the circumferential length is utilized for the lower display. The display of the characters stored on the magnetic drum 64 takes place one character at a time serially with the character stored on the drum 64 being displayed once every revolution of the drum 64. The display rate and the speed of revolution of the drum 64 is respectively 60 times per second and 60 revolutions per second so as to be fast enough to avoid flicker at the display tube 57 (FIG. 22).

In the conventional teletypewriter code, five bits or binary digits are utilized for each character. In the data composer apparatus 50, an additional bit is utilized to indicate the shift status of the character. On the magnetic drum 64, two tracks 84 and 85 are utilized for the display and two tracks 86 and 87 are utilized for the fixed message tracks in order to reduce bit density on the drum 64 and to increase the speed of recovering a character from the drum. As is further hereinafter described, three bits for each character are recorded in each of the tracks 84 and 85 and similarly for each character recorded in each of the tracks 86 and 87 three bits are recorded in each track. Every line on the display tube 57 is stored as forty characters or 120 bits along the circumference of the drum 64. One hundred twenty bits are stored in each of the two tracks 84 and 85 or in each of the two tracks 86 and 87. There are gaps of two characters between display lines to allow for retrace time in the tube 57. Thus, one 120 character message requires the space needed for 126 characters or 378 bits. The total number of bits around the circumference of the drum 64 is thus 756. The drum rotates at a speed of 3600 revolutions per minute or 60 revolutions per second so that the bit rate is 60×756 or 45,360 bits per second. The diameter of the drum 64 may be four inches so that the bit density is 60 per inch of circumference.

As the drum rotates, it generates a number of timing and clock pulses from the two tracks 92 and 93, shown respectively in FIGURES 25 and 24. The clock track 92 consists of 756 engraved bits evenly spaced along the circumference of the drum. Referring to FIGURE 25, the 756 bits are successively reproduced by a magnetic head 82 and coupled through a reading amplifier 2505 to a clock circuit 122, which was also mentioned above in the general description. The circuit 122 develops four series of pulses each at the repetition rate of 45,360 pulses per second but out of phase with each other. The phasing of the four series of pulses, designated −Z, +X, +Y and X+ΔX (or ΔX), is illustrated in the four upper curves of FIGURE 31. The ΔX pulses are just slightly delayed with respect to the X pulses. The circuit 122, accordingly, is a programming apparatus providing four spaced pulses for each pulse thereto. The −Z, +X and +Y clock pulses are coupled through emitter followers 2503, 2502 and 2501, respectively, to the various other circuits in the data composer apparatus 50.

For example, the −Z pulses from the emitter follower 2503 in FIGURE 25 are provided to the bit counter 126 in FIGURE 26. The bit counter 126 includes three stages including respectively the flip-flops 26B1, 26B2 and 26B3. The outputs of the flip-flops 26B1 through 26B3 are taken from the emitter followers 2601 through 2603 respectively. The −Z pulses from the clock circuit 122 are introduced through pairs of diodes 2605 as shift pulses to the flip-flops 26B1 through 26B3. Each of the −Z pulses steps the bit counter to set one of three flip-flops and reset the preceding flip-flop in the chain. The three flip-flops 2601 through 2603 are connected as a ring counter with the output from the emitter follower 2603 being provided back to the input of the flip-flop 26B1. As long as the data composer apparatus 50 is energized with the on-off switch 73 in FIGURE 13 closed the bit counter 126 is sequentially operated in this manner with stage after stage being operated. The output signals +B1, +B2 and +B3 from the bit counter 126 are depicted in FIGURE 31 and as indicated therein the beginning and terminating points of each of the pulses B1, B2 and B3 is controlled by the Z pulses from the clock circuit 122.

The origin and line track 93 on the magnetic drum 64 is also engraved. As illustrated in FIGURE 32 the pulses in the track 93 are engraved at distances measuring out 126 clock pulses of the track 92 as one line of the display and three lines as one message. In addition to the line pulses, which are designated as LP, an upper origin pulse is provided which consists of two engraved marks close together. The pulses from the track 93 are designated as upper origin pulse (UOP) signifying the beginning of the upper store, lower origin pulse (LOP) which indicates the beginning of the lower store, and line pulses (LP) which indicates the beginning of lines other than the first ones. In addition a flip-flop 24Q16 in FIGURE 24 develops D.C. levels which indicate whether the drum 64 is in its upper (U) or the lower (L) part of the stores.

As described above and shown in FIGURE 32, the track 93 has two pulses to indicate the upper origin pulse, UOP, and one pulse LP for each line. A single lower origin pulse LOP is also provided to indicate the beginning of the lower store. These pulses are sensed successively by the head 83 in FIGURES 32 and 24. The pulses from the head 83 are provided to a reading amplifier 2401 in the generator 123. The pulses in the track 93 are positioned to be synchronized with the +Y clock pulses from the clock generator 122 in FIGURE 25. An AND gate 2432 is operated by each pulse from the track 93 being gated by the +Y clock pulse. The negative output of the AND gate 2432 sets a flip-flop 24Q17A so that the flip-flop 24Q17A is set by each pulse in track 93. The flip-flop 24Q17A enables an AND gate 2404 to which the +Z clock pulses from the generator 122 are provided. The +Z clock pulse following the +Y clock pulse during the same time bit, operates the AND gate 2404 to set the flip-flop 24Q17B. The flip-flops 24Q17A and 24Q17B are in this manner successively set during the same bit time by the successive +Y and +Z clock pulses.

The positive output from the flip-flop 24Q17A is also provided to an AND gate 2407 which is disabled at this time by a flip-flop 24Q18. During the next bit time, when the upper origin pulse is being read, the second of the two pulses is provided from the head 83. The second pulse is provided by the amplifier 2401 to an OR gate 2402 coupled to the input of an AND gate 2403. The second pulse of the +UOP pulses is provided from the amplifier 2401 to an OR gate 2402 to disable an AND gate 2403. The flip-flop 24Q17A, accordingly, remains set when the second +Y clock pulse is provided to the AND gate 2403. If only a single pulse is provided from the head 83 instead of two pulses during successive bits, the AND gate 2403 functions to reset the flip-flop 24Q17A. When two successive pulses are reproduced, the flip-flop 24Q17A remains set for a duration of two bits. During the third bit time, a pulse is not reproduced from the track 93 so that the AND gate 2403 is operated by the +Y clock pulse to reset the flip-flop 24Q17A. In this manner, the flip-flop 24Q17A is set for a duration of two bits responsive to the upper origin pulses and is set for a duration of only one bit responsive to the LP pulses and the LOP pulse recorded in the track 93 on the drum 64.

Returning now to the description of the operation of the generator 123 for the upper origin pulse, the flip-flop 24Q17B is set by the +Z clock pulse responsive to each operation of the flip-flop 24Q17A. During the next bit, the +Y clock pulse enables an AND gate 2406 to set the flip-flop 24Q18. The flip-flop 24Q18 provides a negative potential designated $+\overline{Q18}$ to reset the flip-flop 24Q17B and it also operates the AND gate 2407. As described above, the AND gate 2407 is enabled by the flip-flop 24Q17A which is operated for a duration of two bits so that it is still operated when the flip-flop 24Q18 operates. The AND gate 2407 provides a negative pulse to an OR gate 2410 which produces the +UOP pulse. The +UOP pulse is provided through the emitter follower 2433 to the control logic 118 in FIGURE 10 and to the mark control logic 116 in FIGURE 15.

The negative potential from the AND gate 2407 is also provided to trigger a multivibrator 24Q19 which remains operated for a duration of at least two lines but returns to its normal condition before the LOP pulse is read in the track 93. The multivibrator 24Q19 provides a pulse through a delay circuit 2435 to disable an AND gate 2409 and to enable an AND gate 2408. An OR gate 2436 is coupled between the delay circuit 2435 and the AND gate 2408. The delay circuit 2435 is sufficient for the flip-flop 24Q18 to reset by the next +X clock pulse during the third bit following the first pulse read from the track 93. The +X clock pulse is provided through an OR gate 2438 to reset the flip-flop 24Q18.

Responsive, therefore, to the upper origin pulses in the track 93, a +UOP pulse is developed at the emitter follower 2433 and LP pulses or LOP pulses are not developed from the generator 23. When the upper origin pulse is developed from the AND gate 2407, it also sets a flip-flop 24Q16 as well as operating the multivibrator 24Q19. The flip-flop 24Q16 provides the +U signal through a delay circuit 2440. When the flip-flop 24Q16 is reset, it provides the +L signal through a delay circuit 2441.

When the first LP pulse in the track 93 following the upper origin pulses is read, the flip-flop 24Q17A is set for one bit time and it, in turn, sets the flip-flop 24Q17B. As described above, the flip-flop 24Q17B sets the flip-flop 24Q18. The flip-flop 24Q18 enables the AND gates 2407 through 2409. The AND gate 2407, however, is disabled at this time because the flip-flop 24Q17A was reset by the next +Y clock pulse since a successive pulse was not read during the next bit time following the LP pulse. The multivibrator 24Q19 is still in its operated condition, however, at this time, because, as described above, it remains operated for a duration spanning the two LP pulses following the upper origin pulse. Illustratively, such durations may be between 5.5 and 7 milliseconds. The AND gate 2408 is, accordingly, operated to provide a negative pulse to the OR gate 2411. The output of the OR gate 2411 is designated as the +LP pulse. The AND gate 2409 is disabled at this time by the multivibrator 24Q19.

When the lower origin pulse is read from the track 93, the multivibrator 24Q19 has returned to its normal condition so that the AND gate 2409 is now enabled and the AND gate 2408 is disabled. When the flip-flop 24Q18 is now set, a —A5 pulse is provided from the AND gate 2409 to an OR gate 2412 and also to reset the flip-flop 24Q16. The +L signal is now provided instead of the +U signal from the flip-flop 24Q16. The positive pulse +A5 from the OR gate 2412 is provided ot two AND gates 2415 and 2416. Due to the delay circuits 2441 and 2440 at the output of the flip-flop 24Q16, the AND gate 2416 is still enabled at this time and the AND gate 2415 is still disabled. The +A5 pulse from the OR gate 2412, accordingly, operates the AND gate 2416 to develop the —LOP pulse which is coupled to an OR gate 2450. The OR gate 2450 is connected to an emitter follower 2420 and the output of the emitter follower 2420 is designated the +LOP pulse.

The two line pulses following the +LOP pulse provide for similar operation of the pulse generator 123 except that the AND gate 2415 is now enabled instead of the AND gate 2416 so that the +A5 pulse develops a +LP pulse instead of a +LOP pulse. The output of the AND gate 2415 is coupled to the OR gate 2411 from which the +LP pulses are provided.

The generator 123, as well as the clock generator 122 and the bit counter 126, are continuously operated in this manner under control of the engraved signals in the tracks 92 and 93 as long as the drum 64 is rotating.

During the idle condition of the data composer apparatus 50 after the magnetic drum 64 has come to up to speed, any messages recorded in the display tracks 84 and 85 are repeatedly displayed on the face of the cathode-ray tube 57. Two messages may be recorded in the display tracks 84 and 85, one in the upper store and one in the lower store. The display of the contents of the display tracks 84 and 85 takes place one character at a time serially so that each character is displayed once every revolution of the drum 64. The recorded character is read from the display tracks 84 and 85 by the two transducers or heads 74 and 75 respectively one bit at a time. Briefly the reproduced signals are provided to the read register 102 which stores the bits of the character as they are reproduced and at the end of an interval equivalent to three bits the whole character is transferred in parallel from the read register 102 to the display register 107 in FIGURE 19. Only three bits are required for a character even through the characters each have six bits because two tracks are utilized in parallel.

Figure 9:
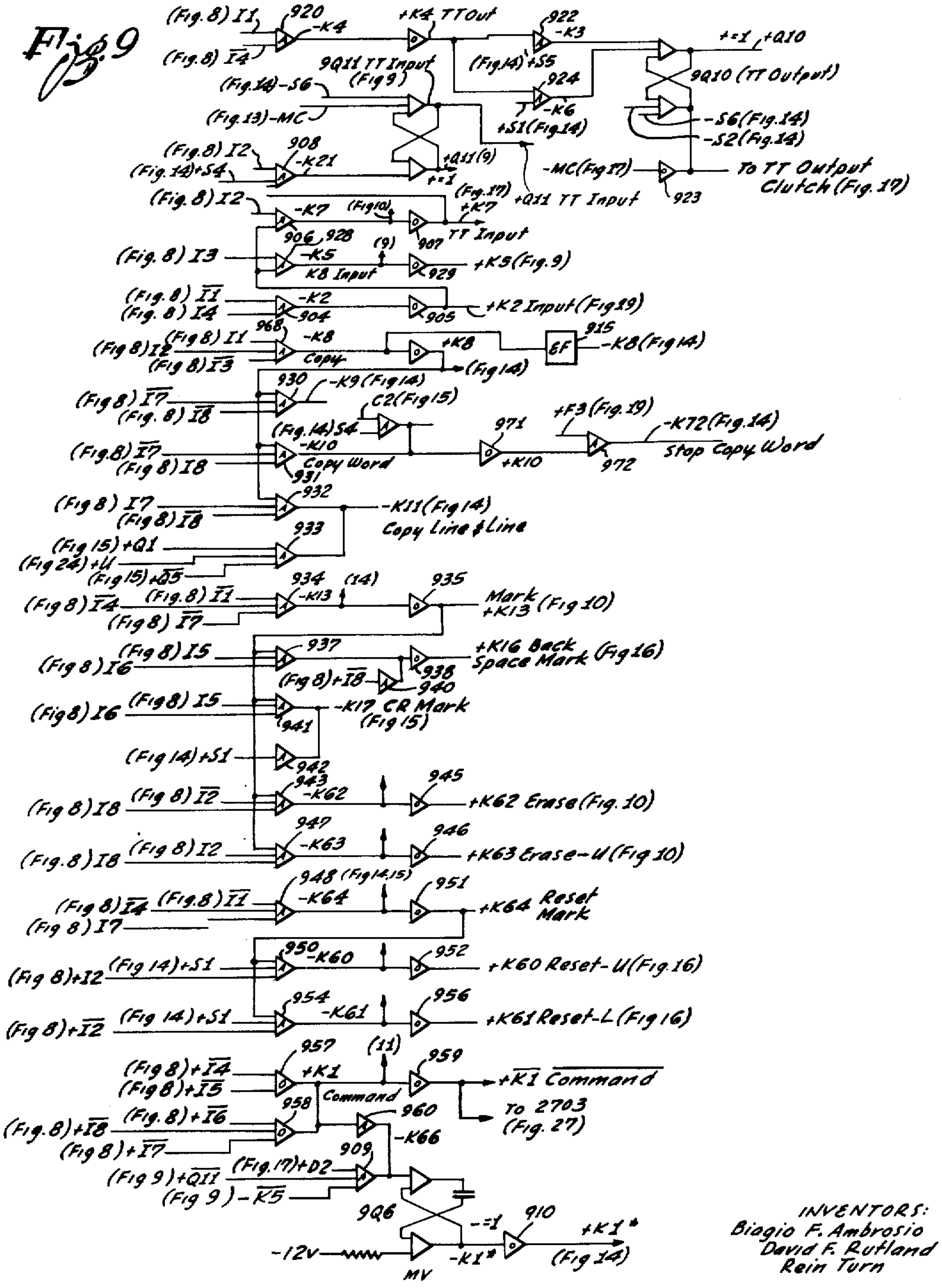
Figure 11:
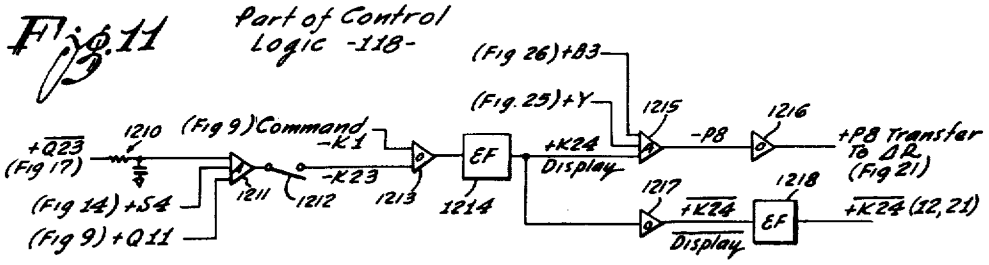

The quiescent or display state of the apparatus 50 is identified by the presence of the logical signal +K24 in FIGURE 11. When the +K24 signal is present it is indicative that a display function is to take place. The +K24 signal is developed when the control register 132 in FIGURE 8 is reset and in particular when the flip-flops 8I4 to 8I7 are reset or in their zero binary condition. Referring to FIGURE 9 towards the bottom of the figure, the composite OR gate consisting of the gates 957 and 958 is operated when the flip-flops 8I4 to 8I7 are reset. If any one of the flip-flops 8I4–8I7 is set at this time its input to the OR gate is a negative potential so that the output from the composite OR gate is positive. However, if all five flip-flops are reset the output potential is negative. A command indication therefore provides for a +K1 signal from the composite OR gate and a no command or normal or quiescent condition provides for a —K1 signal.

In FIGURE 11 the —K1 signal is provided to an OR gate 1213. The OR gate 1213 is accordingly enabled whenever the data composer apparatus 50 is in its quiescent condition. The positive signal from the OR gate 1213 is provided through an emitter follower 1214 and is designated as the +K24 display signal. This signal is inverted in an OR gate 1217 and coupled through an emitter follower 1218. The +K24 display signal is also utilized to generate transfer pulses +P8 utilized to read out the information from the read register 102. The +K24 display signal is provided to an AND gate 1215 together with the +B3 signal from the bit register in FIGURE 26 and the +Y signal from the count circuit 122 in FIGURE 25. The successive pulses from the AND gate 1215 are provided to an OR gate 1216 the output of which is a +P8 lead.

During the quiescent condition of the apparatus 50 the +K24 signal is accordingly provided and also pulses +P8 are successively provided under control of the counting circuit 122 and the bit register 126. One +P8 pulse is provided for each three bits because the +B3 signal occurs only once each three bits. The +K24 signal together with the +XΔ signal from the count circuit 122 are provided to an AND gate 1228 to develop the —K55 signal which is provided to an OR gate 1225 with the positive pulses therefrom through an emitter follower 1226 being designated as the +P5 or drum strobe pulses. These pulses are utilized for strobing the outputs of the read amplifiers 2912 and 2913 shown in FIGURE 29 for reading the recorded information into the read register 102.

The read register 102 is shifted by the —P1 pulses also initiated by the +K24 display signal. In FIGURE 12 the +K24 signal enables an AND gate 1220 and the XΔ pulses are provided therethrough to an OR gate 1204 and thence designated +K50 coupled to an AND gate 1205. A negative potential is provided to the AND gate 1205 designated —K53 in the event a write inhibiting status is in existence. Normally the potential on this lead is positive so that the AND gate 1205 is enabled. The negative pulses from the AND gates 1205 is provided through the emitter follower 1208 as the —P1 shift pulses.

To briefly recapitulate, during the quiescent state the +K24 logical signal is developed which provides for the drum strobe pulses +P5 and the shift pulses —P1. In addition to these pulses, the +P8 pulse described above is utilized at the end of each character time when the character has been read into the read register for transferring the character into the display register. The +P8, the —P1 and the +P5 pulses are all developed responsive to the presence of the +K24 display signal during the quiescent state of the data composer apparatus 50.

The sequence of pulses is as follows: with the +K24 signal present, a +P5 strobe pulse and a —P1 shift pulse is provided for each bit derived from the XΔ pulse; and a +P8 transfer pulse is provided for each three bits derived from the +Y pulse.

Figure 10:
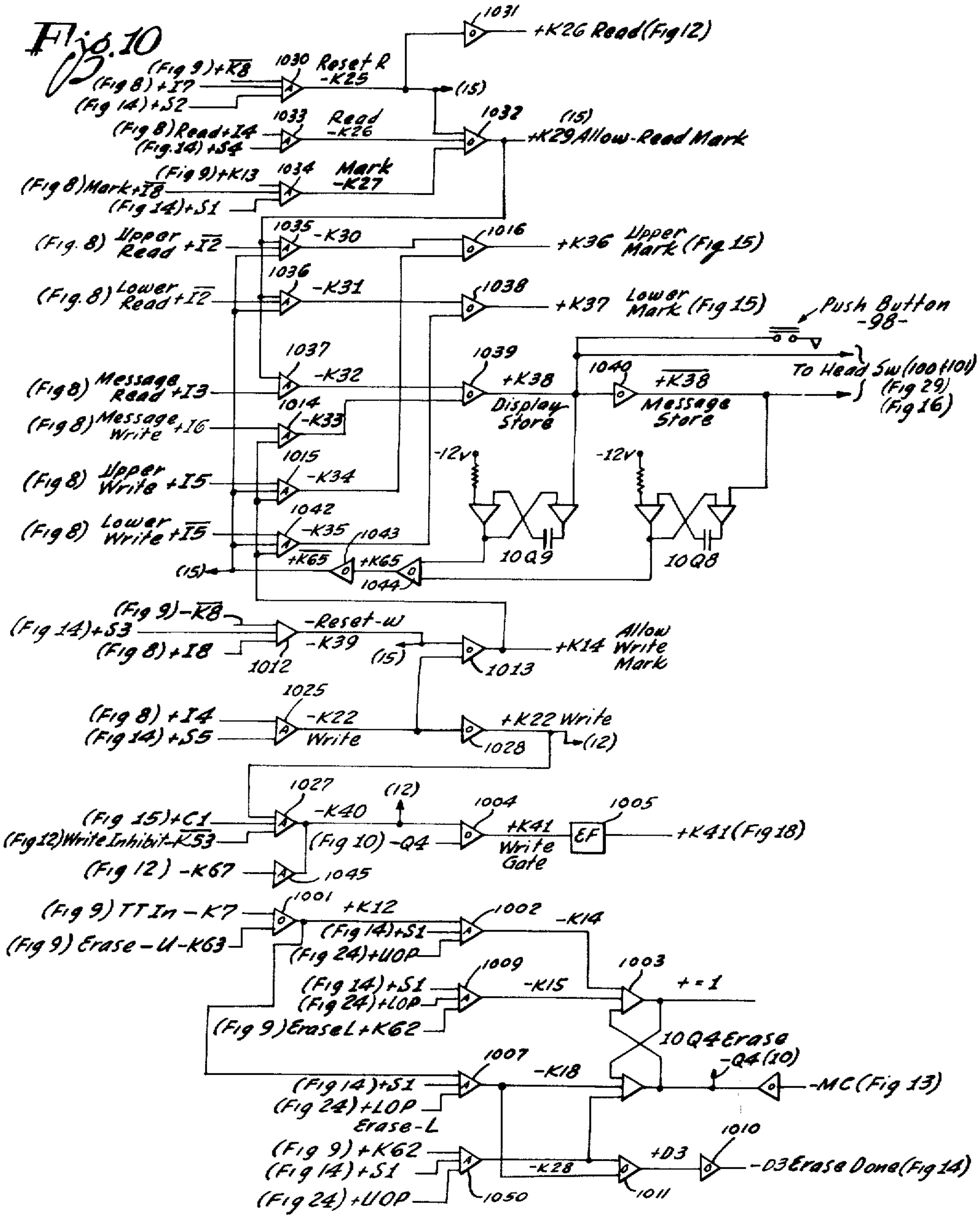

In FIGURE 29, the +P5 pulses enable four readout AND gates 2916 to 2919, at the output of the head switch 100. The switch 100 is set to reproduce from the display tracks 84 and 85 instead of from the message tracks 86 and 87 by the $+\overline{K38}$ signal from the control logic 118 in FIGURE 10. Referring to FIGURE 10, the output of an OR gate 1040 is normally positive but is made negative when the message store is to be read instead of the display store. With the control register 132 in FIGURE 8 reset at this time, the AND gates 1037 and 1014 at the input to the OR gate 1040 are disabled so that the output of the gate 1040 is positive and the output of the gate 1039, which is also supplied to the switch 100 in FIGURE 29, is negative. In FIGURE 29, the diodes connected to the display heads 74 and 75 are forward biased whereas those connected to the message heads 76 and 77 are reverse-biased by the signals from the control logic 118.

Responsive to the successive strobe pulses +P5, the two display tracks 84 and 85 are, accordingly, read or sampled bit by bit, with the successive bits being provided to the read register 102 in FIGURE 18. In FIGURE 18, the pulses RA4 and $\overline{RA4}$ from the track 84 are entered to the flip-flop 18R4, and the pulses RA1 and $\overline{RA1}$ from the other track 85 are entered to the flip-flop 18R1. The bits are shifted by the −P1 pulses in the read register 102. At the end of each character time, or after every three bits, the character in the read register is transferred by the +P8 transfer pulse to the display register 107 in FIGURE 21.

Six bits are utilized for each character on the drum 64, with the first bit (RF) indicating the shift status. A "1" digit indicates a letter character and a "0" digit indicates a figure character. The twelve outputs of the six flip-flops 18R1 through 18R5 and 18RF (the shift status flip-flop) in the read register 102 are connected to twelve AND gates 2101 through 2112 respectively in the transfer gates 97 in FIGURE 21. Two outputs are provided from each of the six flip-flops 18R1 through 18R5 and 18RF. The second input to each of the twelve AND gates 1201 through 1212 is the +P8 transfer pulse from the control logic 118 in FIGURE 11 through the emitter follower 2113.

Depending, therefore, upon which of the six flip-flops 18R1 through 18R5 and 18RF are set for the particular character read from the drum 64, a combination of six of the AND gates 1201 through 1212 are enabled to pass the +P8 pulse to the display register 107. The display register 107 has six flip-flops 21DRF and 21DR1 through 21DR5 which are set in accordance with which gates are enabled and, accordingly, to register the information in the read register 102 at this time.

The display register 107 in FIGURE 21 functions to develop two three-bit digital signals for controlling the horizontal and vertical deflections of a character generator or monoscope tube 113 in FIGURE 22, which is hereinafter described. The vertical deflection signals are designated respectively −Y1, −Y2 and −Y4 in FIGURE 21, and the horizontal deflection signals are designated as −X1, −X2 and −X4 in FIGURE 21. The outputs of the four flip-flops 21DR1 through 21DR4 are combined in four AND gates 2115 through 2118 to develop the −X1 and the −Y1 signals. The reason for utilizing the logic consisting of the AND gates 2115 through 2118 is to convert the digital outputs provided directly from the AND gates 21DRF and 21DR1 through 21DR5 to digital signals particularly adapted to the monoscope tube 113. The monoscope tube 113 may illustratively be of the type M3–200 manufactured by the Hughes Aircraft Company and FIGURE 30 illustrates its target which is an 8-character by 8-character configuration having 64 character spaces or areas.

The two different three-bit digital signals provided from the display register 108 function to select one of the characters in the 8 by 8 rectangular array of the target in the monoscope tube 113. The coding is illustrated at the right and bottom of the target in FIGURE 30 for selecting any character area. The two outputs of the flip-flop 21DR1 are provided respectively to the AND gates 2115 and 2116; the two outputs of the flip-flop 21DR2 are provided respectively to the AND gates 2117 and 2118; the two outputs of the AND gate 21DR3 are provided respectively to the AND gates 2115 and 2116; and the two outputs of the AND gate 21DR4 are provided respectively to the AND gates 2117 and 2118. The negative signals from the AND gates 2115 and 2116 are provided to an OR gate 2119 and the positive signal at its output is converted at the gate 2121 to provide for the −X1 signal. A similar configuration including the AND gates 2117 and 2118 and the gates 2120 and 2122 provide for the −Y1 signal.

The first digital signal consisting of the X1, X2 and X4 bits is provided to the digital-to-analog converter 111 in FIGURE 22 and the second digital signal consisting of the Y1, Y2 and Y4 bits is provided to the digital-to-analog converter 110 in FIGURE 22. The converters 111 and 110 each function to provide one of eight different analog potentials in accordance with the binary digital signals introduced thereto. The horizontal converter 111 is connected to the horizontal deflection circuit 114H which, together with the vertical deflection circuit 114V, comprises the deflection circuits 114. The circuits 114H and 114V are connected to the deflection plates of the monoscope character generator or tube 113. A unique one of the 64 different character positions illustrated in FIGURE 30 is, accordingly, selected by the digital signals read from the drum 64 and provided to the read register 102 in FIGURE 18. The beam in the monoscope 113 is positioned at the upper left hand corner of the selected character area to begin the character sweep for developing video signals representing the character. The signals in the read register 102 representing a six bit character were sampled and provided to the display register 107, converted to two different three-bit digital signals, and then converted by the converters 111 and 110 to the deflection signals for controlling the position of the beam in the generator 113.

The character sweep signals and the synchronization of the character generator 113 with the magnetic drum 64 is controlled by a display control circuit 120 shown in FIGURE 23. The display control circuit 120 functions to develop the various sweep signals and synchronizing signals depicted in the curves of FIGURE 3. The character sweep signal shown in FIGURE 33 is generated by the horizontal sweep circuit 116 in FIGURE 22 under control of the character synchronization pulse also shown in FIGURE 33. The character synchronization pulse is generated by the display control circuit 120 at the output of the AND gate 2305 which is periodically enabled by the flip-flop 23Q13. The flip-flop 23Q13 is set under control of an AND gate 2304, which is enabled by the +B3 signal from the bit register 116 in FIGURE 26. When the flip-flop 26B3 in the bit register is set, the +X clock pulse sets the flip-flop 23Q13 to enable the AND gate 2305 and provide the +X clock pulse to the AND gate 2305 as a character sync pulse to the horizontal sweep circuit in FIGURE 22. At the same time that the character sync pulse is generated, a blanking signal, also illustrated in FIGURE 33, is developed under control of the flip-flop 23Q13 by the gate 2306. The negative portion of the blanking signal is provided to the video amplifier 115 coupled to the target of the tube 113 to blank the tube 113 during the retrace time of the character sweep. The character sweep signal slowly moves the beam horizontally across the rectangular character area selected by the two analog signals from the converters 111 and 110.

During the time that the beam is moved relatively slowly horizontally across the selected character space, it is vertically scanned at a relatively high frequency. The vertical scanning frequency of the character may illustratively be four megacycles and the scanning frequency is introduced to the vertical deflection circuit 114V coupled to the tube 113 from the vertical drive sweep 2204.

The flip-flop 23Q13 which develops the character sync and blanking pulses is reset at the beginning of each character sweep by the AND gate 2303. The AND gate 2303 is enabled by the +B1 signal from the bit register 126 when the multivibrator 23Q14 is not triggered. The multivibrator 2314 is triggered to blank an entire line during the vertical retrace of the beam in the display tube 57. A line sync pulse is developed from a gate 2302 under control of the multivibrator 23Q14, and a page sync pulse is developed by the multivibrator 23Q24 under control of the upper origin pulse −UOP from the origin and line pulse generator in FIGURE 24. The line pulse keeps the flip-flop 23Q13 set to produce a blanking signal for two character times to allow for retracing of the line sweep of the display tube 57. A similar blanking signal is generated when the —UOP pulse is sensed to allow for retracing both the line sweep and the vertical sweep. The latter is retraced by the page sync signal from the flip-flop 23Q24.

The line sync pulse is provided to the horizontal sweep circuit 2205 associated with the display tube 57 and the page sync pulse is provided to the vertical sweep circuit 2204 associated with the display tube 57. The high voltage delay circuit 2207 in FIGURE 22 is energized when the start-stop switch 73 is closed to delay the application of the high voltage to the tube 57 until after the tube has warmed up. The high frequency vertical sweep from the vertical drive sweep 2204 to the character generator 113 provides approximately for ten vertical sweeps for each character. The character is scanned by the generator 113 during an interval somewhat less than the duration of three bits which is the duration during which the character is read from the magnetic drum 64.

During each revolution of the drum 64, which occurs at a rate of 60 revolutions per second, the two messages recorded in the display tracks of the drum 64 are reproduced and successively provided from the read register 102 to provide for the display in the tube 57. The two messages are, accordingly, visually reproduced by the display tube 57 during each revolution of the magnetic drum 64. The speed is sufficiently rapid to avoid any flicker to the operator or other viewer seated before the data apparatus 50. The bit rate is 45,360 bits per second with six bits for each character being provided during an interval of three bits because of the dual parallel tracks utilized for recording the characters on the drum 64. During the 16 milliseconds of each drum revolution, the 756 bits recorded in each of the two display tracks 84 and 85 are reproduced, decoded and converted to a visual display at the tube 57. Each of the two displays, the upper and the lower, provided on the face of the tube 57, consist of three lines each having 240 bits. With six lines, a total of 1440 bits are required with the additional bits for each message being utilized for retrace times. Each message has a maximum of 40 characters per line or 120 characters per message.

In addition to the display of the two messages, an underscore mark is displayed on the face of the tube 57. This mark appears at one of the character positions in each of the two displays, the upper and the lower, on the face of the tube 57. The underscore marks are developed from the mark tracks 88 and 90 on the magnetic drum 64 and are utilized during input copying and output operations of the data composer 50 to visually indicate the position of the incoming copied or outgoing message. During the quiescent condition of the data composer apparatus 50, when the display is provided at the tube 57, the two underscore marks are provided at the same positions of the two displays. Their positions on the face of the tube 57 does not change during the display. The position of the underscore marks may be moved to any position on the display under control of the keyboard 51, and the sequences of operation for controlling the underscore marks are hereinafter described in succeeding sections of this detail description of the specification.

During the quiescent condition, the underscore marks are provided at the tube 57 even if the two display tracks 84 and 85 are erased at this time or do not include any messages for display. Referring to FIGURE 32, which is a layout of the magnetic drum and illustrates the mark tracks 88 and 90 as well as the other tracks, the two underscore marks recorded in the tracks 88 and 90 are reproduced by the heads 79 and 71 respectively. The two heads 79 and 81 are coupled to a switch 101 which is similar to the switch 100 and therefrom to the mark control logic 116 shown in FIGURES 15 and 16. The mark control logic 116 provides for the successive operation of the underscore generator 112 in FIGURE 22. The operation of the mark counter 119 and the control logic 116 responsive to each mark pulse is hereinafter described in detail. Sufficient for the present is that the +C2 signal from the counter 119 operates the generator 112. The generator provides a 4 mc. burst signal responsive to the +C2 pulse from the counter 119. The underscore generator 112 is coupled to the video amplifier 115 and controls the amplifier 115 during a particular character selected by the recorded mark, as indicated by the curve for the underscore gate in FIGURE 33. During each revolution of the drum 64, the two underscore marks are, accordingly, visually provided at the face of the display tube 57 as well as the two display messages.

*Receive* (*command C–2*)

The display sequence continues in this manner, uninterrupted, until one of the command keys 2C2 through 2C21 on the keyboard 51 in FIGURE 1, or one of the typewriter keys 130 thereon, is operated. The sequence of operations following the depression or operation of one of the keyboard keys 130 is hereinafter described. Before proceeding with the description of the keyboard operations, the sequence of operations relating to some of the command keys 2C2 through 2C21 is first described. The twenty commands together with a common command C1, which is effective when any one of the typewriter keys 130 is operated, are tabulated below together with an indication of the resulting operations of the control register 132 shown in FIGURE 8. As is hereinafter described, the control register 132 includes eight flip-flops 811 through 818, which are selectively operated by the command keys 2C2 through 2C21 and by the common command C1, which indicates a keyboard entry is in progress.

TABLE A.—CONTROL REGISTER 132

| Command | 811 | 812 | 813 | 814 | 815 | 816 | 817 | 818 |
|---|---|---|---|---|---|---|---|---|
| C1 Keyboard Enter | 0 | 0* | 1* | 1 | 0 | 0 | 0 | 0 |
| C2 Receive | 0 | 1* | 0* | 1 | 1 | 0 | 0 | 1 |
| C3 Send | 1 | 0 | 0 | 0 | 0 | 0 | 1 | 0 |
| C4 Enter Message 1 | 1 | 1 | 1 | 1 | 0 | 0 | 1 | 0 |
| Special Sw | 1 | 1 | 1 | 1 | 1 | 0 | 1 | 0 |
| C5 Enter Message 2 | 1 | 0 | 1 | 1 | 0 | 0 | 1 | 0 |
| Special Sw | 1 | 0 | 1 | 1 | 1 | 0 | 1 | 0 |
| C6 Record Message 1 | 1 | 0 | 0 | 1 | 1 | 1 | 1 | 1 |
| C7 Record Message 2 | 1 | 0 | 0 | 1 | 0 | 1 | 1 | 1 |
| C8 Copy Character | 1 | 1 | 0 | 1 | 0 | 0 | 0 | 0 |
| C9 Copy Word | 1 | 1 | 0 | 1 | 0 | 0 | 0* | 1* |
| C10 Copy Line | 1 | 1 | 0 | 1 | 0 | 0 | 1* | 0* |
| C11 Copy Message | 1 | 1 | 0 | 1 | 0 | 0 | 1* | 1* |
| C12 Skip Mark, Lower | 0 | 0 | 0 | 0 | 0* | 1* | 0 | 0 |
| C13 Skip Mark, Upper | 0 | 1 | 0 | 0 | 0* | 1* | 0 | 0 |
| C14 Reset Mark, Lower | 0 | 0 | 0 | 0 | 0* | 0* | 1 | 0 |
| C15 Reset Mark, Upper | 0 | 1 | 0 | 0 | 0* | 0* | 1 | 0 |
| C16 Backspace Mark, Lower | 0 | 0 | 0 | 0 | 1* | 0* | 0 | 0 |
| C17 Backspace Mark, Upper | 0 | 1 | 0 | 0 | 1* | 0* | 0 | 0 |
| C18 CR Mark, Lower | 0 | 0 | 0 | 0 | 1* | 1* | 0 | 0 |
| C19 CR Mark, Upper | 0 | 1 | 0 | 0 | 1* | 1* | 0 | 0 |
| C20 Erase Display, Lower | 0 | 0 | 0 | 0 | 0 | 0 | 0 | 1* |
| C21 Erase Display, Upper | 0 | 1 | 0 | 0 | 0 | 0 | 0 | 1* |

When any one of the twenty keys 2C2 through 2C21 illustrated in FIGURE 1 is depressed, it operates an individually associated one of the armatures 27C2 through 27C21. A common armature 27C1 in FIGURE 27 is operated when any one of the typewriter or character keys 130 is operated. Normally, the armatures 27C1 through 27C21 are at the right in FIGURE 27 to provide a ground connection to individually associated leads —C1 through —C21. These leads —C1 through —C21 are coupled to the control decoder 133 depicted in FIGURE 8 which functions to decode the command and to operate or set an individual combination of the flip-flops 8I1 through 8I8 in the control register 132, also shown in FIGURE 8.

When an armature in FIGURE 27 is operated, it is moved to the left to permit the passage of a pulse from a keyboard pulse generator 2703 through an associated one of the resistors 2701 to the associated one of the leads —C1 through —C21. As illustrated in FIGURE 27, the negative pulse from the pulse generator 2703 may have a duration of 15 microseconds. If the command key 2C2 in FIGURE 1 is depressed to initiate a receiving sequence of operations, the armature 27C2 in FIGURE 27 is moved to the left to trigger the generator 2703 and to enable the passage of a negative pulse from the generator 2703 to pass through the lead —C2 to the control decoder 133 in FIGURE 8. The pulser generator 2703 may be a single-shot multivibrator which discharges the capacitor at its input to provide a negative pulse having a magnitude, illustratively, of 10 volts.

Referring now to FIGURE 8, the control decoder 133 consists of an array or matrix of diodes 802 which are coupled selectively between the leads —C1 through —C21 and the inputs to the flip-flops 8I1 through 8I8 of the control register 132. The above table A indicates the individual combination of the flip-flops which are operated responsive to any command. For example, for the receive command C2, the flip-flops 8I2, 8I4, 8I5 and 8I8 are set to their "1" binary conditions. Four of the eight flip-flop circuits 8I1 through 8I8 are, accordingly, set responsive to the operation of the command key 2C2 of the keyboard 51.

In the control register 132, the flip-flops 8I2, 8I4, 8I5 and 8I8 are set by the negative pulse on the lead —C2 from the keyboard 51 through the control decoder 133. At the output of the flip-flops 8I2, 8I4, 8I5 and 8I8 the upper output terminal becomes positive and the lower output terminal becomes negative. The reverse polarity conditions exist, of course, at the outputs of the flip-flops 8I1, 8I3, 8I6 and 8I7 which are not set at this time.

Each of the flip-flops 8I1–8I8 in the control register 132 registers specific information utilized in the control logic 118 (FIGS. 9–13) for determining the operations responsive to a command at the keyboard 51. The first three flip-flops 8I1 through 8I3 contain information concerning reading of information from the magnetic drum 64 as follows:

| | |
|---|---|
| 8I1=1 | Read. |
| 8I1=0 | Do Not Read. |
| 8I2=1 | Upper Part. |
| 8I2=0 | Lower Part. |
| 8I3=1 | Fixed Message Store. |
| 8I3=0 | Display Store. |

For example, the combination 8I1=1, 8I2=0 and 8I3=1 means=read from the lower fixed message store or track on the drum 64. Since for the receive command C2 the flip-flop 8I1 is not set, a read sequence from the magnetic drum 64 does not take place. As is hereinafter described, the information register by the flip-flops 8I2 and 8I3 is utilized for different control functions when the flip-flop 8I1 is in its "0" condition:

The three flip-flops 8I4, 8I5, 8I6 relate to writing information on the drum 64 of the data composer 50 as follows:

| | |
|---|---|
| 8I4=1 | Write. |
| 8I4=0 | Do Not Write. |
| 8I5=1 | Upper Part. |
| 8I5=0 | Lower Part. |
| 8I6=1 | Fixed Message Store. |
| 8I6=0 | Display Store. |

When the receive key 2C2 is operated, the flip-flops 8I4 and 8I5 are set, but not the flip-flop 8I6. This means the writing sequence is to take place in the upper part of the display store (tracks 84 and 85) of the magnetic drum 64.

The last two flip-flops 8I7 and 8I8 contain information relating to resetting the address or underscore marks. The flip-flop 8I7 operates in conjunction with the flip-flops 8I2 and 8I3. If the flip-flop 8I7 is set, it means that the mark should be reset in the store specified by the state of the flip-flops 8I2 and 8I3. For the receive command C2, the flip-flop 8I2 is set but not the flip-flop 8I3 so that the mark is reset in the upper part of the display store of the magnetic drum 64.

There are, however, commands in which the control register flip-flops except 8I1 and 8I4 are used to perform other functions than those described in the above table. Thus, if 8I1 is reset, the flip-flops 8I2 and 8I3 do not contain meaningful information relating to reading and they are, accordingly utilized for other commands such as differentiating between the C1 and C2 for indicating where the mark should be reset. Similarly, the other flip-flops are used for other functions. An asterisk (*) in Table A indicates that the particular flip-flop is used for a different function. When any one of the flip-flops is set, it establishes an "in operation" state in the various logic circuits in the data composer apparatus 50 and, further, it disables the keyboard pulse generating circuit 2703 to avoid any interruption with carrying out the prescribed operation. As shown in FIGURE 27, an inhibiting lead is provided to the keyboard pulse generator 2703. The generator 2703 is inhibited by the $\overline{KI}$ signal from the gate 956 of the control logic 118.

When the flip-flops 8I2, 8I4, 8I5 and 8I8 control register 132 are set in this manner, responsive to the depression of the key 2C2, the following functions are performed:

(1) The upper display is erased;
(2) The mark in the upper display is reset; and
(3) An enabling potential is provided to the remotely located transmitter to indicate that the data composer apparatus is ready to receive the input Teletype information. These functions are provided by the control logic 118 which received the output of the register 132.

Referring to FIGURE 9, which includes part of the control logic 118, the positive potential on the lead +I4 from the register 132 is provided through an AND gate 904 and an OR gate 905 to a +K2 lead. The gate 904 has a second input $+\overline{I1}$ which is positive because the flip-flop 8I1 in the register 132 remains in its reset condition when the receive command key 2C2 is operated. The positive potential on the lead +K2 indicates that an input message is to be received. The +K2 signal is provided to an AND gate 906. The other input for the AND gate 906 is from the lead +I2 of the register 132. As indicated above, the flip-flops 8I2, 8I4, 8I5 and 8I8 are set responsive to the receive command C2 so that the +I2 signal is present at the AND gate 906. The AND gate 906 is, accordingly, operated providing a negative potential to an OR gate 907. A positive potential is therefore provided at the lead +K7 at the output of the gate 907.

The +K7 signal is provided to an AND gate 1701 in the input control 72 shown in FIGURE 17. The other input to the AND gate 1701 is not enabled at this time but becomes enabled at the end of the reception of each character of the Teletype signals from the remote transmitter. The +K7 signal to the input control 72 functions as an enabling rather than an operating signal.

The +K7 signal in FIGURE 9 is also provided to the input of an AND gate 908 in the control logic 118. A second input +I2 is energized at this time due to the operation of a flip-flop 8I2 in the register 132. The third input lead +S4, however, is not energized at this time and remains unenergized to disable the gate 908 until the fourth flip-flop 14S4 in the sequence counter 127 in FIGURE 14 is set. The function of the counter 127, as is hereinafter described in detail, is to select a number of suboperations for each command. The stage 14S1 of the sequence counter 127 is set and the rest of the stages 14S2–14S5 are reset responsive to the operation of a multivibrator 9Q6 in the control logic 118. The multivibrator 9Q6 is controlled by a composite gate consisting of gates 909 and 960. The gate 909 is an AND gate and has three inputs $-\overline{D7}$, +K5 and $+\overline{Q11}$, and the gate 960 has a single input +K1. All four leads $-\overline{D7}$, +K5, $+\overline{Q11}$ and +K1 must be positive to provide for a trigger pulse to the multivibrator 9Q6.

The +K1 is positive when any one of the flip-flops 8I4–8I8 is set, which is when any command is initiated. The AND gates 957 and 958, connected to the lead +K1, receive the $+\overline{I4}$ to $+\overline{I8}$ signals and if all are present the potential to the gate 960 is negative. For the receive command C2, the flip-flops 8I2, 8I4, 8I5 and 8I8 are set at this time so that the gate potential to the gate 960 is positive. The −K5 signal is present from the gate 906 to the gate 909 when the flip-flop 8I3 is set. As indicated above the flip-flop 8I3 is set to indicate the permanent store instead of the display store is being utilized so that −K5 signal is absent at the time and an enabling potential is provided to the gate 909. For the receive command C2, the flip-flop 8I3 is then not set so that the AND gate 906 is disabled and the potential therefrom to the gate 909 is positive.

The $+\overline{Q11}$ signal to the AND gate 909 is provided from the flip-flop 9Q11 at the top of FIGURE 9 which is also part of the control logic 118. The flip-flop 9Q11 is reset at this time. As described above, the flip-flop 9Q11 is reset by the message clear signal −MC so that the signal to the AND gate 909 from the flip-flop 9Q11 is positive.

The +D2 signal to the gate 909 is provided from the input control 72 in FIGURE 17. The flip-flop 17Q23 was reset by the MC signal so that one input of the OR gate 1710 is positive. When the armature 27C2 is operated, the keyboard pulse generator 2703 sends a common pulse −CO to operate the gate 1710. The pulse from the gate 1710 is differentiated at the capacitor 1711 and introduced to the gate 1712. The differentiated trailing edge of the pulse from the gate 1710 operates the gate 1712. The +D2 output of the gate 1712 is positive so that the multivibrator 9Q6 in the control logic is operated. Multivibrator 9Q6 is set for any command of the data composer apparatus 50.

When the multivibrator 9Q6 is triggered, it provides a negative pulse to the gate 910 which, in turn, provides for a signal +K1* to the sequence counter 127 in FIGURE 14. In FIGURE 14 at the left center of the figure, the +K1* signal is provided to an AND gate 1401 which, in turn, provides a negative pulse to the flip-flop 14S1 in the counter 127. The AND gate 1401 has two inputs in addition to the +K1* input; the $+\overline{K8}$ signal and the +L4 signal. The $+\overline{K8}$ signal is present from the control logic 118 in FIGURE 9 unless a "copy" operation is in sequence, and the +L4 signal is present if any one of the four signals −K13, −K64, −K7 and −K4 is present at the OR gates 1447 and 1448. The −K7 is present at this time as described above in reference to FIGURE 9 as it indicates a Teletype input or receive sequence of operations has been initiated. The flip-flops 14S1 in the counter 127 is, accordingly, set by the +K1* signal from the logic 118.

The purpose of the sequence counter 127 and the associated logic in the sequence control logic 125 is to select and time a number of different sub-operations that are carried out within the framework of the various commands. Such operations, illustratively, include reading of a character, writing of a character, resetting a mark, receiving an input, providing an output, erasing a store, etc. For every one of the commands, a set of these sub-operations are carried out in a predetermined timed sequence and the selection of these sub-operations and their timing is a function of the counter 127 and the logic 125.

As indicated above, the sequence counter 127 includes five flip-flops 14S1 through 14S5. When any command is initiated, one of the flip-flops 14S1 through 14S5 is set to its "1" state or condition. After the particular operation provided by this state of the counter 127 has been completed, the "1" condition of the set flip-flop is shifted to the next flip-flop and so on until finally the flip-flop 14S5 is set. When the flip-flop 14S5 is set, it may either recirculate to the flip-flop 14S4 or it may produce a command reset signal −S6 to terminate the operation. The selection and timing functions provided by each of the flip-flops 14S1 through 14S5 is hereinafter described in detail. Briefly, the different sub-operations which are carried out during the different states of the sequence counter 127 are tabulated below:

| Sequence State | Sub-Operation |
|---|---|
| 14S1 | a. Erase upper display. |
| | b. Erase lower display. |
| | c. Skip (advance) mark. |
| | d. Backspace mark. |
| | e. CR mark. |
| | f. Teletype output LTR code. |
| | g. Erase mark. |
| 14S2 | a. Reset read mark. |
| 14S3 | a. Reset write mark. |
| 14S4 | a. Read drum. |
| | b. Keyboard input. |
| | c. Receive. |
| 14S5 | a. Write on drum. |
| | b. Send. |

If a particular sequence is to be omitted because the particular operation initiating in that sequence state is not required, the sequence counter 127 is automatically advanced by a no-step signal −L15 (FIG. 14) which is also hereinafter further described. The sub-operations carried out for the different commands C1 through C21 are tabulated below:

TABLE B

| Code | Operation | S1 | S2 | S3 | S4 | S5 |
|---|---|---|---|---|---|---|
| C1 | Keyboard Entry | ---- | ---- | ---- | ---- | a |
| C2 | Receive | a | ---- | a | c | *a |
| C3 | Send | f | a | ---- | a | *b |
| C4 | Enter Message 1 | ---- | a | ---- | a | *a |
| C5 | Enter Message 2 | ---- | a | ---- | a | *a |
| C6 | Record Message 1 | ---- | a | a | a | *a |
| C7 | Record Message 2 | ---- | a | a | a | *a |
| C8 | Copy Character | ---- | ---- | ---- | a | a |
| C9 | Copy Word | ---- | ---- | ---- | a | *a |
| C10 | Copy Line | ---- | ---- | ---- | a | *a |
| C11 | Copy Message | ---- | ---- | ---- | a | *a |
| C12 | Skip Mark Lower | c | ---- | ---- | ---- | ---- |
| C13 | Skip Mark Upper | c | ---- | ---- | ---- | ---- |
| C14 | Reset Mark Lower | g | a | ---- | ---- | ---- |
| C15 | Reset Mark Upper | g | a | ---- | ---- | ---- |
| C16 | Backspace Mark Lower | D | ---- | ---- | ---- | ---- |
| C17 | Backspace Mark Upper | d | ---- | ---- | ---- | ---- |
| C18 | CR Mark Lower | e | ---- | ---- | ---- | ---- |
| C19 | CR Mark Upper | e | ---- | ---- | ---- | ---- |
| C20 | Erase Display Lower | b | ---- | a | ---- | ---- |
| C21 | Erase Display Upper | a | ---- | a | ---- | ---- |

The small letters *a* through *f* in the table identify the particular sub-operations for the different sequence states listed above. The asterisk (*) indicates recirculation between the flip-flops 14S5 and 14S4. Referring to Table B, it is apparent that for the command C2, which is the receive command being described, the state of the counter 127 in which the flip-flop 14S1 is set, provides for the sub-operation of function of erasing the upper display. As is further illustrated in Table B, during the state in which the flip-flop 14S2 is set, no sequence is provided; when the flip-flop 14S3 is set, the write mark is reset; when the flip-flop 14S4 is set, a character is received; and when the flip-flop 14S5 is set, the character is written on the drum 64.

These five sub-operations are now described in order starting with the upper display erase operation which is initiated when the flip-flop 14S1 is set. Referring now again to the control logic 118, the −K7 (Teletype input) signal from the gate 906 is provided also to the OR gate 1001 in FIGURE 10. The signal +K12 from the gate 1001 is provided to an AND gate 1002. A second input to the AND gate 1002 is designated +S1 and this input is provided from the flip-flop 14S1 of the sequence counter 127. The third input to the AND gate 1002 is the upper origin pulse which is provided from FIGURE 24. As described above, the upper origin pulse +UOP is developed in the pulse generator 123 at the beginning of the recording or reproducing sequence for the upper store. This pulse is developed under control of the engraved marks on the track 93 of the magnetic drum 64. In FIGURE 10, the gate 1002 is, accordingly, enabled after the flip-flop 14S1 in the sequence counter 127 has been set when the upper origin pulse is received. The enabled gate 1002 provides a negative pulse −K14 to set the erase flip-flop 10Q4.

When the flip-flop circuit 10Q4 is set, it provides a +Q4 signal to an AND gate 1814 in the read register 102 at the bottom of FIGURE 18. The other input to the AND gate 1814 is the +Y pulse from the clock circuit 122 in FIGURE 25. When the +Y clock pulse arrives, the AND gate 1814 provides a negative pulse −P15 to reset the two flip-flops 18R3 and 18RF of the read register 102. Each succeeding +Y pulse provides for an additional reset pulse −P15 to reset the flip-flops 18R3 and 18RF. The AND gate 1814 provides the −P15 pulse through an OR gate 1815 to the flip-flop 18RF and through an OR gate 1872 to the flip-flop 18R3. The two flip-flops 18R3 and 18RF at the outputs of the respective two halves of the read register 102 are, accordingly, successively reset during each bit time by the +Y clock pulses as long as the erase flip-flop 10Q4 remains set.

The output of the flip-flop 18RF is provided through emitter followers 1816 and 1817 to four AND gates 1801 through 1804 at the output of the read register 102. The outputs of the flip-flop 1803 are similarly provided through emitter followers 1818 and 1819 to four AND gates 1805 through 1808. With the flip-flops 18RF and 18R3 reset, positive potentials $+\overline{RF}$ and $+\overline{R3}$ are provided through the emitter followers 1817 and 1819, respectively. The positive potential $+\overline{RF}$ at the output of the flip-flop 18RF is provided through the emitter follower 1817 to the AND gates 1802 and 1803. A second input to the AND gate 1802 is the +Z clock pulse and a second input to the AND gate 1803 is the +X clock pulse. As indicated in the curves of FIGURE 31, the +X clock pulse precedes the +Z clock pulse during each bit so that the AND gate 1803 is enabled before the AND gate 1802 is enabled. The third control potential to the AND gates 1802 and 1803 and to the other AND gates 1801 and 1804, as well, is the +K41 potential from the control logic 118 in FIGURE 10.

Referring now to FIGURE 10, the +K41 signal is provided responsive to the operation of the erase flip-flop 10Q4. The −Q4 signal is provided through an OR gate 1004 and an emitter follower 1005 to the +K41 lead. In this manner, when the erase flip-flop 10Q4 is set, it provides first for the −P15 pulse in the read register to make sure that the flip-flops 18RF and 18R3 are reset and, second, it provides an enabling potential to the four AND gates 1801 through 1804 at the output of the flip-flop 18RF and also to the four AND gates 1805 through 1808 at the output of the flip-flop 18R3. The control circuitry for the AND gates 1805 through 1808 is substantially similar to that for the AND gates 1801 through 1804. The positive potential through the emitter follower 1819 from the flip-flop 18R3 is provided to the AND gates 1806 and 1807. When the +X clock pulse arrives, it enables the AND gates 1805 and 1807, and thereafter, when the clock pulse +Z arrives, it enables the AND gates 1808 and 1806. Each pair of clock pulses X and Z provides for this combination as long as the write flip-flop 10Q4 remains set. As is hereinafter described, the pair of clock pulses X and Z for each bit generate a dipulse for recording on the magnetic drum 64. This type of recording is referred to in the art as the Williams type recording and the digital information is indicated by the relaitve polarities of the two halves of the dipulse.

The negative potential from the AND gate 1803 is provided to an OR gate 1810, and therefrom to a writing driver or amplifier 2906 shown in FIGURE 29. The switch 100 shown in FIGURE 29 was described above in the display operation section of the detail description. The positive potential is provided from the amplifier 2906 to the head 74 adjacent the track 84. The pulse from the AND gate 1802 is provided to the OR gate 1809 which provides a positive pulse to the writing driver 2905. The two pulses from the drivers or amplifiers 2906 and 2905 provide for a dipulse of particular polarity indicating a "0" digit to be recorded on the magnetic drum 64.

The display heads 74 and 75 are enabled at this time due to the absence of the +K38 signal from the control logic 118 in FIGURE 10. As described above, this signal is present when the display tracks 86 and 87 are to be used.

In a similar manner, the output of the flip-flop 18R3 is coupled through the AND gates 1806 and 1807 and the OR gates 1811 and 1812 to the drivers or amplifiers 2903 and 2904, which are associated with the information head switch 100. The dipulses to the drivers 2903 and 2904, energize the head 75 to record in the track 85. The writing of the zero digits continues in this manner, digit after digit, in the upper display store of the tracks 84 and 85 until the +LOP pulse indicating the beginning of the lower display store is reached. When the LOP pulse is provided from the generator 123, the entire upper display has been erased because the erasing procedure commenced with the upper origin pulse +UOP. As described above, the +UOP pulse from the generator 123 in FIGURE 24 is provided to enable the AND gate 1002 in the control logic 118 to set the erase flip-flop 10Q4. The +LOP pulse is provided from the generator 123 depicted in FIGURE 24 to reset the flip-flop 10Q4 to halt the erasing sequence.

Referring now to FIGURE 10, which includes part of the control logic 118, the +LOP pulse enables an AND gate 1007, shown in the lower portion of the figure. The AND gate 1007 has three input terminals, one of which is the +LOP lead. The second terminal is the +S1 lead from the sequence counter. Since the flip-flop 14S1 is set at this time, the +S1 signal is provided to the AND gate 1007. The third input to the AND gate 1007 is a +K12 signal from the OR gate 1001. The +K12 signal is provided from the OR gate 1001, as described above, when the −K7 signal is provided from the OR gate 906. The −K7 signal indicates that a Teletype input is to be received. The −K7 signal, accordingly, provides for a positive enabling potential to the AND gate 1007 so that when the +LOP, lower origin pulse, arrives, the AND gate 1007 is enabled to reset the erase flip-flop 10Q4 and to provide for an erase done, −D3, signal. The −D3 signal is provided from a gate 1010 connected by an OR gate 1011 to the output of the AND gate 1007.

To briefly recapitulate, the upper origin pulse +UOP sets the flip-flop circuit 10Q4 to initiate the erase sequence of the upper display store after the sequence counter 127 is reset, and the lower origin pulse +LOP terminates the erasing sequence by resetting the flip-flop 10Q4 and by providing for the −D3 erase done signal. When the flip-flop 10Q4 is reset, it removes the enabling potential from the OR gate 1004 which, in turn, removes the +K41 signal from the eight AND gates 1801 through 1808 at the output of the read register 102. This terminates the erasure of the upper display which took place between +UOP and +LOP pulses from the circuit 123 during one revolution of the drum 64.

The erase done signal, −D3, from FIGURE 10 of the control logic 118 is provided to trigger a multivibrator 14Q7 in the sequence control logic 125 associated with the counter 127 in FIGURE 14. The multivibrator 14Q7 provides for a shift pulse −P11 to shift the sequence counter 127 from its first condition where the flip-flop 14S1 is set to its second condition when the flip-flop 14S2 is set. A positive potential from the multivibrator 14Q7 is provided to an AND gate 1407. The other input to the AND gate 1407 is a +L3 signal from an OR gate 1408. The +L3 signal is present as long as the flip-flop 14S5 of the counter 127 is not in its set or "1" condition. The +S5 signal is provided to a gate 1410 which provides the negative signal −L17 to the OR gate 1408 and therefore, the +L3 enabling potential to the AND gate 1407.

The multivibrator 14Q7, accordingly, develops a −P11 shift pulse from an emitter follower 1411 connected to the output of the AND gate 1407. The −P11 shift pulse is coupled to diodes at the output of each stage of the sequence counter 127 to provide for the shift. Each stage includes a flip-flop, at least one emitter follower and a diode connected to the shift lead −P11. Responsive to the shift pulse −P11, the flip-flop 14S2 is set and the flip-flop 14S1 is reset.

Referring to the above Table B, when the counter 14S2 is set, no operation is to be carried out for the receive command C2 so that a no-step signal −L15 is automatically provided to shift the sequence counter 127 to set its flip-flop 14S3 and reset its flip-flop 14S2. The no-step signal is developed from an AND gate 1414 in the lower right hand portion of FIGURE 14. The AND gate 1414 has three input terminals; one connected to the output of the flip-flop 14S2, a second connected to the flip-flop 8I7 in the control register 132 and a third connected to the −K8 lead from the emitter follower 915 in the control logic 118. A −K8 signal is provided when a copy sequence is in progress. Since a copy sequence is not in progress, the −K8 signal is not present, as indicated by the bar over the signal indicated in FIGURE 14. For the sequence of operations in progress, the flip-flops 8I2, 8I4, 8I5 and 8I8 are set, but the flip-flop 8I7 is not set at this time so that the $+\overline{I7}$ signal is present. The AND gate 1414 is, accordingly, enabled to provide a negative pulse to the OR gate 1416. A positive pulse from the OR gate 1416 is introduced to an AND gate 1417 and is identified as a +L9 pulse. A second input to the AND gate 1417 is the +K1 signal from FIGURE 9 which is present when any command is in progress. The third input is the +Y clock pulse which develops the −L15 pulse through an OR gate 1419 to trigger the multivibrator 14Q7. In this manner, for this particular sequence, which is initated by depressing the receive button 2C2 on the keyboard 51, when the flip-flop 14S2 is set in the sequence counter 127, it automatically provides for the development of a shift pulse −P11 to set the flip-flop 14S3. The shift pulse −P11 is developed responsive to the successive operation of the multivibrator 14Q7, the AND gate 1407 and the emitter follower 1411. No function is, accordingly, provided during the second step of the sequence counter 127 for this particular sequence of operations.

As indicated in the above Table B, when the third stage of the sequence counter 127 is set, the upper display mark is reset to indicate that the message is to be entered commencing at the beginning point of the upper display. When the sequence counter 127 steps to provide the +S3 signal, an AND gate 1012 in the control logic 118 is enabled. The other two inputs to the AND gate 1012 are the $-\overline{K8}$ lead, which is negative for a copy operation, and the +I8 lead from the flip-flop 8I8 in the control register 132. When the flip-flop 14S3 is set, the AND gate 1012 generates a −K38 signal to an OR gate 1013. The output pulse from the OR gate 1013, which is designated +K14 and indicates that an address mark can be written on the drum 64, is introduced to an AND gate 1015. A second input to the AND gate 1015 is the +I5 signal which indicates a writing operation in an upper store, and a third input to the AND gate 1015 is from two multivibrators 10Q9 and 10Q8 which are operated to provide a disabling potential to the AND gate 1015 when the paths from the storage facilities are to be changed. Neither of these multivibrators 10Q9 and 10Q8 are operated at this time so that a positive enabling potential is at the input of the AND gate 1015. In this manner, a −K34 signal is provided from the AND gate 1015 to an OR gate 1016. The positive potential at the output of the OR gate 1016 is designated as +K36 and it identifies the upper mark as the mark which is to be written. The +K36 signal is provided to the mark control logic 116 in FIGURE 15 to provide for resetting the upper mark. As is hereinafter described, the resetting operation is in two stages: first to find and erase the mark in the track 88 in FIGURE 16; and second to record a mark at the start position for the upper display store in the track 88.

Four address marks are recorded on the magnetic drum: two in the mark display track 88; and two in the mark message track 90. In each of the tracks 88 and 90 in FIGURE 16, one mark is for the upper store and one mark is for the lower store. The marks serve the purpose of identifying character positions and the marks for the upper and lower display stores may be shifted to any character position under control of the keyboard 51. In the message stores, the marks are not externally addressable.

There are two heads associated with each of the two mark tracks 88 and 90. The heads 78 and 79 are associated with the track 88, and the heads 80 and 81 are associated with the track 90. The heads 79 and 81 are utilized for reading marks recorded respectively in the tracks 88 and 90, and the heads 78 and 80 are utilized for recording new marks respectively in the tracks 88 and 90. The heads 78 and 80 are respectively positioned at a distance equivalent to two characters (6 bits) along the drum 64 behind the heads 79 and 81. A position on the drum 64, accordingly, first passes adjacent a reading head (79 and 81) and then two characters later adjacent the associated writing head (78 and 80).

As described above, when the flip-flop 14S3 in the counter is set, the +K36 signal is developed in the control logic 118 at the gate 1016 to indicate that upper mark is to be written. As also described above, the input Teletype information is to be entered to the upper display store which has been erased. In the mark control logic 116, the +K36 signal from the control logic 118 is provided to an AND gate 1514 at the left central portion of FIGURE 15. The second input to the AND gate 1514 is the +U signal from the origin and line pulse generator 123 in FIGURE 24. As described above, the +U pulse is present during one-half of the sequence during which the upper stores are being read. The AND gate 1514 is part of a composite AND gate together with an AND gate 1516. As shown in FIGURE 15, the outputs of the two AND gates 1514 and 1516 are connected together and to an OR gate 1515.

The AND gate 1516 has three inputs, with the first of the three inputs being from the mark trace reading amplifier 16RA in FIGURE 16. The display mark track 88 is being read at this time instead of the message mark track 90 because the switch 101 in FIGURE 16 is set by the $+\overline{K38}$ signal from the control logic 118. The two heads 78 and 79 are, accordingly, enabled and the two heads 80 and 81 are disabled. When the mark on the track 88 is sensed by the head 79, a pulse is provided to the amplifier 16RA. The switch 101 also functions to couple the drivers 1605 and 1626 to the head 78. As is herinafter described, the driver 1626 is operated to erase a recorded mark and the driver 1605 is operated to record a mark. A positive signal is provided from the amplifier 16RA to the AND gate 1516 responsive to sensing a mark in the track 88.

A second input is provided to the AND gate 1516 from a block mark flip-flop 15Q20 which provides a negative potential when it is set. The flip-flop 15Q20 is not, however, set at this time so that a positive potential is provided to enable the AND gate 1516. The third input to the AND gate 1516 is from a lead $+\overline{K65}$ from the control logic 118 in FIGURE 10. A negative potential appears on this lead when a switching sequence of the display and permanent stores is in progress. At this time, however, a positive signal appears upon the store switching lead to the AND gate 1516 so that the AND gate 1516 as well as AND gate 1514 is enabled.

With both gates 1516 and 1514 enabled, a negative pulse −M12 is provided to the OR gate 1515 when the mark is read from the mark display track 88 on the drum 64. The positive pulse from the OR gate 1515 is provided to a flip-flop 15CM in the mark counter 119 causing it to be set. When the flip-flop 15CM is set, it in turn sets the flip-flop 15Q20 mentioned above, and the flip-flop 15Q20 thereupon disables the AND gate 1516 to prevent any succeeding pulses from being provided to the flip-flop 15CM.

The purpose of the mark counter 119 is to indicate the time at which the desired character location in the tracks 85 through 87 is under the read-write heads 74 to 77, and to move the mark to indicate the next character position. As is hereinafter described, the old mark is erased when the flip-flop 15C2 is set and in addition the underscore generator 112 in FIGURE 22 is operated.

After the flip-flop 15CM is set responsive to reading the mark in the upper store of the track 88, a shift pulse −P9 is provided from an AND gate 1536 at the center of FIGURE 15 and through an emitter follower 1537 to shift the set condition of the mark counter 119 from the flip-flop 15CM to the flip-flop 15C1. The mark counter 119 includes the flip-flop 15CM and three flip-flops 15C1 through 15C3 connected together as a four stage shift register. The AND gate 1536 forms a composite AND gate together with a gate 1538 which is enabled at this time. The AND gate 1536 is enabled when a +Y pulse is provided from the clock circuit in FIGURE 25 and the bit counter 126 is set to its third stage. The inputs to the AND gate 1536 are respectively from the bit counter 126 on the +B3 lead from the generator 122 on the +Y lead and from an AND gate 1535.

When the AND gate 1535 is enabled, it disables the AND gate 1536 by providing a negative potential −M11 thereto. The AND gate 1535 is not, however, enabled at this time so that the AND gate 1536 does become enabled when both the +B3 and +Y are present. As is hereinafter described, the AND gate 1535 disables the gate 1536 when the multivibrator 15Q1 is not triggered and the flip-flop 15C3 is set, and the composite OR gate 1530 and 1533 is enabled by any of several signals. When the gate 1536 is operated, shift pulses −P9 are provided to the mark counter 119 to successively set the flip-flop 15C1 through 15C3. The shift pulses occur at three bit intervals under control of the +B3 signal from the bit counter 126 to the gate 1536.

When the flip-flop circuit 15C1 is set, it provides a +C1 signal to an AND gate 1601 in FIGURE 16. During the second bit time, the +B2 signal is provided to the AND gate 1601 but the gate 1601 remains disabled. The third input to the gate 1601 is the +K16 back space signal which is present only when either of the command keys 2C16 and 2C17 of the keyboard 51 is operated. The next −P9 shift pulse from the AND gate 1536 sets the flip-flop 15C2. The flip-flop 15C1, accordingly, does not perform any function when it is first set responsive to the −P9 shift pulse. During a mark back-space sequence, the mark is recorded when the flip-flop 15C1 is set ahead of the old recorded mark and then when the flip-flop 15C2 is set the old mark is erased. The mark, back-space sequence is hereinafter described in a separate section of the specification.

When the flip-flop 15C2 is set, the old mark is erased. The old mark was sensed by the head 79 which set the flip-flop 15CM of the counter 119. As is hereinafter further described, the mark is always recorded during the existence of the +B2 pulse from the bit counter 126. The AND gates 1601 and 1602 to the recording driver 1605 are enabled by the +B2 pulse. When the +B3 pulse is provided, the first −P9 shift pulse sets the flip-flop 15C1. One character time, or three bits later, when the next +B3 pulse arrives, the second −P9 shift pulse sets the flip-flop 15C2. During this time, the mark in the upper store of track 88 moves the head 79 towards the head 78. As described above, the two heads 79 and 78 are separated by two characters or six bits. The +C2 signal from the flip-flop 15C2 is provided four bits after the mark is sensed in track 88.

The +C2 pulse initiates an erasure of a portion of the track 88 including the recorded mark. A larger portion of the track is erased to insure that the old mark is completely erased. The +C2 pulse is provided to the AND gate 1625. The other two inputs to the gate, the $+\overline{K24}$ display signal and the stop erase mark input −M23 are both positive at this time. The lead −M23 becomes negative only when the mark is not to be erased. For example, when particular input codes from the remote Teletype transmitter such as the functional codes for figures or letters are received, the old mark is not erased and a new mark is not recorded.

The AND gate 1625 provides a pulse through the switch 101 to the head 78 for erasing the old mark. The erase signal continues until the flip-flop 15C2 is reset, which occurs after three bits when the +B3 pulse is again present at the AND gate 1536. The erasure continues, therefore, through bit times 5, 6 and 7 following the sensing of the mark. With the heads 78 and 79 being spaced apart by six bits, the erasure, therefore, overlaps the mark on both sides.

When the +C2 pulse is provided from the mark counter 119, it also functions to provide for the display of an underscore mark on the face of the display tube 57. The +C2 pulse is provided to the underscore generator 112 in FIGURE 22. The underscore generator 112 functions to gate the high frequency vertical sweep signal provided from a sweep circuit 2204 to the video amplifier 115. The video amplifier 115 is coupled to the control grid of the display tube 57. The underscore generator 112, accordingly, functions to provide signals to the display tube 57 to develop a short, bright line under the character position marked by the mark sensed in the mark display track 88. As successive input characters are introduced to the data composer apparatus 50, the underscore generator 112 is operated by the +C2 pulse to step the underscore mark along the upper display provided by the tube 57. Even though the signals recorded in the display tracks are not provided to the display circuitry shown in FIGURE 22 to provide for a display thereof during which time that an input character is being received, the underscore mark in the upper as well as the lower displays are continuously reproduced by the tube 57 each time they are sensed by the head 79 in FIGURE 16.

As described above the mark erasure continues until the flip-flop 15C2 is reset. The next −P9 shift pulse resets the flip-flop 15C2 and sets the flip-flop 15C3. The +C3 pulse is provided to AND gates 1501 and 1505 at the left of FIGURE 15. The AND gate 1505 is operated when the +LOP, lower origin pulse, is thereafter provided from the generator 123 in FIGURE 24. The gate 1501, however, is operated by the flip-flop 15C3. A second input to the gate 1501 is the $+\overline{K64}$ or −K64 signal from the control logic 118 which is positive except when a command reset is indicated at the keyboard 51. A third input to the gate 1501 is from an OR gate 1504 which is enabled at this time by the −K25 mark reset signal from the gate in the control logic 118. The gate 1501, accordingly, provides a −M31 signal to an OR gate 1503 responsive to the +C3 signal.

The gate 1503 provides a positive signal to set the flip-flop 15Q5. The flip-flop 15Q5 enables an OR gate 1533 which provides a positive potential to the AND gate 1535 which is, accordingly, enabled. The third input to the AND gate 1535 is from a multivibrator 15Q1 which is positive when normal or not operated. The AND gate 1535 disables the gate 1536 to inhibit the shift pulses −P9. The +C3 pulse, accordingly stops the shift pulses −P9.

The +C3 pulse also functions to block the recording of a mark in the track 88 until the +UOP, upper origin pulse, is detected. The −M11 disabling potential from the gate 1535 to the gate 1536 responsive to the +C3 signal also is provided to an OR gate 1610 which provides a +M24 signal to a gate 1615. The negative potential $+\overline{M24}$ from the gate 1615 disables the gate 1602 coupled in the path to the driver 1605. As long as the shift pulses −P9 are inhibited by the −M11 signal, recording of the mark in the track 88 is also inhibited.

When the +LOP pulse arrives at the gate 1505 at the input of the flip-flop 15Q5, it provides an additional set potential to the flip-flop 15Q5. The shift pulses −P9 and the stop mark signal $+\overline{M24}$ remain until the +UOP pulse is received at the mark control logic 116.

When the +UOP (upper origin) pulse arrives, it enables an AND gate 1508 at the output of the flip-flop 15Q5 to trigger the multivibrator 15Q1 and to reset the counter 119 to flip-flop 15C1. The AND gate 1508 provides a pulse through an OR gate 1510 to an AND gate 1511. The third input to the AND gate 1508 is the +K36 signal from the control logic 118. The second input to the AND gate 1511 is a $+\overline{K24}$ lead which is positive except when display is being provided. The AND gate 1511 is, accordingly, enabled to provide a −M9 signal to trigger the multivibrator 15Q1. The multivibrator 15Q1 provides for a negative disabling potential to the AND gate 1535. Due to both the flip-flop 15Q5 and the multivibrator 15Q1, the AND gate 1535 is, accordingly, disabled to restart the shift pulses −P9 from the AND gate 1536 to the mark counter 119. The $+\overline{M24}$ disabling potential is simultaneously removed from the gate 1602.

The −M9 pulse to the multivibrator 15Q1 is also provided to the mark counter 119 to set the flip-flop 15C1 and to reset the flip-flop 15C3. Accordingly, at the same time that the multivibrator 15Q1 is triggered, a pulse is provided to the counter 119 to set the flip-flop 15C1. The multivibrator 15Q1 may have a duration, illustratively, of 200 microseconds which is equivalent to the duration of five characters.

The counter 119 is thereafter shifted from the flip-flop 15C1 to flip-flop 15C3 by the first two shift pulses −P9 after the gate 1536 is enabled. As described above, this represents an interval of two characters because the shift pulses are provided during successive +B3 signals. The +C3 signal now provides for recording a mark in the track 88 two characters after the +UOP pulses and during the +B2 signal. The +C3 signal provides for recording the mark because it enables an AND gate 1602 to provide for the −M16 pulse when the +B2 signal arrives. An OR gate 1603 is enabled to provide a +M17 pulse to an AND gate 1604. The AND gate 1604 has a second input $+\overline{K24}$ and a third input +X from the clock circuit 122 in FIGURE 25. When the clock pulse +X arrives, the AND gate 1604 energizes the write driver 1605 to provide for recording the mark pulse in the track 88.

The potential −M11 from the AND gate 1535 is also provided to an AND gate 1550 at the right of FIGURE 15. When the multivibrator 15Q1 is operated, the potential on the lead −M11 is positive, as described above. A second input to the AND gate 1550 is the +C3 signal from the flip-flop 15C3 and a third input is the +B3 input from the bit counter 126. Accordingly, when the flip-flop 15C3 is set to record the mark, it also enables the AND gate 1550. The AND gate 1550 provides a pulse −M30 to an OR gate 1551, and the OR gate 1551 provides a positive pulse to an AND gate 1548 and to a gate 1552. The other input $+\overline{K24}$ to the AND gate 1548 is positive except when a display is being provided. The AND gate 1548 is, accordingly, enabled and develops a −D4A pulse indicating that the mark is done or has been recorded. The gate 1552 develops the −D4B mark done pulse.

The mark done pulse −D4B from the AND gate 1548 is provided to the sequence counter 127 to shift it to set the flip-flop 14S4 and reset the flip-flop 14S3. In the sequence control logic 125, the −D4B pulse functions to trigger the multivibrator 14Q7 which was described above. The multivibrator 14Q7 develops a shift pulse at the lead −P11 for shifting the counter 127 to set the flip-flop 14S4 and reset the flip-flop 14S3.

Referring to Table B above, the input information is received when the flip-flop 14S4 is set, the mark was reset as just described during the time the flip-flop 14S3 was set. In the control logic 118, FIGURE 9, the +S4 pulse from the counter 127 enables an AND gate 908 to set a flip-flop 9Q11. The other two inputs to the AND gate 908 are the +I2 pulse from the register 132 and the +K7 signal from the OR gate 907. As described above, the +K7 pulse indicates that a Teletype input is to be received and this signal is provided when the flip-flop 8I2 and the flip-flop 8I4 are set. The flip-flop 8I1 is not set at this time so that the AND gate 904 coupled to gate 905 is enabled to develop the +K2 signal which in turn provides for the +K7 signal. In this manner the flip-flop 9Q11 is set when the flip-flop 14S4 in the sequence counter 127 is set.

When the flip-flop 9Q11 is set, it provides an enabling pulse to the remote Teletype transmitter 61 to indicate that the data composer apparatus 50 is ready to receive input information. The +Q11 signal is provided to a multivibrator 1703 in the input control 72 in FIGURE 17 to develop the enabling pulse transmitted to the remote transmitter 61.

In the conventional transmission teletype code each five bit character is preceded by a start pulse. The start pulses are provided from the remote transmitter 61 to an input commutator 95 and also to a magnetic clutch 1782 associated therewith. The clutch 1782 is released by the start pulse to provide for the rotation of the armature 136 of the input commutator 95 in direct synchronization with the Teletype signals from the remote transmitter. A cam 1705 is coupled to the armature 136 and rotates therewith. The cam 1705 provides for a negative potential through contacts associated therewith during the time that the armature 136 successively engages the five conductive segments A–E of the commutator 95. At the start position corresponding to the upper sector of the commutator 95 in FIGURE 17, the contacts associated with the cam 1705 are open. The pulse developed by the cam 1705 precedes the first of the 5 bits of each character, and it functions to set a flip-flop 17Q23 which remains set during the duration spanning the five input bits of each Teletype character. The leading edge of the positive pulse from the flip-flop 17Q23 is differentiated and the differentiated pulse is provided to a gate 1707 at the upper right corner of FIGURE 17. The +P13 pulse from the gate 1707 is a read register clear signal and it causes the read register 102 in FIGURE 18 to be reset in readiness for the coded information in the five bit character following the start pulse.

The positive pulse +P13 from the OR gate 1707 is coupled to a gate 1723 which inverts the polarity of the pulse and the inverted pulse −P13 is provided through an emitter follower 1724 and lead 15 to the read register 102 in FIGURE 18. In the read register 102 the negative clear pulse −P13 from the emitter follower 1824 is provided to a number of OR gates 1815, 1840, 1841, 1845, 1853 and 1858 which are individually associated with the flip-flops 18RF and 18R5 through 18R1 of the read register 102. The clear pulses through the OR gates 1815, 1840, 1841, 1845, 1853 and 1858 insure that all six flip-flops 18RF and 18R5 through 18R1 of the read register 102 are reset at the beginning of each character.

In this manner when the armature 136 of the input commutator 95 of FIGURE 17 initiates its rotation from the upper vertical position of the armature 136, the flip-flop 17Q23 is set and the leading edge of the pulse resets the six flip-flops 18RF and 18R5 through 18R1 in the read register 102. Thereafter the armature 136 successively contacts the segments A through E of the commutator 95. The rotation of the armature 136 is at a speed corresponding with the conventional Teletype code speed. The armature 136 accordingly successively contacts the segments A through E in step with the successive bits of the five digit code. The Teletype code, which is illustrated in Table C above in the general description, is different for each character with the unique combination of the segments A through E being energized for each character.

The signals at the segments A through E are provided respectively through the filters 1740 through 1744 to the five OR gates 1834, 1835, 1842, 1851 and 1857. These OR gates are connected respectively to the five flip-flops 18R5 through 18R1 which are accordingly set in accordance with the coded Teletype signals provided through the input commutator 95. The input commutator 95 accordingly distributes the five bit serially coded signals to parallel circuits terminating at the flip-flops 18R5 through 18R1.

The flip-flop 18RF is controlled by the shift status circuit 104 in FIGURE 17 and by the input developed from the trailing edge of the pulse from the flip-flop 17Q23. When the cam 1705 releases or opens the contacts 1750, the flip-flop 17Q23 is returned to its normal condition or reset. The trailing edge of the pulse is differentiated at a capacitor 1711 at the output of an OR gate 1710 coupled to the flip-flop 17Q23. The differentiated pulse is coupled through an OR gate 1712 to the AND gate 1701. The other input to the AND gate 1701 is the +K7 signal from the control logic 118 in FIGURE 9. The −D7 signal at the output of the AND gate 1701 is provided to an OR gate 1721 and therefrom a positive pulse is provided through lead 5 to an AND gate 1860 in FIGURE 18. The other input to the AND gate 1860 is from the shift status flip-flop 17Q2 in the shift status circuit 104 in FIGURE 17. The status of the flip-flop 17Q2 is determined by a function decoder 124 in FIGURE 19 so that the AND gate 1860 is operated for particular conditions controlled by the decoder 124. The AND gate 1860 is connected to the set input of the flip-flop 18RF which is, accordingly, controlled by the input information provided to the decoder 124.

The signals registered in the flip-flops 18R1 through 18R5 of the read register 102 in FIGURE 18 are decoded in the function decoder 124. The purpose of the function decoder 124 is to detect the presence of certain codes in the read register 102. The detected functions are tabulated below in Table D:

TABLE D

| Signal | Function | Code | Action Taken |
|---|---|---|---|
| F9 | FIG | 11011 | Receive & KB Input: Stop writing and mark skipping; change Shift Status to FIG; then receive next character. |
| F10 | LTR | 11111 | Send & KB Input: Same as above except change Shift Status to LTR. |
| F11 | CR | 00010 | Receive & KB Input: Stop writing advance mark to next line; wait for input. |
| F4 | BLANK | 00000 | Receive: Stop writing and mark advancing; wait for new input. KB Input: Write Blank (000000). Send: Insert CR code; advance mark to next line; transmit. |
| K10 | SPACE | 00100 | Copy Space: Stop copy operation (in word copy). |
| F6 | LINE FEED F (STOP). | 01000 | Stop Receive Operation. |

The function decoder 124 includes twelve AND gates 1901 through 1912 which are selectively energized in accordance with the particular Teletype code registered in the register 102. When the code 11011 for "Fig." is provide, the AND gate 1905 is operated and when the code 11111 for "LTR" is received, the AND gate 1903 is enabled. The negative signals from the AND gates 1905 and 1903 are provided respectively to the OR gates 1915 and 1914. The signal from the OR gate 1915 is designated as +F10 representing the "Figs." code and it is provided to the AND gate 1713 in the shift status 104 in FIGURE 17. The signal from the OR gate 1914 representing the LTR code is designated +F9 and it is provided to the AND gate 1704 in the shift status 104 in FIGURE 17. The two AND gates 1713 and 1704 are coupled respectively to the opposite inputs of the shift status flip-flop 17Q2. The other input to the AND gates 1713 and 1704 is from an OR gate 1702 having three inputs respectively designated −D2, −D7 and −G46. The −D7 signal, as indicated above, is provided from the AND gate 1701 to indicate that the character input has terminated. The −D7 signal, accordingly, enables the OR gate 1702 to provide for the operation of one or the other of the AND gates 1713 and 1704 if one of the particular respective codes has been received at this time.

Assume for the moment that the code for the letters 11111 designation has just been received at the register 102, the AND gate 1704 is then operated to set the shift status flip-flop 17Q2 to provide for a positive output at its right hand output terminal and negative output at its left hand output terminal. The shift status circuit 104 is utilized during keyboard input (C1 command), receive operations (C2 command) and send operation (C3 command) to determine the correct shift bit of the character for C1 and C2 commands and to detect a change in the value of the shift bit and to insert the proper shift function character for the C3 command.

With the flip-flop 17Q2 set for the letters code 11111, the left hand terminal of the flip-flop 17Q2 is connected through lead 3 to the AND gate 1860 in FIGURE 18. As described above, the other input to the AND gate 1860 is through lead 5 from the OR gate 1701 and designated as TT-input-done signal −D7. With the letters code being received, the flip-flop 17Q2 is set so that the input through lead 3 to the AND gate 1860 is negative and the AND gate 1860 is not enabled or operated for this condition. Conversely, if a code designating figures 11011 was received, a positive input would be provided from the flip-flop 17Q2 to operate the AND gate 1860. If the AND gate 1860 is operated, it sets the flip-flop 18RF, otherwise the flip-flop 18RF remains in its reset condition. As described above, the flip-flop 18RF is reset for each character at the beginning of a character input responsive to the −P13 clear signal. Actually, the +F9 and F10 pulses from the function decoder precede in time the character termination signal −D7 because the latter is developed from the trailing edge of the pulse from the flip-flop 17Q23. The flip-flop 17Q23 is reset by the −G1 pulse from the gate 1735 slightly after the armature 136 leaves the last segment E. In other words, the flip-flop 17Q23 is reset a predetermined interval following the contact of the segment E by the armature 136.

To briefly recapitulate, when the flip-flop 14S4 in the sequence counter 127 is set, it operates the control logic 118 to initiate the input reception of the Teletype coded input. The serially arranged five-bit character is distributed in parallel by the commutator 95 to the five stages 18R1 through 18R5 of the read register 102. The sixth stage 18RF is set to indicate the shift status. The shift status is changed when a letters or figures code is received and it remains the same between shift function codes. For the letters shift code, the flip-flop 18RF is reset and for the figures shift code it is set.

In the sequence control logic 125 in FIGURE 14, the −D7 input-done pulse from the gate 1701 is provided to the OR gate 1419 at the input of the multivibrator 14Q7. The multivibrator 14Q7 is, accordingly, triggered to provide a shift pulse −P11 to reset the flip-flop 14S4 and set the flip-flop 14S5. As indicated by the above Table B, when the flip-flop 14S5 is set, a writing sequence of the character in the read register 102 is initiated. With the flip-flop 14S5 set, the character recorded or registered in the read register 102 is, accordingly, registered on the magnetic drum 64 if the registered code is not a functional code such as for letters, figures, carriage return, line feed or blank code. The sequence of operations for these functional codes is hereinafter further described in detail.

In the control logic 118 in FIGURE 10, the +S5 signal from the sequence counter 127 is provided to an AND gate 1025. The other input to the AND gate 1025 is the +I4 signal from the control register 132. The −K22 signal from the AND gate 1025 is provided to an OR gate 1013 which develops the +K14 signal indicative of a mark write sequence. The +K14 signal is provided to the AND gate 1015 mentioned above, which is enabled by the +I5 and +$\overline{\mathbf{K65}}$ signals. The −K34 signal from the AND gate 1015 is provided to the OR gate 1016 which develops the +K36 signal which is utilized for finding the upper mark. In FIGURE 15, in the mark control logic 116, the AND gate 1514 is enabled by the +K36 signal when the +U signal from the generator 123 in FIGURE 24 is provided. The AND gate 1514 forms a composite AND gate together with the AND gate 1516, which was described above. One input to the AND gate 1516 is from the reading amplifier 16RA. When the recorded mark in the upper store of the track 88 is sensed, the AND gate 1516 is enabled. During any writing or reading sequence in the data composer 50, the mark in the selected store must first be formed to determine the address on the drum 64 for writing or reading signals.

The output of the composite AND gate responsive to the sensed mark, is provided to an OR gate 1515 which sets the flip-flop 15CM in the mark counter 119. When the flip-flop 15CM is set, it in turn sets the flip-flop 15Q20 to block the gates 1516, 1517 and 1518 until the mark counter 119 is reset. In the mark control logic 116 at the center of FIGURE 15 the AND gate 1536 is enabled during the bit signal +B3 when the Y clock pulse is received to provide the −P9 shift pulse to the mark counter *119*. The first shift pulse sets the flip-flop 15C1 and resets the flip-flop 15CM. When the flip-flop 15C1 is set, it indicates that the character in the read register 102 is to be written on the magnetic drum 64.

In the control logic 118 in FIGURE 10, the AND gate 1027 is enabled when the flip-flop 15C1 is set during the time that the +K22 write signal is present. As indicated above, the signal +K22 is present when the AND gate 1025 is operated. The third input to the AND gate 1027 is the −$\overline{\mathbf{K53}}$ signal which is the write inhibit signal and which is absent at this time so that a positive input is provided. The −K40 signal from the AND gate 1027 is provided to an OR gate 1004 to develop the +K41 write signal at the emitter follower 1005. The +K41 signal is provided to two sets of four AND gates, one consisting of the AND gates 1801 through 1805, and the other consisting of the AND gates 1805 through 1808. The eight AND gates 1801 through 1818 which were described above, are in the read register 102 at the outputs of the flip-flops 18RF and 18R5 through 19R1. The AND gates 1801 through 1808 are selectively enabled in accordance with the registered digits in the flip-flops of the read register 102. The outputs of the AND gates 1801 through 1808 are selectively connected to four OR gates 1809 through 1812 and these OR gates are connected to the four write drivers 2903 through 2906 in FIGURE 29.

The write drivers 1903 through 1906 are connected at the switch 100 coupled to the heads 74 and 75 associated with the magnetic drum 64. With the write AND gates 1801 through 1808 in the read register 102 enabled by the +K41 signal, the next pair of X and Z clock pulses samples the bit registered in the two flip-flops 18RF and 18R3. The head 74 in FIGURE 29 is energized in accordance with the registration in the flip-flop 18R3 to record the registered digit in the track 84, and the head 75 is energized in accordance with the registration in the flip-flop 18RF, to record the registered digit in the track 85.

To briefly recapitulate before proceeding with the rest of the writing sequence, when the mark recorded in the reset position in the upper store of the mark track 88 in FIGURE 16 is sensed, it sets the flip-flop 15CM of the mark counter 119 in FIGURE 15. In the above description for resetting the mark, the mark was recorded during the +B2 pulse from the bit register 126. The reset mark is, accordingly, sensed during the +B2 pulse. The next +B3 pulse shifts the counter 119 to the flip-flop 15C1 to start writing the character in the read register 102. The +C1 signal to the control logic 118 develops the +K41 signal for enabling the eight AND gates 1801 through 1808 at the output of the flip-flops 18RF and 18R3 to record the first pair of bits of the six bit character. The first pair of bits of the registered character is, accordingly, written or recorded during the +B3 pulse from the bit counter 126 in FIGURE 26.

Responsive to the +C1 signal from the counter 119, the read register shift pulses −P1 are generated at the control logic 118 in FIGURE 12 for successively shifting the second and third pairs of bits of the six bit character to the flip-flops 18RF and 18R3. As shown in FIGURE 12, the −K40 signal, developed at the AND gate 1027 responsive to the +C1 signal, is inverted at the gate 1241 and together with the +C1 and +Y signal enables an AND gate 1202 to develop the −K48 signal. The −K48 signal is provided to an OR gate 1204 which develops the +K50 signal to an AND gate 1205. The other input to the AND gate 1205 is from an AND gate 1206 which provides for a positive potential to the AND gate 1205 except when writing is to be inhibited.

Each +Y clock pulse, accordingly, develops a pulse at the emitter follower 1208 coupled to the output of the AND gate 1205 during the +C1 signal from the counter 119. As indicated above, the −P1 pulses are provided to shift the read register 102 in FIGURE 18. The flip-flop 15C1 in the mark counter remains set the duration of three bits under control of the bit counter 126. The mark counter is set to stage 15C2 after three bits by the next +B3 signal.

The first −P1 pulse shifts the bit information in the flip-flops 18R5 and 18R2 respectively, to the flip-flop 18RF and 18R3. The bit information in the flip-flops 18R4 and 18R1 is also shifted to the flip-flops 18R5 and 18R2, respectively. The two flip-flops are then sampled by the X and Z clock pulses during the +B1 signal. The second −P1 pulse again shifts the information in the read register 102 so that the last pair of bits can be sampled. This sampling takes place during the +B2 signal from the counter 126. All three pairs of the six bit registered characters are, accordingly, recorded during the time the flip-flop 15C1 in the counter 119 is set.

During the next +B3 signal, the flip-flop 15C1 is reset and the flip-flop 15C2 is set by the −P9 pulse shift. When the flip-flop 15C2 is set, the old mark in track 88 is erased. The +C2 signal enables the erase gate 1625 to apply an erase signal to the head 78. As described above, the two heads 79 and 78 are separated by a distance equivalent to two characters, or six bit times, so that the mark comes under the head 78 during the time the erase signal is applied.

During the next +B3 signal, the flip-flop 15C2 is reset by the −P9 shift pulse to stop the erase signal, and the flip-flop 15C3 is set. When the flip-flop 15C3 is set, the new mark is written when the +B2 pulse is received at the AND gate 1602. The −M16 pulse is provided to the OR gate 1603, provides an enabling pulse to the AND gate 1604. When the +X signal is received, the writing driver 1605 is energized to provide a pulse to the head 78 to write the mark in the mark track 88. The new mark is recorded in the track 88 exactly three bits or one character space behind the old erased mark because the successive shift pulses −P9 are spaced apart by three bits. One −P9 pulse functions to cause the erasure of the old mark, and the next −P9 pulse functions to cause the recording of the new mark.

To recapitulate, the mark is sensed to set the flip-flop 15C1. During the next bit, the flip-flop 15C1 is set to write the registered character in the tracks 74 and 75. One character time later, the flip-flop 15C2 is set to erase the old mark, and another character time later, the new mark is recorded.

The +C3 signal also readies the AND gate 1535 for disabling the shift pulses −P9 and for enabling the AND gate 1550 at the output of the flip-flop 15C3. The next +B3 signal from the bit register 126 energizes the AND gate 1550 in the mark control logic 116. The AND gate 1550 enables the OR gate 1551 to provide for the −D4A and −D4B pulses at the AND gates 1548 and 1552. The −D4A and −D4B pulses indicate that the mark has been recorded on the magnetic drum 64.

In FIGURE 14, the −D4B pulse triggers the multivibrator 14Q7 to step the sequence counter 127 from the flip-flop 14S5 back to the flip-flop 14S4. When the mark done signal −D4B is received, the multivibrator 14Q7 generates the sequence counter recirculating pulse +P10 instead of the shift pulse −P11. The reason for this is that the $+\overline{S5}$ signal is provided to the gate 1410. This signal is negative when the flip-flop 14S4 is set. The gate 1408 is, accordingly, disabled to enable the OR gate 1433 and disable the AND gate 1407. The OR gate 1433 enables the AND gate 1434. The gate 1434 is coupled by an emitter follower 1442 to the OR gate 1443 which inverts the signal from the gate 1434. The signal from the gate 1443 is referred to as the +P10 pulse. The +P10 pulse shifts the sequence counter 127 back to the stage 14S4 where the system waits for another input character from the remote Teletype transmitter. The +P10 pulse is provided to a gate 1402 enabled by the stage 14S5 to set the flip-flop or stage 14S4.

During the time that the data composer apparatus 50 awaits the next input character, the display circuitry may be utilized for operating the display tube 57 in FIGURE 22 to provide a visual indication of the character recorded in the display tracks 74 and 75. A switch 1212 is utilized to provide the display. If the switch 1212 is closed, a display is provided between successive input characters. The display, accordingly, flashes on between recording characters and is turned up during the character recording sequence. If the switch 1212 is open, a display is not provided until the data composer apparatus 50 returns to its normal quiescent condition.

Assuming that the switch 1212 is closed, in FIGURE 11 the AND gate 1211 is enabled by the +S4 signal from the flip-flop 14S4 in the sequence counter 127. The other two inputs to the AND gate 1211 are the +Q11 signal and the $+Q\overline{23}$ signal. The +Q11 signal is present because the flip-flop 9Q11 is set at this time. As described above, the flip-flop 9Q11 was set when the flip-flop 14S4 was first set. The flip-flop 17Q23 is set during the time an input character is being received and it is reset between characters. The $+Q\overline{23}$ signal is, accordingly, positive when an input character is not being received. When the AND gate 1211 is enabled, it provides for a −K23 signal through the switch 1212 to an OR gate 1213. The +K24 display signal at the output of the emitter follower 1214 connected to the OR gate 1213 is utilized for indicating the display sequence. Between successive characters with the switch 1212 closed, the display flashes on, so that the character which has just been recorded can be viewed by the operator.

The display sequence between the successive input characters is exactly the same as that described above during the normal or quiescent condition of the data composer apparatus 50. The +K24 display signal functions in FIGURE 12 to develop the −P1 shift pulses for the read register 102 and also the +P5 drum strobe pulses reading the information in the display tracks 84 and 85. The drum strobe pulses +P5 are provided to the four AND gates 2916 through 2919 at the output of the switch 100 in FIGURE 29. The information through the gates 2916 through 2919 is provided to the read register 102 in FIGURE 8. The +P8 transfer pulse from the OR gate 1216 in FIGURE 11 operates the transfer gates 97 in FIGURE 21 to read out the six bits registered in the register 102 from the magnetic drum 64. The information is transferred to the display 107, also in FIGURE 21, for controlling the deflection of the beam in the monoscope character generator 113. The output from the generator 113 is coupled through a video amplifier 115 to the display tube 57. The display continues uninterrupted until the next input character is received at the data composer apparatus 50.

In the sequence being described, only one input character has thus far been received so that it is displayed once each revolution of the drum 64 which is therefore, at a rate of 60 times per second. The start pulse of the next Teletype input character operates the commutator 95 in the input control 72 which sets the flip-flop 17Q23. The flip-flop 17Q23 removes the +K24 display signal and inhibits the −P1 read register shift pulses and the +P5 drum strobe pulses so that display sequence is interrupted.

In the Teletype input sequence described above, the input character is received in the read register 102 and then it is recorded in the display tracks 84 and 85 on the drum 64. The shift status of the character is registered in the flip-flop 18RF under control of the shift status circuit 104 in FIGURE 17, and the shift status circuit 104 is in turn controlled by the function decoder 124. As also described above, when the functional code for Figs. or Ltrs. is received in the read register 102, the function decoder 124 provides, respectively, for the +F9 or +F10 signals to the shift status circuit 104. The coding registered in the read register 102 for the functional code is not written or recorded in the display tracks of the magnetic drum 64. Only the actual input characters themselves are recorded. When the input code is of the functional code for Figs. or Ltrs., the OR gate 1922 in the function decoder 124 is enabled. When the input code is for Ltrs. the AND gate 1904 is enabled to provide the F9 signal to the OR gate 1922, and, when the Figs. code is received, an AND gate 1905 is enabled to provide for the −F10 signal to the OR gate 1922. The output of the OR gate 1922 is the +F13 signal to an AND gate 1925. The other two inputs to the AND gate 1925 are the +K2 signal from the control logic 118 which indicates that an input is being received and the +D2 signal from the input control 72 indicating the end of an input code. As described above, the +D2 signal is provided from the OR gate 1712 responsive to the termination of the operation of the flip-flop 17Q23.

Accordingly, at the termination of the input code for either Figs. or Ltrs., a —G42 pulse is developed at the AND gate 1925 for setting a flip-flop 19Q22. The flip-flop 19Q22 is set to indicate that the code registered in the read register 102 is not to be written on the magnetic drum 64.

In the mark control logic, the +Q22 signal from the flip-flop 19Q22 in the function decoder 124 disables both the erase mark and record mark channels to the mark transfer switch 101. The +Q22 signal is provided to an AND gate 1621 which is enabled by the +F8 signal from the function decoder 124 and by the +K2 signal from the control logic 118. The +F8 signal is provided from an OR gate 1920 in the function decoder 124 when either the —F9 or —F10 signals are present. The AND gate 1621 enables an OR gate 1622 which provides a +M23 signal to an OR gate 1623. The gate 1623 inverts the polarity of the signal providing a negative signal as a stop-erase signal to the AND gate 1625 in the mark erase channel.

The negative signal from the AND gate 1621 is also provided to an OR gate 1614 which, responsive thereto, develops the +M24 signal, provided to the OR gate 1615. The negative signal from the OR gate 1615 disables the AND gate 1602 in the mark-record channel to the magnetic drum 64. Both the mark erase and mark-record channels are, accordingly, disabled responsive to the reception of either Figs. or Ltrs. functional code at the read register 102. When thereafter the mark-record in the mark display track 88 is sensed, it operates the mark counter 119 in FIGURE 15 but the successive enabling pulses +C1, +C2 and +C3 therefrom do not function to either erase the old mark or to record a new mark. The mark recorded in the upper store of the track 88 is accordingly, not advanced when the functional codes Figs. or Ltrs. are received.

The functional code registered at the read register 102 is not recorded in the display tracks 84 and 85 of the magnetic drum 64. When either the Figs. or Ltrs. code is received at the function decoder 124, a +F13 signal is generated at the output of the OR gate 1922. In the control logic in FIGURE 12, the +F1 signal is provided together with the +K2 Teletype signal and the +K22 writing signal to the AND gate 1206. The —K53 signal from the AND gate 1206 is a write inhibit signal and it is coupled to disable the AND gate 1205 to block the —P1 shift pulses to the read register 102. Further, in FIGURE 10, the —K53 inhibit signal is provided to the AND gate 1027 to inhibit the +K41 write gate signal to the eight AND gates 1801 through 1808 at the output of the read register 102. The input information in the read register 102 is, accordingly, not shifted to the heads 74 and 75 adjacent the display tracks 84 and 85.

When the mark counter 119 is shifted to stage 15C3, it provides for the —D4A and —D4B mark done signals, in a manner described above. The —D4 signals shift the sequence counter 127 to stage 4, and the data composer apparatus 50 awaits the next input character. The only change that takes place is that the shift status circuit 104 has been changed.

If the character registered in the read register 102 is for the CR code, again, the writing sequence is interrupted by the function decoder 124 in FIGURE 19. As indicated in the above table C in the general description, the code for the CR code is 00010. When the CR code is registered in the read register 102, the +F11 signal is provided at the OR gate 1917 coupled from the two AND gates 1909 and 1910. The +F13 signal is also generated because the AND gates 1909 and 1910 are coupled to the OR gate 1923. The AND gate 1925 is, accordingly, enabled to set the stop writing flip-flop 19Q22. The flip-flop 19Q22 inhibits writing signals in a manner described above. In the mark control logic 116, the +F11 signal operates an AND gate 1528 to enable an OR gate 1530 and, in turn, the AND gate 1535. Now, when the mark is sensed by the head 79 adjacent the mark display track 88, writing is inhibited when the flip-flop 1501 is set and the old mark is erased when the flip-flop 15C2 is set. When a flip-flop 15C3 is set, the —M11 signal stops for the mark shifting as well as writing of the new mark. The —M11 signal is provided to the OR gate 1610 to disable the mark channel to the head 78. Thus, the flip-flop 15C3 remains set.

At the line pulse time, provided the mark was not in the last line, an —M7 signal is formed by the LP pulse from the generator 123. This develops the —M9 pulse at the AND gate 1511. The LP pulse is provided to the AND gate 1512 at the input of the OR gate 1510. The —M9 pulse triggers the multivibrator 15Q1 and sets the mark counter 119 back to the flip-flop 15C1. This provides for the two character space for the sweep retrace in the display circuits. The multivibrator 15Q1 enables the shift pulses —P9 so that the mark counter 119 shifts through its states, again performing as usual. The result is that the mark has been reset to the beginning of the next line.

If the mark was in the last line to begin with, it is caught in the flip-flop 15C3, as described above. The operation is then resumed with the arrival of the +LOP, lower origin pulse, which signifies the end of the upper display store. The flip-flop 15Q5 is set by the AND gate 1505 so that when the +UOP pulse is sensed, the —M9 signal is generated to rewrite the mark in the manner described above. The mark has now been moved to the beginning of the first line. In this manner, when the CR code is registered in the read register 102, the registered code is also not recorded on the drum 64.

The receiving state of the data composer apparatus 50 is terminated by either the upper display store becoming full or by receiving the LF line feed code from the remote transmitter 61. Until such a condition occurs, the successive input characters are received one after another at the read register 102. If the received code is for LTRS or FIGS or CR, the function decoder inhibits the writing sequence and either functions to change the shift status circuit 104 or to move the mark to the beginning of the next line. The rest of the input characters are successively recorded in the display tracks 84 and 85 of the magnetic drum 64. Each recording sequence is initiated after an input character has been registered by sensing the position of the mark in the mark display track 88. The registered information is then recorded when the flip-flop 15C1 is set and the mark is shifted to the next position which is the character position of the character written. If the display is provided between successive characters, the underscore mark appears under the last digit provided on the face of the display tube 57. The underscore mark is displayed even if the characters are not displayed between successive inputs.

When the reset mark pulse +Q5 is provided from the flip-flop 15Q5 indicative that the store is full, the AND gate 1461 is enabled to operate or set flip-flop 14Q15 which indicates that the receiving sequence is stopped. At the upper left hand corner of FIGURE 14 the —Q15 stop pulse is provided to an OR gate 1430 to provide for the operation of AND gate 1407 when the multivibrator 14Q7 is triggered by the next —D4B pulse. The —P11 pulse from the gate 1407 resets the flip-flop 14S5 and operates the gate 1470. The sequence counter 127 is accordingly shifted to its zero state by the shift pulse —P11, and the clear signal —S6 is generated from the AND gate 1470 to reset the flip-flop 14Q15 and the control register 132. The clear command —S6 accordingly returns the data composer apparatus 50 to its display operation with the —K1 signal being removed and the +K24 display signal in FIGURE 11 being restored.

Reception of the LF (line feed code) also sets the flip-flop 14Q15 by the —F6 output of the function decoder 124. The —F6 signal is provided to the OR gate 1431 in the control logic 125. The gate 1432 is operated by the +S5 signal to enable the gate 1407 so that the next operation of the multivibrator 14Q7 provide for a —P11 shift pulse. The sequence is exactly the same for returning the data composer apparatus to its display condition.

*Keyboard input (command C1)*

Depression of any of the character keys 130 shown in FIGURES 1 and 2 on the keyboard 51 results in the insertion of the character into the lower display store of the display tracks 84 and 85 of the magnetic drum 64 at the position indicated by the lower display mark in the track 88. The sequence of operations responsive to the depression of a character key 130 is somewhat the same as that for the receiving command C2. The keyboard input command responsive to the depression of any character key 130 is designated as the command C1.

Assume that the address mark in the lower display store of the track 88 is in its reset position so that the input characters will be introduced starting at the beginning of the lower display store. When any one of the character keys 130 is depressed it operates an individual combination of the code bars 17KB1 through 17KB5 shown in the input control 72 in FIGURE 17. The code bars 17KB1 through 17KB5 are operated in accordance with the Teletype code. For example, if the key 130 for the character A is depressed the code bars 17KB5 and 17KB4 are moved but the other three code bars 17KB1 through 17KB3 are not moved. This combination is provided because the Teletype code for the character A is 11000. Note that the order of bits in the table C is backwards but the order 11000 (1–2–3–4–5) is more conventional.

Towards the end of the travel of the selected character key 130 a keyboard common switch 27C1 in FIGURE 27 is operated to produce the —C1 pulse. The —C1 pulse is developed from the keyboard pulse generator 2703 which provides fifteen microsecond pulses through the armature 27C1 when it is operated to the lead —C1. The —C1 pulse in FIGURE 17 is provided through the operative ones of the switches 17KB1 through 17KB5 to the read register 102. The —C1 pulse is also provided to the OR gate 1707 for developing the —P13 clear pulse to the read register 102. The —P13 pulse resets the six flip-flops 18R1 through 18R5 and 18RF and thereafter the pulses through the operated ones of the switches 17KB1 through 17KB5 selectively set the flip-flops 18R1 through 18R5 and 18RF. The switches 17KB1 through 17KB5 are connected respectively to the OR gates 1834, 1835, 1843 and 1851 and 1857.

The input information is accordingly entered to the read register 102 in a substantially similar manner as the entry of the information from the input commutator 95 when Teletype input information is being received except that the input is entered simultaneously in parallel to the read register 102 instead of being entered sequentially in parallel under control of the commutator 95. The shift bit of the character is determined by the shift status circuit 104 in FIGURE 17 under control of the decoder 124 of FIGURE 19 in exactly the same manner as for the Teletype input character. The shift status 104 sets the flip-flop 18RF in the read register 102.

The —C1 pulse which provided for the entry of the character input information from the keyboard 51 also functions to set the control register 132 in FIGURE 8. The control decoder 133 in FIGURE 8 provides for the operation of the two flip-flops 8I3 and 8I4 in the control register 132 to indicate the C1 command in the control logic 118. This operation is also indicated in the above Table A. When the flip-flop 814 is set, it provides a pulse through the gate 957 and the gate 960 to trigger the multivibrator 9Q6. The —K1 pulse is provided from the OR gate 959 to an OR gate 1213 in FIGURE 11. This removes the enabling potential from the OR gate 1213 to stop the +K24 display signal. As described above the +K24 signal functions in FIGURE 12 to develop the —P1 read register shift pulses and also the +P5 drum stroke pulses. The display sequence is accordingly interrupted as soon as one of the character keys 130 is depressed.

In the control logic 118, the +I4 signal at the AND gate 904 develops the +K2 input signal, and the +I3 signal at the AND gate 928 develops the +K5 keyboard input signal. Three logical signals are accordingly provided in the control logic 118 in FIGURE 9 responsive to the operation of the control register 132. The three signals are the K1 signal which is provided for any command, the K2 provided when an input is being entered either from the keyboard 51 or a Teletype input, and K5 which indicates that the input is from the keyboard 51. In FIGURE 23 the K5 signal from the control logic 118 functions to trigger a multivibrator 23Q25 which develops a blanking signal to blank character writing noise. The blanking signal is provided to the video amplifier 115 in FIGURE 22.

The —CO pulse from the keyboard 51 is provided to the OR gate 1710 in the input control 72. The differentiated trailing edge of the pulse provides for the +D2 pulse from the OR gate 1712 to the AND gate 1720. The other inputs to the AND gate 1720 is the +K5 keyboard input signal from the control logic 118. The output of the AND gate 1720 is designated as—L20 and this signal sets the sequence counter 127 to its state S5 with the flip-flop 14S5 set. Referring to FIGURE 14 the —L20 pulse is provided directly to the input of the flip-flop 14S5.

As described above, when the flip-flop 14S5 is set, a character registered in the read register 102 can be recorded on the drum 64. In FIGURE 10 the +S5 signal together with the +I4 signal from the control register 132 enable the AND gate 1025 to develop +K22 write signals and also the +K14 write mark signal. The +K14 signal is provided to an AND gate 1042 which is enabled to develop the —K35 signal to an OR gate 1038 in turn produces the +K37 lower mark signal. In the sequence described above for the Teletype input the upper mark signal +K36 is provided from the OR gate 1016. However when the keyboard 51 is utilized for entering character information the information is entered to the lower display so that the lower mark signal +K37 is provided.

The +K37 signal is provided to an AND gate 1517 in the mark control logic 116 for enabling the operation of the mark counter 119. The AND gate 1517 forms a composite AND gate together with the AND gate 1518 at the input of the OR gate 1515. The composite AND gate is enabled when the +L signal indicating the lower store is received and when the +K37 signal is received. The composite AND gate including the gates 1517 and 1518 is enabled by these signals so that when the mark recorded in the lower store of the track 88 is sensed by the head 79 in FIGURE 16 the mark pulse is provided through the amplifier 16RA and the composite AND gate to the OR gate 1515. The OR gate 1515 thereupon sets the flip-flop 15CM in the mark counter 119 and responsive thereto the block mark flip-flop 15Q20.

The operation of the mark counter 119 and the mark control logic 116 thereafter under control of the —P9 shift pulses is exactly the same as that described above for the reception of a Teletype input. When the flip-flop 15C1 is set the character registered in the read register 102 is recorded in the display tracks 84 and 85 of the drum 64. If the registered character is of a functional code, figures, letters or carriage return, the function decoder 124 detects the code and inhibits the recording thereof on the drum 64. When the flip-flop 14C2 is set the old mark is erased and the underscore generator 112 is operated. When the flip-flop 15C3 is set the new mark is written and the mark done pulse —D4B is provided to trigger the multivibrator 14Q7 to shift the sequence counter 127 to a zero state by the —P11 shift pulse. A command clear pulse —S6 is produced by the AND gate 1470 at the output of the sequence counter 127. The —S6 pulse resets the control register 132 of FIGURE 8 and display is thereupon resumed. The character indicated by the depressed key 130 on the keyboard 51 has been recorded in the display tracks 84 and 85 so that it is provided on the face of the display tube 57, and the mark in the lower display has been advanced.

Subsequently if another character key is operated, the sequence is repeated.

SEND OPERATION (COMMAND C3)

When the key 2C3 on the keyboard 51 in FIGURES 1 and 2 is depressed, the message registered in the lower display store in tracks 84 and 85 of the magnetic drum 64 is transmitted. The message is transmitted starting with the position indicated by the address mark in the lower store of the mark display track 88. When the key 2C3 is depressed, the switch 27C3 in FIGURE 27 is operated to provide for a pulse from the keyboard pulse generator 2703 to the lead —C3. The —C3 pulse is provided to the control decoder 133 in FIGURE 8 which provides operating potentials to the two flip-flops 8I1 and 8I7 in the control register 132.

With the two flip-flops 8I1 and 8I7 set, the control register 132 provides an indication of a sending operation to the control logic 118. In the control logic 118, the operation of the flip-flop 8I7 develops the +K1* command signal at the OR gate 910 and the —K4 Teletype output signal at the AND gate 920 at the top of FIGURE 9. The two inputs to the AND gate 920 are the +I1 signal and the +$\overline{\text{I4}}$ signals. Since the flip-flop 8I4 is not operated at this time, the AND gate 920 is operated by the +I1 signal. The —K4 signal is coupled to the OR gate 921 to develop a +K4 signal and it is also provided to the sequence control logic 125 to set the flip-flop 14S1 in the sequence counter 127. The —K4 signal from the control logic 118 is provided to an OR gate 1448 which develops the +L4 signal to the AND gate 1401. The +KI* command signal is present, as indicated above, and the +$\overline{\text{K8}}$ signal is also present at this time because a copy operation is not in progress. When a copy operation is in progress, a negative potential is provided to the AND gate 1401. The AND gate 1401 is, accordingly, enabled responsive to the —K4 signal to provide for the —L13 signal to the flip-flop 14S1 causing it to set.

When the flip-flop 14S1 sets, it provides the +S1 signal to an AND gate 1231 in FIGURE 12. The AND gate 1231 is operated during the +B1 bit signal as it is enabled by the +K4 signal from FIGURE 9 and the +S1 signal from the sequence counter 127. The negative signal from the AND gate 1231 enables an OR gate 1231 to develop a +P17 pulse which is provided to the function encoder 95 in FIGURE 20. The function encoder 95 is a circuit which generates and inserts into the read register 102 various Teletype codes required for the send operation. The codes which are inserted under control of the encoder 95 are for Figs., Ltrs., CR and Line Feed or Stop.

Responsive to the P17 pulse from the control logic 118, the AND gate 2004 in the function encoder 95 is enabled to develop the —G2 signal and to enable an OR gate 2005. The OR gate 2005, in turn, enables an OR gate 2006 to develop the —G9 signal. The —G2 and —G9 signals are provided the read register 102 in FIGURE 18. The —G9 signal is provided to the OR gates 1834, 1835, 1851 and 1857 which are coupled respectively to the flip-flops 18R5, 18R4, 18R2 and 18R1 causing them to set. The —G2 signal is provided to an OR gate 1813 at the input of the flip-flop 18R3 causing it to set. In this manner, the function encoder 95 sets the five flip-flops 18R1 through 18R5 when the +S1 signal is provided from the sequence counter 127 to the control logic 118. The Teletype code for Ltrs., as indicated in the above table, is 011111, and the Teletype for Figs. is 011011. When a Figs. code is to be inserted to the read register 102, the flip-flop 18R3 is not set. In FIGURE 20, the —G2 signal is provided only for Ltrs. but not for Figs. whereas the —G9 signal is provided for both. During the +S1 signal, the Ltrs. code is, accordingly, inserted into the read register 102.

As indicated in the above Table B which tabulates the functions accomplished during the various sequence stages S1 through S5, during S1 the Ltrs. code is inserted to the read register 102 and transmitted. During S2, the read mark is reset to the beginning of the lower display store. No function is accomplished during S3, and during S4, a character on the drum 64 is read into the read register 102. During S5 the character registered in the read register 102 is transmitted.

In FIGURE 9, the AND gate 924 is enabled by the +S1 signal to set a flip-flop 9Q10. The flip-flop 9Q10 energizes a clutch 2808 associated with the output distributer 98 in FIG. 28. The output distributer 98 scans the contacts of five relays 2801 through 2805. The windings of the relays 2801 through 2805 are coupled respectively to the +R1 through +R5 outputs of the flip-flops 18R1 through 18R5 in the read register 102. The relays 2801 through 2805 are, accordingly, operated in accordance with the registration in the read register 102. When the clutch 2808 is energized, the armature of the distributer 98 successively scans the contacts associated with the five relays 2801 through 2805. With the Ltrs. code 011111 registered in the read register 102. The code combination 11111 is provided to the output distributer 98. The registration in the flip-flop 18RF is not sampled. In addition to the five bits on the code, one bit is generated at the segment 2810 of the distributer, which segment is connected to a source of potential. Accordingly, six bits are provided to the remotely located receiver with the first bit being always present and functioning as a start pulse in the manner conventional in Teletype transmission.

In FIGURE 14, a cam 1441 is coupled to and rotates with the armature of the output distributer 98 in FIG. 28. Towards the termination of the armature rotation of the output distributer through one revolution, the cam 1441 closes the associated contacts 1440 to develop a pulse at the start circuit 1435. The circuit 1435 enables an OR gate 1419 which triggers the multivibrator 14Q7. As described above, the multivibrator 14Q7 develops a shift pulse —P11 for resetting the flip-flop 14S1 and for setting the flip-flop 14S2. During the time that the flip-flop 14S1 was set, the Ltrs. code was inserted into the read register 102 and transmitted to the remote Teletype receiver.

As indicated above, when the flip-flop 14S2 is set, the address mark for the lower display is reset. In FIGURE 10, the +S2 signal from the sequence counter 127 operates an AND gate 1030. The other two inputs of the AND gate 1030 is the +I7 signal from the control register 132 in FIGURE 8 and the +$\overline{\text{K8}}$ signal from FIGURE 9 of the control logic 118. The +$\overline{\text{K8}}$ signal is positive except when a copy operation is in progress. The AND gate 1030 is, accordingly, operated to provide for a +K25 signal to an OR gate 1032. The OR gate 1031 develops the +K26 read signal and the OR gate 1032 develops the +K2 allow-read mark signal in FIG. 15 which in turn enables a gate 1501 which is further hereinafter described.

The +K2 signal enables an AND gate 1036 having a second +$\overline{\text{I2}}$ from the control register 132 and a third input controlled from the multivibrators 10Q8 and 10Q9. The inputs are all positive so that the AND gate 1036 is operated to, in turn, enable an OR gate 1038 which develops the +K37 lower mark signal. In FIGURE 15, the +K37 signal is provided to the AND gate 1517 which together with the AND gate 1518 are operated by the +L, lower store signal, from the generator 123 when the mark pulse recorded in the track 88 is read. The mark recorded in the lower store of the mark display track 88, accordingly, triggers the flip-flops 15CM and 1520 to initiate a mark reset sequence. This sequence is quite similar to that described above during the receive command C2 and is illustrated in the curves designated display mark counter and advance mark in FIGURE 31.

The −P9 pulses shift the mark counter 119 successively in two steps to the flip-flop 15C2. The AND gate 1601 is disabled during the +C1 pulse so that a mark is not recorded in the track 88. The +C2 signal, however, enables the AND gates 1625 to initiate an erasure sequence. The mark recorded in the lower store of the track 88 is, accordingly, erased by the erasure signal provided from the AND gate 1625 to the head 78. The next −P9 pulse which occurs during the next +B3 signal, sets the flip-flop 15C3 and enables the AND gate 1535 to inhibit the −P9 shift pulses. The gate 1535 is enabled receiving a positive signal from the OR gate 1533 responsive to the operation of the reset flip-flop 15Q5. The flip-flop 15Q5 is set by the +C3 signal applied to the AND gate 1501 mentioned above. The gate 1501 operates the gate 1503 to set the flip-flop 15Q5. The −M11 signal from the AND gate 1535 inhibits the −P9 shift pulses and it also provides a disabling potential to the AND gate 1602 to inhibit recording a new mark in the track 88. The upper origin pulse (UOP) arriving at the AND gate 1506 causes it to provide an additional set signal to the reset mark flip-flop 15Q5. Thereafter, when the +LOP pulse arrives from the generator 123, the AND gate 1509 is enabled to successively enable the gates 1510 and 1511 and trigger the multivibrator 15Q1. The −M9 pulse from the AND gate 1511 also resets the mark counter 119 back to the flip-flop 15C1.

When the flip-flop 15Q1 is operated, it disables the AND gate 1535 to again provide for the −P9 shift pulses. The mark counter 119 steps first to the flip-flop 15C2 and then to the flip-flop 15C3. An erase signal is provided by the flip-flop 15C2 to erase the mark recorded in the lower store of the track 88. However, a mark is not recorded at this position so the erase function is essentially unessential at this time. As described above, the mark was erased during the previous operation of the flip-flop 15C2. When the flip-flop 15C3 operates it enables the AND gate 1602 in the mark recording channel. The stop mark signal $+\overline{M24}$ is no longer present so the AND gate 1602 is enabled by the +B2 bit signal to develop a mark in the reset position of the track 88. The +C3 signal also is provided to the AND gate 1550 which successively enables the gates 1551 and 1548 and 1552 to develop the mark-done −D4 A and B pulses.

The −D4B pulse triggers the multivibrator 14Q7 to step the sequence counter 127 to the flip-flop 14S3. As described and listed in Table B above, no function is performed during the +S3 signal so that a no-step signal −LI5 is developed. The no-step signal for resetting the flip-flop 14S3 is developed at the AND gate 1469. The $-\overline{K8}$ signal is positive unless a copy operation is in progress and the $+\overline{I8}$ signal is present at the time from the control register 132. The AND gate 1469 successively enables the gates 1467 and 1417 and the AND gate 1417 is operated by the +Y clock pulse to provide the −L15 pulse to the OR gate 1419 at the input of the multivibrator 14Q7. The multivibrator 14Q7 is, accordingly, triggered to provide a −P11 shift pulse to set the flip-flop 14S4.

As described above, when the flip-flop 14S4 is set, a character recorded in the lower display tracks 84 and 85 is read into the read register 102. With the address mark for the lower display store reset, the first character recorded in the lower display store is, accordingly, read during the +S4 signal.

The +S4 signal is provided to an AND gate 1031 in the control logic 118 which gate develops the −K36 read signal. An OR gate 1031 inverts the polarity of the signal to provide the +K26 signal and an OR gate 1032 provides the +K29 allow-read-mark signal. The +K29 signal is provided to a gate 1036 which is enabled at this time to, in turn, enable an OR gate 1038 to provide the +K37 lower mark signal. These signals were all mentioned above. The +K37 signal provides for stepping the mark in the lower store of the track 88 to the next character position. The +K37 signal is provided to the AND gate 1517 in the mark control logic 116. The AND gate 1517 is operated when the mark is sensed in the lower store of the track 88. The sensed mark sets the flip-flop 15CM in the mark counter to initiate the mark step or skip sequence.

The first −P9 shift pulse sets the flip-flop 15C1 and resets the flip-flop 15CM. During the time that the flip-flop 15C1 is set, the first character in the lower store of the display tracks 84 and 85 is read. The +C1 signal is provided to an AND gate 1222 in the control logic 118. The +K26 signal from FIG. 10 is also provided to the AND gate 1222. When the next clock pulse XΔ is received from the generator 122, the composite AND gate, including the gates 1222 and 1223, is operated. The gate 1223 receives a positive enabling potential at this time as it is controlled by an AND gate 1244. The AND gate 1244 has two inputs, the +C1 and the +Q1 signal from the multivibrator 15Q1. The potential on the +Q1 lead is negative at this time so that the AND gate 1244 is disabled and the gate 1223 is enabled.

The negative pulses −K54 from the composite AND gate are utilized for the −P1 read register shift pulse and for the +P5 drum strobe pulse. The negative −K54 pulses are provided to an OR gate 1225 which is coupled to an emitter follower 1226. The +P5 drum strobe pulses, one for each clock pulse +XΔ are provided from the emitter follower 1226. The −K54 pulses are also provided to an OR gate 1204 which provides a positive potential to an AND gate 1205. The other input to the AND gate 1205 is positive because the AND gate 1206 is disabled at this time. The AND gate 1206 becomes enabled to inhibit the shift pulses −P1. The shift pulses −P1 are provided from the AND gate 1205 to the emitter follower 1208.

Only three shift pulses −P1 and three drum strobe +P5 are provided from the control logic 118 because the +C1 pulse provided to the AND gate 1222 has a duration of only three bits. The −P9 shift pulses to the mark counter 119, as described above, are at a repetition rate of three bit times. The −P1 shift pulses are provided to the shift diodes associated with the flip-flops 18R1 through 18R5 and 18RF in the read register 102, and the +P5 strobe pulses are provided to the AND gates 2916 through 2919 at the output of the switch 100 in FIGURE 29. Three bits in each of the two tracks 84 and 85 are, accordingly, read by the heads 74 and 75, respectively, with the three bits from the head 74 being coupled through a transformer 2907, an amplifier 2912, directly to the gate 2916, and through an inverter 2914 to the gate 2917. Similarly, the three bits through the head 75 are provided through a transformer 2908, a reading amplifier 2913, directly to the gate 2918 and through an inverter 2915 to the gate 2919. The +P5 pulses enable the gates 2916 through 2919 in synchronization with each of the three bits in the two tracks 84 and 85. The signals from the gates 2916 and 2917 are provided to the flip-flop 18R4 and the signals from the AND gates 2918 and 2919 are provided to the flip-flop 18R1. The shift pulse −P1 shifts the information respectively to the flip-flops 18R5 and 18R2 and the next pair of bits are entered to the flip-flops 18R4 and 18R1. After three shift pulses −P1, the read register 102 registers the entire first character.

The function decoder 124 in FIGURE 19 controls the shift status circuit 104 to determine the condition of the flip-flop 18RF. As indicated above, the code for Ltrs. was transmitted to the remote Teletype receiver and the shift status circuit 104 is set to indicate the Ltrs. code before the first character in tracks 84 and 85 is read into the register 102. If the bit registered in the flip-flop 18RF, as read from the magnetic drum 64 for the first character is a zero to indicate the Ltrs. code, the shift status circuit 104 is not changed and the shift bit registered in the flip-flop 18RF is not transmitted.

When the next —P9 shift pulse is provided to the mark counter 119 in FIGURE 15, the flip-flop 15C2 is set and the flip-flop 15C1 is reset. When the flip-flop 15C1 is reset, it halts reading the drum 64. The flip-flop 15C2 erases the old mark which is now passing under the head 78 in FIGURE 16 and it also operates the underscore generator 112 in FIG. 22. The +C2 signal is provided to the enabled AND gate 1625 to provide for the erasure of the mark in the lower store of the track 88. When the next —P9 pulse is provided to the mark counter 119, the flip-flop 15C3 is set to record the new mark in the position of the next character in the track 88. The +C3 signal enables the AND gate 1602 during the +B2 pulse to provide for this operation. The +C3 signal also develops the —D4B mark done signal at the upper right hand portion in FIGURE 15. The —D4B pulse is provided to trigger the multivibrator 14Q7 at the sequence control logic 125 to step the sequence counter 127 to the flip-flop 14S5.

To briefly recapitulate, during the +S4 signal from the sequence counter 125, a character is read from the display tracks 84 and 85 on the drum 64 and the mark is advanced to the next character position in the track 88. During the +S5 pulse from the sequence counter 127, the character registered in the read register 102 is transmitted. The +S5 signal is provided to the AND gate 922 in FIGURE 9 of the control logic 118. The AND gate 922 is enabled at this time by the +K4 Teletype output signal from the OR gate 921. The AND gate 922, accordingly, triggers the flip-flop 9Q10 which was reset when the flip-flop 14S2 in the sequence counter 127 was reset. The $+\overline{\mathbf{Q10}}$ signal from the flip-flop 9Q10 provides for the Teletype transmission. The $+\overline{\mathbf{Q10}}$ signal is provided to the clutch 2808 in FIGURE 28 which operates the output distributor 98. The distributor 98 successively samples the outputs of the five flip-flops 18R1 through 18R5 in the read register 102. As described above, the flip-flops 18R1 through 18R5 selectively control the operation of the relays 2801 through 2805. A start pulse is also provided by the output distributor 98.

At the termination of the revolution of the armature of the output distributor 98, the cam 1441 in the sequence control logic 125 provides for a pulse to trigger the multivibrator 14Q7. The multivibrator 14Q7 now operates the AND gate 1434 which was enabled by the $+\overline{\mathbf{S5}}$ signal at the gate 1410. A +P10 signal is, accordingly, provided for recirculating the sequence counter 127 back to the flip-flop 14S4. The +P10 signal is provided to the AND gate 1402 which operates the flip-flop 14S4 and resets the flip-flop 14S5. With the flip-flop 14S4 set once again, the data composer apparatus 50 is ready to read another character from the drum into the read register 102 and to again advance the mark. The sequence is cyclically repeated, in this manner, with the counter 127 being recirculated between the flip-flops 14S5 and 14S4. When the flip-flop 14S5 is set, the information in the read register 102 is transmitted, and, when the flip-flop 14S4 is set, the next character is read from the lower store of the display tracks 84 and 85 and the mark is advanced.

In the event the shift status changes, as indicated by the presence of a 1 digit in the first bit of the character which is stored in the flip-flop 18RF, the shift status circuit 104 detects the change and provides for the transmission of a shift function code. The shift status circuit 104 continuously compares the shift bit of the character read into the read register 102 with the state of the flip-flop 17Q2 in the circuit 104. The output of the flip-flop 18RF is provided through the leads designated 1 and 2 in FIGURE 18 to the AND gates 1716 and 1715 at the output of the flip-flop 17Q2. If the AND gate 1715 is operated, it indicates that the functional code for Figs. is to be transmitted. The AND gate 1715 is operated when the flip-flop 17Q2 is set to register the Ltrs. code, whereas, the flip-flop 18RF is now set to register the Figs. code. The +F1 signal from the OR gate 1717 at the output of the AND gate 1715 is provided to the AND gate 2003 in the function encoder 95. When the flip-flop 15C3 in the mark counter 119 operates, an AND gate 1229 in FIGURE 12 is operated. Another input to the AND gate 1229 is controlled by the —M20 signal to an OR gate 1253. Since the —M20 signal is present at this time, the AND gate 1229 is operated by the +B2 pulse to, in turn, operate an OR gate 1230 which develops the +P17 insert code pulse. The +P17 signal is provided as the second input to the AND gate 2003 in the function encoder 95. The AND gate 2003 is, accordingly, operated to develop the —G6 signal and also the —G9 signal. These two signals are provided to the read register 102 to set it to register the Figs. code, which is 11011. The mark in the track 88 is not advanced as both the erase and mark channels are disabled by the AND gate 1611. The +F3 signal is provided to the gate 1611 from the decoder 124 in FIG. 19 when either the code for Figs. or Ltrs. is in the register 102. The shift function code in the register 102 is now transmitted during the operation of the mark counter 119 and the address mark was not advanced. The same character in tracks 84 and 85 then read into the read register 102 because the mark is still in the same place. This time the comparison test at the shift status circuit 104 and the character from the drum 64 is transmitted.

Teletype output continues until all characters except blanks have been transmitted. When a blank character is detected, the carriage return CR code is inserted by the function encoder 95 and transmitted. The address mark is then automatically advanced to the beginning of the next line. No CR mark is inserted in the end of the line if the line does not contain blank characters. In this manner, delays which would occur if a line only had a few characters in it are avoided. When a blank character is detected in the last line, the line feed code is inserted and the send operation is terminated.

When a blank character is registered in the register 102, the decoder 124 in FIG. 19 produces the +F4 blank code signal at the OR gate 1916. The gates 1907 and 1908 are operated to in turn operate the gate 1916 to provide the +F4 and also the gate 1922 to provide the +F13 signal. The +F4 signal operates the AND gate 1527 to operate the gate 1530 to provide an enabling potential to the gate 1535. The negative signal from the gate 1527 is also provided to two OR gates' 2001 and 2008 in the encoder 95. The next LP pulse operates the OR gate 2008 to develop the —G4 signal to the register for inserting the CR code. If the +UOP pulse precedes the next LP pulse to indicate that the end of the lower store is reached the gate 2002 instead of the gate 2008 is operated. The gate 2008 inserts a LF, line feed code to the register 102.

The +F13 signal from the decoder 124 operates a gate 1611 to disable the mark record channel to the track 88. The next LP pulse provides for recording the mark at the beginning of the next line.

ENTER UPPER MESSAGE (COMMAND C4)

When the command key 2C4 on the keyboard 51, illustrated in FIGURES 1 and 2, is depressed, it initiates a sequence of operations for transferring the message in the upper store of the message tracks 86 and 87 to the lower store of the display tracks 84 and 85. The message in the lower store of the display tracks 84 and 85 need not be erased as the new message is recorded over the old message if any is present. The message store is entered to the display store starting at the address indicated by the mark for the lower display store. As described above, the marks for the message stores are not addressable so that the message is entered starting at its beginning. If the mark for the lower display store is at its reset position, then the entire message from the upper store of the message tracks 86 and 87 is entered. Otherwise, only a portion thereof may be entered depending upon its length.

There are five basic paths of information flow in the data composer apparatus 50, as described above in reference to FIGURE 3. As indicated therein, normally the message in the upper message store is transferred to the lower display store. Switch 99 is provided, as is further hereinafter described, however, for changing the information path.

When the command key 2C4 is depressed, the armature 27C4 in FIGURE 27 is operated to provide the −C4 pulse developed from the keyboard pulse generator 2713 to the control decoder 133 in FIGURE 8. Responsive to the −C4 pulse, the decoder 133 operates the flip-flops 8I1 through 8I4 and 8I7 in the control register 132. The operation of the control register 132 responsive to the various commands is tabulated in table A above. The control register 132 provides control signals to the control logic 118 to provide for the particular sequence of operations transferring the message in the upper store of the message tracks 86 and 87 to the lower store of the display tracks 84 and 85.

Responsive to any command, as indicated above, the +K1 command signal is provided from the AND gates 958 and 957 in FIGURE 9 and the multivibrator 9Q6 is operated to develop the +K1* signal. The +K1* signal operates an AND gate 1444 in the sequence control logic 125 to set the flip-flop 14S2 of the counter 127. As indicated in Table B above, the flip-flop 14S1 is not utilized for the command C4 as the first sub-operation occurs responsive to the +S2 signal. It is for this reason that the flip-flop 14S2 is set. As described above, during the keyboard entry command C1 and as also illustrated in Table B, the flip-flop 14S5 is first set. Depending, therefore, upon the particular command, one or the other of the flip-flops 14S1 through 14S5 is set initially by the control logic 118.

The +S2 signal from the counter 127 operates the AND gate 1030 at the top of FIGURE 10 which forms part of the control logic 118. The other two inputs to the AND gate 1030 are the +I7 signal which, as described above, is provided responsive to the −C4 command signal and also the $+\overline{K8}$ signal which is negative to indicate a copy sequence of operations. The AND gate 1030 enables the OR gates 1032 to provide the +K29 signal which indicates that a mark may be read. The +K29 signal successively operates the gates 1035 and 1016 to develop the upper mark signal +K36. As described above, the +K36 signal enables the operation of the mark counter 119 in FIGURE 15. The +K36 signal is provided to the AND gate 1514 which is operated when the upper store is being read responsive to sensing the mark pulse therein. The flip-flop 15CM is, accordingly, set when the mark in the upper store of the track 90 is sensed.

The switch 101 functions to couple the mark pulses from the track 90 instead of from the track 88 to the reading amplifier 16RA responsive to the presence of the +K38 message signal from the control logic 118. The +K29 signal in FIGURE 10 from the OR gate 1032 is also provided to successively operate the gates 1037 and 1039 to develop the +K38 display store signal. The +K38 signal triggers the multivibrator 1009 to successively operate the gates 1044 and 1043. The gate 1043 provides a disabling potential $+\overline{K65}$ to the gates 1015, 1042, 1036 and 1035 and to the control logic 116 to permit the transients in the switches 100 and 101 to dissipate.

The reset sequence for the mark in the upper store of track 90 is substantially the same as that described above for resetting the mark during the send command C3. Briefly, the −P9 shift pulses successively set the flip-flops 15C1 and 15C2. When the flip-flop 15C2 is set, it functions to erase the mark recorded in the track 90 by enabling the AND gate 1625. When the flip-flop 15C3 is set, it halts the shift pulses −P9 and it disables the gate 1602 in the mark writing track. When the lower origin pulse +LOP is received, it operates the AND gate 1505 to set the flip-flop 15Q5. Then, when the +UOP pulse is received, the gates 1509, 1510 and 1511 are successively operated to trigger the multivibrator 15Q1 and to reset the mark counter 119 to the flip-flop 15C1. The multivibrator 15Q1 re-establishes the shift pulses and, this time when the flip-flop 15C1 is set, the −M11 disable potential is not present at the OR gate 1610 so that the AND gate 1602 is operated instead of the mark at the reset position in the upper store of the track 90.

When the flip-flop 15C3 is operated, it also now functions to operate the AND gate 1550 to develop the −D4B mark-done pulse. In the sequence control logic 125, the −D4B mark-done pulse triggers the multivibrator 14Q7 to develop a −P11 shift pulse to shift the counter 127 at the flip-flop 14S3.

As indicated in the above Table B, no sub-operation is accomplished by the +S3 signal so that a no-step signal is developed for shifting the counter 127 to the flip-flop 14S4. The +S3 signal is provided to successively operate the AND gates 1469, 1467 and 1417 to trigger the multivibrator 14Q7 and develop the shift pulse −P11. The shift pulse −P11 is actually developed responsive to the +Y clock pulse to the AND gate 1417 which is enabled by the +L9 potential responsive to the +S3 signal at the AND gate 1469.

When the flip-flop 14S4 is set, the +S4 signal is provided to the AND gate 1033 in the control logic 118. The AND gate 1033 operates the OR gate 1032 to develop the +K29 signal again and it also operates the OR gate 1031 to develop the +K26 read signal. The +K29 signal operates two AND gates 1035 and 1037 to develop the +K36 upper mark signal and the +K38 display store signal. The +K38 signal, as indicated above, operates the two switches 100 in FIGURE 29 and 101 in FIGURE 16 to establish paths to the message tracks instead of the display tracks. The +K36 upper mark signal from the OR gate 1016 is again provided to the mark control logic 116 to operate the mark control 119 when the mark in its reset position of the upper store is sensed. The mark counter 119 is operated to advance the mark from its first or reset position to its character position in the track 90. When the flip-flop 15C1 is set responsive to the −P9 shift pulse, it provides for reading the first character recorded in the upper store of the tracks 86 and 87 into the read register 102. When the flip-flop 15C1 is set, it operates the AND gate 1222 associated with the AND gate 1223. As described above, the +K26 read signal is provided in the control logic 118 at this time. The +X clock pulse is coupled to the AND gate 1222 to develop the −P1 read register shift pulse and the +P5 drum strobe pulse. Three of the shift and strobe pulses are provided during the time that the flip-flop 15C1 is set. The −P1 read register shift pulses are provided to the register 102 and the +P5 drum strobe pulses are provided to the four AND gates 2916 through 2919 at the output of the switch 100. The switch 100 is set to couple the information from the message tracks 86 and 87 to the AND gates 2916 through 2919 by the +K38 signal from the control logic 118. The +P5 strobe pulses, accordingly, introduce the first three bits in each of the message tracks 86 and 87 successively to the flip-flops 18R4 and 18R1 in the read register 102.

When the flip-flop 15C2 operates responsive to the next shift pulse −P9, it functions to erase the old mark in the reset position in track 90 by operating the AND gate 1625. The next −P9 shift pulse sets the flip-flop 15C3 to write the new mark in the track 90 and to develop the −D4B mark-done pulse. The −D4B pulse triggers the multivibrator 14Q7 to shift the sequence counter 127 to the flip-flop 14S5. During the +S4 signal from the counter 127, a character, accordingly, was read from the message tracks 86 and 87. During the +S5 signal, the character registered in the read register 102 is recorded in the display tracks 84 and 85 at the position indicated by the mark for the lower store of these tracks.

The +S5 signal operates an AND gate 1025 in the control logic 118 and the AND gate 1025, in turn, operates an OR gate 1013 and an OR gate 1028. The OR gate 1028 develops the +K22 write signal which is introduced to an AND gate 1027. The OR gate 1013 develops the +K14 write mark signal which successively operates the gates 1042 and 1038. The AND gate 1042 is operated because the flip-flop 8I5, as described above, is not operated responsive to the −C4 command. The +K37 lower mark signal is provided from the OR gate 1038 to the mark control message 116 in FIGURE 15 to again operate the mark counter 119.

The mark counter 119 is operated to advance the mark in the lower store of the track 88 and to initiate the writing sequence for the character registered in the read register 102. The character is recorded responsive to the operation of the flip-flop 15C1. When the flip-flop 15C1 is set, it in turn operates the AND gate 1027 in the control logic 118 to develop the +K41 write gate signal. As described above, the AND gate 1027 was enabled by the +K22 write signal. The +K41 gate signal is provided to the eight AND gates 1801 through 1808 at the output of the read register 102. The −K40 signal from the AND gate 1027 is provided to the OR gate 1241 in the control logic 118 to provide for the −P1 shift pulses to shift the character registered in the read register 102 to the switch 100 in FIGURE 29. The OR gate 1241 enables the AND gate 1202 and the +Y clock pulses thereto provide for the −P1 shift pulses. Three shift pulses are provided because the flip-flop 15C1 which enables the AND gate 1202 is set for a duration of three bits. In FIGURE 29, the information from the AND gates 1801 through 1808 is provided through the writing amplifiers 2903 through 2906 to the heads 74 and 75 associated with the tracks 84 and 85. The tracks 84 and 85 are selected because the +K38 potential from the control logic 118 in FIGURE 10 is not present at this time. The $\overline{+K38}$ potential is present.

When the flip-flop 15C2 is set, the old mark is erased and when the flip-flop 15C3 is set, the new mark is written in the next character position. The flip-flop 15C3 also develops the mark-done pulse −D4B which triggers the multivibrator 14Q7 to recirculate the counter 127 in FIGURE 14 back to the flip-flop 14S4. As described above, when the flip-flop 14S5 is set, a negative potential is provided from the OR gate 1408 to disable the AND gate 1407 and enable the AND gate 1434. A +P10 recirculating pulse is, accordingly developed instead of the −P11 shift pulse.

When the flip-flop 14S4 is again set, the sequence of operations of reading the next character from the upper store of the message tracks 86 and 87 is repeated and, when the flip-flop 14S5 is thereafter set, the character in the read register 102 is recorded in the next position of the lower store of the display tracks 84 and 85. The sequence continues in this manner with character after character being read from the upper store of the message tracks 86 and 87 and then recorded in the lower store of the display tracks 84 and 85, until the end of the message is reached or until the end of the lower store of the display tracks 84 and 85 is reached.

As described above, the mark may not be at the reset position for the lower store of the display tracks 84 and 85 when the command key 2C4 is depressed so that the message is recorded in the lower store starting at some intermediate position. If the message is sufficiently long so that the end of the lower store is reached before the end of the message, the command C4 condition of the apparatus 50, is terminated. The termination occurs responsive to the reset mark pulse for the lower store of the display tracks.

When the reset flip-flop 1505 is set it operates the gate 1408 in the sequence control logic 125. The gate 1408 enables the gate 1407 and disables the gate 1434 so that the next time that the multivibrator 1407 is triggered, a −P11 shift pulse instead of a recirculating +P10 pulse is developed. The −P11 pulse successively operates the gates 1479 and 1470 to develop the clear pulse −S6. The control register 132 is reset by the −S6 pulse to return the apparatus 50 to its normal display condition.

SWITCH 99

Two switches, 99 and 103, were described above in reference to FIGURES 1 and 3. As illustrated in FIGURE 3, the switches 99 and 103 control the paths from the upper and lower message stores to the tracks 86 and 87. The sequence of operations for the command C4 described above is when the switch 99 is in its normal position, as shown in FIGURE 3, and the sequence of operations for the command C5, which is hereinafter described, is when the switch 103 is in its normal position, as also shown in FIGURE 3.

When the switch 99 is operated, it provides for the transfer of the information in the upper message store of the tracks 86 and 87 to the lower display store of tracks 84 and 85 when the command key 2C4 is depressed. The sequence of operations responsive to the depression of the key 2C4 with the switch 99 operated, is substantially the same as that described above except that the flip-flop 8I5 now is set as well as the flip-flops 8I1 through 8I4 and 8I7. In FIGURE 27, the switch 99 is depicted and, when it is closed, a C4A signal is provided to set the flip-flop 8I5 in the control register 132. The control register 132 initiates a sequence of operations for resetting the upper mark which is identical to that described above during the command C4 sequence. The flip-flop 14S2 in the sequence counter is set to develop the +K36 signal which enables the mark counter 119. The mark in the upper store of the track 90 is reset. The +S3 signal initiates a no-step sequence and during the +S4 signal, the first character is read from the upper store of the message tracks 84 and 85. The sequence which occurs during the +S3 and +S4 signal is identical to that described above.

However, when the flip-flop 14S5 is set to initiate the writing or recording sequence, the information is now provided to the upper store instead of the lower store of the display tracks 84 and 85. The reason for this different direction is because a +K36 signal is developed instead of a +K37 signal in FIGURE 10. With the flip-flop 8I5 set, the gate 1015 is operated instead of the gate 1042 to provide for this difference in control signals. Thereafter, the sequence in the mark counter 119 is the same except that now the mark in the upper store of the display tracks 84 and 85 instead of in the lower store is sensed. The sequence continues in this manner with each character being read from the upper store of the message tracks 86 and 87 during the +S4 signal and then written in the upper store of the display tracks 84 and 85 during the +S5 signal.

ENTER MESSAGE FROM LOWER MESSAGE STORE (COMMAND C5)

When the command key 2C5 in FIGURES 1 and 2 is depressed, the sequence of operations is provided which is substantially the same as that described above responsive to the depression of the command key 2C4. The switch 103 is normal in the position in FIGS. 3 and 27. When the command key 2C5 is depressed, the message in the lower store of the message tracks 86 and 87 instead of in the upper store is transferred to the lower store of the display tracks 84 and 85. When the command key 2C5 is depressed, the flip-flops 8I1, 8I3, 8I4 and 8I7 are set. The flip-flop 8I2, which is also set in addition to the others set when the key 2C4 is depressed, is not set when the key 2C5 is depressed. In the control logic 118 in FIGURE 10, the +K29 signal, accordingly, provides for the lower mark signal +K37 instead of the upper mark +K36 during the reset mark sequence. The gate 1036 is operated instead of the gate 1035 to provide for the +K37 signal. The mark in the lower store of the message tracks 86 and 87 is, accordingly, reset instead of the mark in the upper store.

During the first sequence of operations of the mark counter 119, the mark in the lower store of the track 90 is reset. During the second sequence of operations of the mark 119 responsive to the +S4 pulse from the sequence counter 127, the first character in the lower store of the message tracks 86 and 87 is read into the read register 102. Again, during this sequence, the +K37 lower mark signal is provided instead of the +K36 upper mark signal. In FIGURE 15, the AND gates 1517 and 1518 are, accordingly, effective to operate the mark counter 119 instead of the gates 1514 and 1516. When the +S5 signal is provided, the mark counter 119 is again operated to record the information in the read register 102 into the lower store of the display tracks 84 and 85.

At the end of the message, when the AND gate 1470 in the counter 127 is operated, the −S6 reset signal resets the control register 132 to return the data composer apparatus 50 to its normal display condition. The +K24 display signal is again provided in FIGURE 11 and the new message recorded in the lower display as well as the message in the upper display are reproduced at the display tube 57.

SWITCH 103

As described above, the switch 103 shown in FIGURE 1 on the side of the cabinet section 59 is utilized to switch the path from the lower store of the message tracks 86 and 87 to the upper display store instead of to the lower display store. The switch 103 is shown in FIGURE 27 and, when it is closed, the C4A signal is generated together with the C5 signal when the key 2C5 is depressed. The flip-flop 8I5 is then set in addition to the flip-flops 8I1, 8I3, 8I4 and 8I7. The sequence of operations which ensure is exactly the same as that described above during the command C5 sequence except now the information is entered to the upper display store instead of to the lower display store. This occurs because during the writing sequence, the AND gate 1015 is now operated to provide for the +K36 upper mark signal instead of the +K37 lower mark signal.

RECORD MESSAGE IN UPPER STORE (COMMAND C6)

When the command key 2C6 is depressed, it initiates a sequence of operations for transferring the message registered in the lower display store to the upper fixed message store. In other words the information recorded in the lower store of the two tracks 84 and 85 is transferred to the upper store of the two tracks 86 and 87. FIGURE 3 illustrates this information transfer path. The sequence of operations responsive to the depression of the key 2C6 is somewhat similar to that described above in response to the operations controlled by the keys 2C4 and 2C5 except that the paths of information transfer are somewhat different. Further the mark for the lower display store as well as for the upper fixed message store is reset so that the entire message in the lower display store is transferred. As described above for the command 2C4 for example, the mark in the display store is not reset so that the entire message recorded in the fixed message store may not necessarily be transferred.

Then the command key 2C6 is depressed, it provides for the −C6 pulse from FIGURE 27 to the control decoder 133 which sets the flip-flops 8I1, 8I4 through 8I8. These six flip-flops 8I1 and 8I4 through 8I8 are set to indicate that the information is to be read from the lower part of the display store and to be written in the upper part of the fixed message store. The flip-flops 8I7 and 8I8 indicate that the mark for the lower display store is to be reset and the mark for the upper message store is to be reset respectively. When these six flip-flops are set, they provide control signals to the control logic 118 to provide for the transfer function. The +K1 and K1* signals are developed for setting the flip-flop 14S2 in the sequence counter 127. The AND gate 1444 is enabled at this time and the AND gate 1401 is disabled so that the flip-flop 14S2 is set. Thus far the sequence is identical for that described above in reference to the commands C4 and C5.

Responsive to the +S2 signal in the control logic 118 the AND gate 1030 is operated to in turn operate the AND gate 1032 and provide the +K29 read mark signal. The +K29 signal however now operates the AND gate 1036 instead of the AND gate 1035. The AND gate 1036 is operated because the flip-flop 8I2 is in its reset condition. The AND gate 1036 provides for the +K37 lower mark signal to the mark control circuit 116. The mark track switch 101 in FIGURE 16 is set to couple the display mark track 88 to the reading amplifier 16RA and drivers 1605 and 1626, respectively, instead of the track 90 because the +K38 message signal is not provided. As described above the +K38 display signal is provided from the AND gate 1037 which is disabled at this time because the +I3 signal is not present for the C6 command.

In this manner, when the mark in the lower store of the track 88 is sensed, the AND gates 1517 and 1518 are operated to set the flip-flop 15CM and the block mark flip-flop 15Q20. The sequence of operation in the mark counter 119 and controlled thereby are exactly the same as that described above for resetting the mark. The mark is erased during the first cycle of the mark counter 119 and then during its second cycle of operations when the flip-flop 15Q5 has been set and the multivibrator 15Q1 triggered the new mark is recorded in the reset position of the lower store of the mark display track 88.

The −D4–B mark done signal generated from the flip-flop 15C3 is provided to the multivibrator 14Q7 to shift the counter 127 to the flip-flop 14S3. In the sequences for the commands C4 and C5 a no step signal was developed for shifting the counter to the flip-flop 14S4 without any sub-operation being performed by the +S3 signal. For the command C6 however the +S3 signal enables a gate 1012 in the control logic 118. The gate 1012 in turn operates the OR gates 1013 and 1028 to operate the gate 1014 and also the gate 1015. The AND gates 1014 and 1015 respectively provide for the +K38 display store signal and the +K36 upper mark signal. The +K38 signal operates the switches 100 and 101 to the associated display tracks and the +K36 signal initiates the operation of the mark counter 119. The operation of the mark counter 119 is exactly the same as that described above for the reset mark function except that the mark in the upper mark of the display store is reset instead of the lower mark in the display store.

The −D4–B mark done pulse following the reset of the upper mark in the track 90 sets the flip-flop 14S4 and the information in the first character space of the lower display is read out. The mark in the track 88 is also automatically advanced. The next mark done pulse −D4–B shifts the counter 127 to the flip-flop 14S5 and the character registered in the read register 102 is now recorded in the upper message store. The mark for the upper message store in track 90 is also automatically advanced. When the flip-flop 15Q5 is reset at the end of the information transfer sequence, it provides for the −S6 clear pulse from the counter 127 to reset the control register 132 and normalize the data composer apparatus 50. The +K24 signal in FIGURE 11 is restored to initiate the display. The information in the lower display still remains in the lower display so that it is reproduced on the face of the display tube 57.

RECORD MESSAGE IN LOWER STORE (C7 COMMAND)

When the key 2C7 of the keyboard 51 is depressed, it initiates a sequence of operation for recording the message in the lower display into the lower store of the tracks 86 and 87. The sequence of operations is substantially the same as that described above for the C6 command in which the message is recorded in the upper store of the tracks 86 and 87 except that now the flip-flop 8I5 is not operated. Responsive to the −C7 command the flip-flops 8I1, 8I4, 8I6 and 8I7 are set.

In the control logic 118 in FIGURE 10 during the writing sequence for the information registered in the read register 102, the +K14 write mark signal operates the AND gate 1042 instead of the AND gate 1015 because the +I5 signal is not provided to the AND gate 1015. Accordingly the +K37 lower mark signal is provided instead of the +K36 upper mark signal and this determines in which of the two message stores the registered character is to be recorded. The +K37 signal operates the mark counter 119 in the manner described above to provide for recording the registered character in the lower store of the tracks 86 and 87.

The sequence continues as character after character is first read from the lower store of the display tracks 84 and 85 and then recorded in the lower store of the message tracks 86 and 87. When the recording sequence terminates by the reset pulse Q5, the apparatus 50 returns to its display condition.

COPY CHARACTER (COMMAND C8)

When the key 2C8 of the keyboard 51 is depressed, a character is copied from the position indicated by the mark in the upper store of the display to the position indicated by the mark in the lower store of the display. In other words a character is transferred from the upper to the lower display.

When the −C8 command signal is provided to the decoder 133 it operates the flip-flops 8I1, 8I2 and 8I4 in the control register 132 in FIGURE 8. As illustrated in Table B for the command C8 the flip-flop 14S4 of the sequence counter 127 is first set. The +I1, +I2 and +I3 signals enable an AND gate 968 to develop the −K8 copy signal. An OR gate 914 inverts the signal to provide for a +K8 copy signal to an AND gate 1445 in the sequence control logic 125. The +K1* signal provided from the control logic 118 together with the +K8 signal provide for operating the AND gate 1445. The other two AND gates 1401 and 1444 are disabled when the +K8 copy signal is provided. The AND gate 1445 sets the flip-flop 14S4 in the sequence counter 127.

With the flip-flop 14S4 set a character is read from the upper store of the tracks 84 and 85 of the drum 64. The +S4 signal enables an AND gate 1033 in the control logic 118 to provide for the +K26 read signal and the +K29 allow read mark signal. With the +I2 signal present the AND gate 1035 is operated to in turn operate the OR gate 1016 and develop the +K36 upper mark signal. The +K36 signal initiates the operation of the mark control logic 116 and the mark counter 119 to provide for reading the character indicated by the mark in the upper display and for advancing the mark in the upper display to the next character.

During the +C1 signal from the mark counter 119 the AND gate 1222 is operated to develop the −P1 shift pulses and the +P5 drum stroke pulses. Three of these pulses are provided because the +C1 pulse has a duration of three bits. In FIGURE 29 the switch 100 is set to enable the display tracks 84 and 85 and in FIGURE 16 the switch 101 is set to enable the track 88 because the $+\overline{K38}$ signal is present and not the message signal +K38. The three bits are accordingly read from the upper display into the read register 102. The +C2 pulse from the mark counter 119 erases the old mark and the +C3 pulse provides for recording the new mark in the next character position.

The +C3 pulse also provides for the −D4–B mark done pulse which triggers the multivibrator 14Q7 to shift the sequence counter 127 to the flip-flop 14S5. When the flip-flop 14S5 is set, it provides for a writing sequence to record the character in the read register 102 into the lower display. In the control logic 118, the +S5 signal operates an AND gate 1025 to develop the +K14 write mark signal at the OR gate 1013 and the +K22 write signal at the OR gate 1028. The +K14 signal operates the AND gate 1042 to develop the +K37 lower mark signal to indicate that the character is to be written in the lower store. The +K37 signal initiates the operation of the mark counter 119 when the mark in the lower store of the track 88 is sensed.

When the +C1 signal is provided from the mark counter 119 it operates the AND gate 1027 in the control logic 118. The AND gate 1027 provides for the −K40 signal to FIGURE 12. It also provides for the +K41 write gate signal to the AND gates 1801 through 1808 at the output of the read register 102. The −K40 signal in FIGURE 12 functions to successively operate the gates 1241, 1202, 1204 and 1205 to develop the −P1 shift pulses. The character in the read register 102 is accordingly shifted out through the enabled gates 1801 through 1808 to the switch 100 in FIGURE 29 to record the character in the tracks 84 and 85 of the drum 64.

In FIGURE 9 the +K8 copy signal is provided to three AND gates 930 through 932. The AND gate 930 is operated when a single character is to be copied, the AND gate 931 is operated when a word is to be copied, and the AND gate 932 is operated when a complete line is to be copied. For the command C8 neither of the flip-flops 8I7 or 8I8 are set so that the AND gate 930 is operated by the +K8 signal. The AND gate 930 provides a −K9 signal to ready the sequence control logic 125 for a reset operation after the single character has been written on the drum 64. The −K9 signal is provided to operate an OR gate 1451 and provide a positive potential to an AND gate 1432. The +S5 signal provided from the flip-flop 14S5 operates the AND gate 1432 to provide enabling potential to the OR gate 1408. The positive potential from the OR gate 1408 enables the AND gate 1407 and disables the AND gate 1434. The next time the multivibrator 14Q7 is triggered which is by the −D4–B mark done pulse from the mark control logic 116 a −P11 shift pulse is generated instead of a +P10 recirculating pulse.

The −D4 mark done pulse from the control logic 116 accordingly provides for a shift pulse to the gate 1479 which operates the AND gate 1470 developing the −S6 reset signal which is provided to the control register 132. The control register 132 is accordingly reset and the data composer apparatus 50 returned to normal. The display signal +K24 in FIGURE 11 is restored so that the display is reinitiated. The character which was read from the upper display remains in the upper display and the character recorded in the lower display has been recorded over or typed over the old character in the lower display. The new character alone is of course reproduced on the face of the display tube 57. In this manner it is not necessary to erase a character but a new character is provided in the lower display by the copy operation merely by typing over.

COPY WORD (COMMAND C9)

The sequence of operations for the copy word command C9 is exactly the same as that described above for the copy character C8 command except that the —K9 signal is not provided from the AND gate 930 and instead the AND gate 931 is operated. The —C9 command signal sets the flip-flops 8I1, 8I2, 8I4 and 8I8 with the flip-flop 8I8 set the AND gate 931 instead of the AND gate 930 is operated by the +K8 copy signal.

The sequence of operations is not terminated now in the sequence control logic 127 because the —K9 signal is not provided. Character after character is read from the upper display and then written in the lower display over the previous character with a recirculating signal +P10 being provided instead of the —P11 shift pulse when the multivibrator 14Q7 operates after each writing sequence. The sequence continues in this manner until the function decoder 124 in FIGURE 19 detects the code for a space.

As described above, the function decoder 119 is connected to the output of the five flip-flops 18R1 through 18R5 of the read register 102. As shown in the above table A the code for a space is 00100. Accordingly the flip-flop 18R3 of the five flip-flops 18R1 through 18R5 is set when a space code is read from the upper display into the read register 102. In FIGURE 19 with the flip-flop 18R3 alone set, the AND gate 1901 is operated to in turn operate an OR gate 1913 to develop the +F3 signal. The +F3 signal is provided to an AND gate 972 in the control logic 118. The other inputs to the AND gate 972 is a +K10 signal from an OR gate 971 and the OR gate 971 is operated by the +C2 signal from the mark counter 119 during the time the +S4 is provided from the sequence counter 127. In other words after a character has been read from the upper display into the read register 102 the +K10 signal is provided. The characters are read during the +C1 signal and during the +S4 signal.

When the +S5 signal is applied, a writing sequence takes place. If the code in the read register is that of a space the +F3 signal is provided to the AND gate 972 to operate it and develop the —K72 signal which initiates a normalizing sequence for the data apparatus 50. The —K72 signal is provided to an OR gate 1462 to set the flip-flop 14Q15. The flip-flop 14Q15 operates an OR gate 1430 whcih provides an enabling potential to the AND gate 1432. The AND gate 1432 is not, however, operated because at this time the flip-flop 14S4 instead of the flip-flop 14S5 is set. The mark counter 119 completes it operation with the mark being erased by the +C2 signal and the new mark written by the +C3 signal. The —D4–B mark done pulse triggers the multi-vibrator 14Q7 to set the flip-flop 14S5 and to reset the flip-flop 14S4. During the time that the flip-flop 14S5 is set the character registered in the read register 102 is written in the lower display. This character is the code for a space.

When the writing sequence is completed and the mark has been advanced the next —D4 mark done pulse now develops again a —P11 shift pulse and does not develop the +P10 recirculating pulse because the AND gate 1432 is now operated. In this manner the next shift pulse operates the AND gate 1470 to develop the —S6 signal which resets the control register 132 and returns the data composer apparatus 50 to normal.

COPY LINE (COMMAND C10)

The sequence of operations for copying a line of the upper display is initiated by depressing the command key 2C10 of the keyboard 51. If the mark in the upper display is at the beginning of one of the three lines the entire line is recorded in the lower display provided its mark is also at the beginning of the line. If the mark in the upper display is not at the beginning of the line, only the portion of it following the mark is transferred to the lower display.

The sequence of operations is substantially similar as that described above for copying a word in command C9 except that now the AND gate 931 in the control logic 118 is not operated. The —K72 signal is, accordingly, not developed when a space character is recognized by the decoder 95 so that the AND gate 972 is not operated to in turn set the flip-flop 14Q15 in the sequence control logic 124. The copying sequence, accordingly, continues as word after word is copied.

With the flip-flop 8I7 set and not the flip-flop 8I8, the three inputs to the AND gate 932 are positive. The AND gate 932 forms a composite AND gate together with an AND gate 933. The three inputs to the AND gate 933 are the +Q1 signal from FIGURE 15, the +U signal from the generator 123 in FIGURE 24, and the +Q5 reset signal from the mark control logic 116 in FIGURE 15.

At the end of the line, the +LP pulse operates an AND gate 1512 after the last character in the line has been recorded. The AND gate 1512 successively operates the gates 1510 and 1511 to trigger the multivibrator 15Q1. When the multivibrator 15Q1 is set, it operates the composite AND gate, including the gates 932 and 933 to develop the —K11 signal. The —K11 signal operates the OR gate 1472 in the sequence control logic 125 to set the flip-flop 14Q5. The mark-done pulse —D4B, provided from the control logic 116, thereafter, accordingly, develops a —P11 shift pulse instead of a +P10 recirculating pulse so that the AND gate 1470 is operated to develop the —S6 reset pulse. The data composer apparatus 50 is, accordingly, returned to normal responsive to the line pulse +LP from the generator 123 to the mark control logic 116.

The LP pulse is only effective to halt the copying sequence when the upper store is being read. During the time the information is being written, the +L pulse from the generator 123 is provided so that the copying sequence does not stop at the end of the line of the lower display. In other words, if the mark is at the middle of the line in the lower display when the line copying command C10 is initiated and the mark in the upper display is at the beginning of a line, a portion of the line from the upper display is recorded in the last part of the line in the lower display and the rest of the line from the upper display is recorded in the next line of the lower display.

COPY MESSAGE (COMMAND C11)

Responsive to the depression of the command key 2C11, the entire message in the upper display store may be recorded in the lower display store. The flip-flops 8I1, 8I2, 8I4, 8I7 and 8I8 are operated responsive to the —C11 command signal. None of the three AND gates 930 through 932 are operated during this sequence because both the +I7 and the +I8 signals are present. The commands —K9, —K10 and —K11 are, accordingly, not generated during the sequence for the command C11. The K1* and K8 signals are, however, developed in the control logic 118 for setting the flip-flop 14S4 and for initiating the copying sequence. Character after character is copied and line after line is copied from the upper display store into the lower display store without interruption due to the absence of the —K9, —K10 and —K11 stop signals.

When, however, the rest flip-flop 15Q5 in the control logic 116 is set responsive either to the UOP pulse during reading or responsive to the +LOP pulse during writing, it halts the copying sequence. In other words, the copying sequence is terminated when the end of either the upper or lower display stores is reached. The two stores need not necessarily reach their terminating points at the same time because the two marks need not be at their reset positions or at corresponding intermediary positions when the message copy command is initiated responsive to the message copy key 2C11. The entire message following the mark in the upper display store is copied into the lower display store provided and is sufficient room in the lower display store following its mark. If both the upper and lower display marks are in their reset positions, then the entire message from the upper display is copied into or typed over into the lower display store. When the end of either the upper or lower display stores is reached, the reset flip-flop 15Q5 is triggered. The +Q5 signal is provided to an AND gate 1461 in the sequence control logic 125.

When either of the flip-flops 14S4 or 14S5 is set, the OR gate 1469 is operated to, in turn, enable the AND gate 1461. The +Q5 signal, accordingly, operates the AND gate 1461 to set the flip-flop 14Q15. The stop flip-flop 14Q15 is in this manner set when the reset signal is provided for either the upper or the lower store. The —Q15 signal from the flip-flop 14Q15 operates the OR gate 1430 which enables the AND gate 1432. If the +S5 signal is present at this time, which would occur if the reset signal was for the lower store (writing), the AND gate 1432 is enabled and the next mark-done pulse +D4B develops a shift pulse —P11 for operating the AND gate 1470 and developing the clear signal —S6. If the +Q5 reset signal was provided for the upper store (reading) the +S4 signal is present so that the AND gate 1432 is not enabled at this time. However, since the AND gate 14S5 is not enabled, the next pulse from the multivibrator 14Q7 is passed through the AND gate 14Q7 as a shift pulse to set the flip-flop 14S5. The operation of the multivibrator 14Q7 thereafter functions to again develop a —P11 shift pulse because the AND gate 1432 is now operated. This latter shift pulse operates the AND gate 1470 to develop the clear pulse —S6. The last character was recorded during the +S5 signal.

In this manner, when the end of either the lower or the upper stores is reached, as signified by the development of a +Q5 reset signal, the clear signal —S6 is provided for resetting the control register 132 and returning the data composer apparatus 50 to its normal display condition.

SKIP LOWER MARK (COMMAND C12)

The commands C12 through C19 are different commands for changing the address of the mark in the upper or lower store of the mark display track 88. The marks in the message stores of track 90 are not separately addressable. The mark in each of the two display stores can be skipped or advanced one character, back spaced one character, reset to the beginning of the store, or advanced to the beginning of the next line in the store. The commands C12 through C19 provide for these different functions. The commands C12, C14, C16 and C18 are for the mark in the lower store and the commands C13, C15, C17 and C19 are for the mark in the upper store. FIGURE 31 illustrates the operation of the counter 119 for the various mark address commands.

The —C12 pulse from the keyboard 51 in FIGURE 27 responsive to the key 2C12 is provided to the decoder 133 in FIGURE 8 which operates the flip-flop 8I6 in the control register 132. The flip-flop 8I6 is the only one of the eight flip-flops 8I1 through 8I8 which is set responsive to the —C12 pulse from the keyboard 51. When the flip-flop 8I6 is set, it operates the control logic 118 to provide for skipping or advancing the mark in the lower store of the mark display track 88 one step.

In the control logic 118, the AND gate 934 is operated as none of the flip-flops 8I1, 8I4, or 8I7 is set. The gate 934 develops the —K13 signal which, in the sequence control logic 125, in turn, operates the AND gate 1447. The AND gate 1408 is operated responsive jointly thereto and to the +K1* signal provided from the multivibrator 9Q6 responsive to the command.

The —K13 signal also operates the OR gate 1462 which sets the stop flip-flop 14Q15. The flip-flop 14Q15 enables the OR gate 1430 which provides an enabling potential to the AND gate 1432. As is hereinafter described, when the +S5 signal is provided from the flip-flop 14S5 in the sequence counter 127, the AND gate 1432 is operated to provide for a shift pulse —P11 to operate the AND gate 1470 and thereby reset the control register 132.

When the +S1 signal is provided from the flip-flop 14S1, it operates successively the gates 1034, 1032 and 1036. The gate 1036 is operated because the flip-flop 8I2 is not set at this time. The AND gate 1036, in turn, operates the OR gate 1038 to develop the +K37 lower mark signal which operates control logic 116 in FIGURES 15 and 16. During the lower store, when the mark is sensed, in the track 88, it operates the mark counter 119. The functions provided by the mark counter 119 are similar to those described above. The mark is erased during the +C2 signal which operates the AND gate 1625 and the new mark is written during the +C3 signal which enables the AND gate 1602.

The —D4B end mark pulse responsive to the +C3 pulse triggers the multivibrator 14Q7 to step the sequence counter 127 to the flip-flop 14S2. No further sub-operations are provided under control of the operation of the sequence control 127 so that no step signals are developed responsive to the operation of the flip-flops 14S2 through 14S5 for advancing the sequence control 127 and for operating the AND gate 1470 at its output. The +S2 signal operates successively the gates 1414, 1416, 1417 and 1419 to trigger the multivibrator 14Q7.

The +S3 signal provided from the flip-flop 14S3 successively operates the AND gates 1469, 1467, 1417 and 1419 to also trigger the multivibrator 14Q7 and advance the counter to the flip-flop 14S4. The $+\overline{S4}$ signal which is now negative, operates successively the gates 1460, 1468, 1467 and 1417 to trigger the multivibrator 14Q7.

The +S5 signal operates the AND gate 1432 which was enabled, as described above, responsive to the operation of the stop flip-flop 14Q15. The AND gate 1432 provides for enabling the AND gate 1407 and disabling the AND gate 1434 even though the $+\overline{S5}$ signal is removed from the OR gate 1410. A no-step signal is provided by the $+\overline{S5}$ signal at the OR gate 1460 which provides for triggering the multivibrator 14Q7. A —P11 shift pulse is, accordingly, provided for successively operating the gates 1479 and 1470 to provide for the —S6 clear pulse to the control register 132. With the control register 132 reset, normal display is resumed. The only change due to the operation of the key 2C12 is that the mark in the lower store of track 88 has been advanced.

SKIP MARK UPPER (COMMAND C13)

The sequence of operations responsive to the depression of the command key 2C13 on the keyboard 51 is exactly the same as that described above for the command C12 except that the mark is skipped or advanced in the upper store of the track 88 instead of in the lower store.

When the —C13 signal is provided to the decoder 133 in FIGURE 8, it sets the flip-flops 8I2 and 8I6. For the command C12 only the flip-flop 8I6 was set. In the control logic 118, these commands provide for the KI* command signal and for the —K13 mark signal. These two signals enable the AND gate 1401 to set the flip-flop 14S1.

The flip-flop 14S1 successively enables the gates 1034, 1032, 1035 and 1016 to provide for the +K36 upper mark signal. In the sequence for the command C12 where the mark in the lower store was skipped, the +K37 signal was provided instead of the +K36 signal. The +K37 signal initiates the operation of the mark counter 119 and the ensuing operations are exactly the same as that described above under command C12 except that the mark in the upper store instead of the lower store is sensed to provide for the mark advance.

RESET MARK LOWER (COMMAND C14)

In FIG. 31, the various curves illustrate the operation of the counter 119 for changing the address of the display marks. In the lower power of FIG. 31 for the reset mark the time axis is compressed relative to the time axis of the other curves. This becomes readily evident upon a consideration of the curves. For example, the mark count or shift pulses —P9 are closer spaced than in the curve in the upper portion of FIG. 31.

When the key 2C14 of the keyboard 51 is depressed, the flip-flop 8I7 in the control register 132 is set. None of the other flip-flops are set for this command. The control register 132 operates successively the gates 948 and 951 in the control logic 118. The AND gate 948 provides for the —K64 signal and the OR gate 951 provides for the +K64 signal to two gates 950 and 954. The —K64 signal is provided to the sequence control logic 125 where it operates an OR gate 1447 to, in turn, operate the AND gate 1401 and set the flip-flop 14S1. When the flip-flop 14S1 is operated, it operates the AND gate 954 which was enabled by the +K64 signal from the OR gate 951. The —K61 signal from the AND gate 954 is inverted by the OR gate 956 to provide for the +K61 signal to the mark control logic 116.

The +S1 signal from the counter 127 also functions to develop the +K37 lower mark signal. The gates 1034, 1032, 1036 and 1038 are successively operated to develop the +K37 signal. The +K37 signal enables the operation of the flip-flop 15CM of the mark counter 119 when the mark in the lower store is sensed. The flip-flop 15CM remains, however, set and the counter 119 is not shifted because the —P9 pulses are inhibited.

The —P9 pulses are inhibited at the gate 1538. The —K61 signal from the control logic 118 disables the gate 1538 which forms a composite AND gate with the gate 1536 for the shift pulses —P9. When the +LOP pulse is received it operates an AND gate 1543 which is enabled by the +K61 signal. The gate 1543 operates an OR gate 1542 to set the flip-flop 15C2. The +C2 signal operates the gates 1625 to erase the lower store of the track 88. Any mark in the lower store of the track 88 is accordingly erased.

When the +UOP pulse arrives indicating the end of the lower store the flip-flop 15C2 is erased. The +UOP pulse operates successively the gates 1547 and 1549 to reset the flip-flop 15C2 and thereby terminate the mark erasure sequence. The AND gate 1547 also operates the OR gate 1551 to develop a —D4–B mark done pulse. The —D4B mark-done signal triggers the multivibrator 14Q7 to shift the counter 127 to the flip-flop 14S2. The +S2 signal in FIGURE 10 operates the AND gate 1030 to develop the —K25 signal. The reset mark flip-flop 15Q5 is set responsive to the —K25 signal. The —K25 signal successively enables the gates 1504, 1502 and 1503 to set the flip-flop 15Q5. The +K64 signal is provided to the AND gate 1502 from the OR gate 951, which, as described above, was operated responsive to the control signal from the control register 132. The flip-flop 15Q5 enables an AND gate 1461 at the input of the stop flip-flop 14Q15. As is hereinafter described, when the +S4 signal is provided, it functions to set the flip-flop 14Q15 to provide for the clear pulse —S6.

In FIGURE 15, when the next +LOP pulse is received at an AND gate 1509, it successively operates the gates 1510 and 1511 to trigger the multivibrator 15Q1. As described above, the —K61 signal was provided to an OR gate 1538 to disable the —P9 shift pulses. The +S1 signal, however, is now removed to terminate the +K61 signal because the flip-flop 14S2 is now set.

Responsive to the operation of the multivibrator 15Q1, the mark counter 119 is now successively operated and the +C3 signal provides for recording the mark in the reset position of the lower store. The AND gate 1602 is now enabled because the —K61 signal was removed when the flip-flop 14S1 was reset. The —D4B mark-done pulse triggers the multivibrator 14Q7 to shift the counter 127 to the flip-flop 14S3. The +S3 signal operates an AND gate 1469 to provide for a no step signal —L15 for shifting the counter 127 to the flip-flop 14S4. The +S4 signal operates the OR gate 1460 to trigger the flip-flop 14Q15 and also to operate the AND gate 1468 to develop a no-step signal for shifting the counter 127 to the flip-flop 14S5.

The —Q15 stop signal operates the OR gate 1430 to provide enabling potential to the AND gate 1432. The +S5 signal operates the AND gate 1432 to provide for enabling the AND gate 1407. The flip-flop 14S5 also successively operates the gates 1460 and 1468 to provide for another no-step pulse. The shift pulse —P11 developed responsive thereto operates the gate 1470 to generate the —S6 clear pulse to the control register 132. The control register 132, is, accordingly, reset and the data composer apparatus 50 returns to its normal display position.

RESET UPPER MARK (COMMAND C15)

The sequence of operations for the command C15 is identical as that described above for the command C14 except that the mark is reset in the upper store of the track 88 instead of in its lower store. The —C15 pulse provides for setting the flip-flops 8I2 and 8I7. The flip-flop 8I2 indicates that the control operation is in the upper store.

In the control logic 118, the AND gate 950 instead of the AND gate 954 is now operated. The AND gate 950 provides for the —K60 signal which operates the OR gate 952 to provide for the +K60 signal. The +K60 signal successively operates the gates 1614 and 1615 in the mark control logic 116 to disable the AND gate 1602 in the mark recording channel.

The —K64 signal provided from the AND gate 948 in the control logic 118 functions to set the flip-flop 14S1 just as for the command C14. In FIGURE 10, the +S1 signal now successively operates the gates 1034, 1032, 1035 and 1016 to develop the +K36 upper mark signal instead of the +K37 lower mark signal. The +K36 signal enables the operation of the mark counter 119 and, when the mark in the upper store is sensed, the flip-flop 15CM is set. The shift pulses are, however, disabled by the —K60 signal to the gate 1538. The flip-flop 15C2 is set by the +UOP pulse to the AND gate 1540. The AND gate 1540 operates the OR gate 1542 to set the flip-flop 15C2. The entire upper store is, accordingly, erased. The +LOP pulse to the gate 1546 resets the flip-flop 15C2 and provides for a mark done —D4B pulse. The —D4B pulse triggers the multivibrator 14Q7 to set the flip-flop 14S2. When the flip-flop 14S2 is set, it provides for recording the new mark in the reset position of the upper store of the track 88. The next UOP pulse triggers the multivibrator 15Q1 to provide for this operation. The AND gate 1602 and the AND gate 1538 are no longer disabled as the —K60 signal is removed when the flip-flop 14S1 resets.

The sequence counter is thereafter advanced by the no-step signal in a manner exactly the same as that described in the command C14. The last step provides for the —S6 clear signal to reset the control register 132.

BACK SPACE LOWER MARK (COMMAND C16)

When the command key 2C16 of the keyboard 51 is depressed, only the flip-flop 8I5 in the control register 132 is set. The sequence of operations is substantially the same as for the command C12 except that the mark is written during the +C1 signal instead of the +C3 signal. In other words, the mark is first written and then, when the old mark passes adjacent the recording head 78 in FIGURE 16, it is erased.

The +I5 signal in FIGURE 9 provides for the +KI* command signal and for the +K13 and —K13 signals. The +K13 signal operates successively the AND gates 937 and 938 to develop the +K16 backspace signal. In FIGURE 14, the —K13 signal functions to set the flip-flop 14S1. During the +S1 signal, the mark is backspaced. The +S1 signal is provided to the control logic 118 where it operates successively the gates 1034, 1032, 1036 and 1038 to provide the +K37 lower mark signal. The +K37 signal enables the operation of the mark counter 119 during the lower store. When the mark is sensed, it operates the flip-flop 15CM. The first —P9 shift pulse sets the flip-flop 15C1 which records the mark in the track 88. The +K16 backspace signal enables the AND gate 1601 which is operated by the +C1 signal to successively operate the gates 1603 and 1604 to provide for the mark. The +C2 signal functions to operate the AND gate 1625 to provide for erasing the mark. The +C3 signal does not function to record a mark because the AND gate 1602 is disabled by the —K16 signal at the OR gate 1610. The OR gate 1610 operates the OR gate 15 to disable the AND gate 1602.

The +C3 signal also develops the —D4B mark-done signal to shift the sequence counter 127 to the flip-flop 14S2. A series of no-step signals is thereupon developed for shifting the sequence counter 127 to provide for the —S6 clear pulse. The +S2 signals operate a gate 1414 to, in turn, operate the multivibrator 14Q7 to provide the first shift pulse. The +S3 signal operates the gate 1409 to, in turn, trigger the multivibrator 14Q7 to provide for the second pulse, the +S4 signal sets the stop flip-flop 14Q15 and operates the gate 1468 to provide for the next pulse and the +S5 signal operates the gate 1468 again to provide for the last shift pulse. The +S5 signal also operates the AND gate 1432 to enable the AND gate 1407 so that the last shift pulse —P11 can be developed. This pulse operates the AND gate 1470 to develop the clear signal —S6.

BACK SPACE UPPER MARK (COMMAND C17)

When the key 2C17 is depressed, the sequence of operations is provided which is exactly the same as that for the command C16 except that the mark in the lower display store is back spaced instead of in the upper display store. To provide for this function, the +K36 signal is developed in the control logic 118 instead of the +K37 signal. The —C17 pulse from the keyboard 51 operates the flip-flop 8I2 as well as the flip-flop 8I5 to provide for this operation. In the control logic 118 in FIGURE 10, when the AND gate 1034 is operated, it now provides for the successive operation of the gates 1032, 1035 and 1016 to provide for the +K36 upper mark signal. The +K36 signal enables the operation of the mark counter 119. The rest of the sequence of operations is exactly the same as that described above for the command C16.

CR LOWER MARK (COMMAND C18)

When the command key 2C18 of the keyboard 51 is depressed, it functions to move the mark in the lower display store to the beginning of the next line. The symbol CR indicates carriage return. The —C18 signal from the keyboard provides for the operation of the flip-flops 8I5 and 8I6. In the control logic 118, the gates 934 and 935 are operated to provide for the K13 signals. The K13 signal sets the flip-flop 14S1 in the sequence counter 127 and the +S1 signal is provided to enable a gate 942. The gate 942 is part of a composite gate together with the gate 941 which develops the —K17 "CR" signal. With the +K13 signal present and the +I5 and +I6 signals provided from the control register, the composite AND gate is operated. The —K17 signal is provided to an OR gate 1533 in the mark control logic 116 to provide enabling potential to the AND gate 1535. The —P9 shift pulses are accordingly provided. As described when the +C3 signal is also provided to the AND gate 1535, it disables the AND gate 1536 and the —M11 signal also disables the mark recording channel to the head 78 in FIGURE 16.

In FIGURE 10 of the control logic 118, the +S1 signal successively operates the gates 1034, 1032, 1036 and 1038 to develop the +K37 lower mark signal. This signal enables the operation of the mark counter 119 in FIGURE 15. During the +C2 signal, the mark sensed in the lower store is erased. The +C3 signal, as indicated above, operates the AND gate 1535 to disable the shift pulses —P9. The mark recording channel is disabled at this time so that a mark is not recorded in the track 88. The —K17 signal operates successively the gates 1634, 1633, 1613 and 1615 to disable the AND gate 1632. Accordingly, at this time, the old mark has been erased but the new mark has not yet been written.

The control logic 116 remains in this condition until the next LP line pulse is received at the AND gate 1512. When the LP pulse is received, the AND gate 1512 operates to in turn successively operate the gates 1510 and 1511. The gate 1513 forms part of a composite gate with the gate 4512, but at this time, a positive signal is applied thereto, as the —K16 signal is only applied for the back space commands C16 and C17. The —M9 signal from the AND gate 1511 triggers the multivibrator 15Q1 to disable the AND gate 1535 and thereby provide for the —P9 shift pulses and also once again enable the mark recording channel at the AND gate 1602. The —M9 signal also disables the AND gate 1634 to enable the mark recording channel. The mark counter 119 steps now again from the flip-flop 15C1 which is set by the —M9 signal to the flip-flop 15C2 and then to the flip-flop 15C3. The +C3 signal now operates the gate 1602 to record the mark and it also develops the —D4B mark-done pulse. This pulse or signal is not developed the first time that the flip-flop 15C3 is operated because the —M11 signal disables the AND gate 1550.

The —D4B pulse in the sequence control logic 125 triggers the multivibrator 14Q7 to step the sequence counter 127 to the flip-flop 14S2. Thereafter, no step pulses are generated under control of the gates 1414, 1469, 1468 and 1460 to step the sequence counter 127 along to operate the gate 1470 and provide for the —S6 clear pulse. When the gate 1460 is operated, it sets the flip-flop 14Q15 to operate the gate 1430 and enable the AND gate 1432. Thereafter, when the flip-flop 14S5 is set, it operates the AND gate 1432 to maintain the AND gate 1407 enabled so that the next time the multivibrator 14Q7 is triggered, it develops the —P11 shift pulse to operate the AND gate 1470.

In this manner, the mark has been advanced to the beginning of the next line from any position in the previous line responsive to the depression of the command key 2C18. If the mark is in the last of the three message lines of the lower display store when the key 2C18 is depressed, it is reset to the beginning of the first line of the lower display store. The +UOP upper origin pulse precedes the next LP pulse when the mark is in the last line so that the AND gate 1506 is operated to set the flip-flop 15Q5 before the AND gate 1512 operates. When the flip-flop 15Q5 operates, it disables the AND gate 1512 and enables an AND gate 1509. Thereafter, when the +LOP, lower origin pulse, is received, it successively operates the gates 1509, 1510 and 1511 to trigger the multivibrator 15Q1 and reset the mark counter 119 to the flip-flop 15C1. The sequence of operations thereafter is the same as that described above and the mark is recorded by the +C3 signal in the reset position of the lower mark track 88. The sequence counter 127 is stepped along in a manner described above to provide for the —S6 clear pulse to return the data composer apparatus 50 to its normal display condition.

CR UPPER MARK (COMMAND C19)

When the command key 2C19 is depressed, it initiates a sequence of operations which is identical to that described above for the command key 2C18 except that it is the mark in the upper store which is advanced to the beginning of the next line instead of the mark in the lower store. In FIGURE 10, in the control logic 118 instead of developing the +K37 signal, the +K36 signal is developed for enabling the mark counter 119. The +K36 signal is developed because the −C19 signal from the keyboard 51 sets the flip-flop 8I2 as well as the flip-flops 8I5 and 8I6. The +I2 signal, accordingly, provides for the operation of the AND gate 1035 instead of the AND gate 1036 so that the +K36 upper mark signal is developed. The rest of the sequence of operations is identical to that for the command C18.

If the mark is in the last line of the upper display when the key 2C19 is depressed, the sequence of operations is identical except that the lower origin pulse +LOP is next received instead of the LP pulse. The lower origin pulse operates the AND gate 1505 to set the flip-flop 15Q5. Thereafter, when the +UOP pulse is received, the AND gate 1508 is operated to successively operate the gates 1510 and 1511 to trigger the multivibrator 15Q1 and reset the flip-flop 15C1. The new mark is then written in the reset position of the upper store. In this manner, if the mark is in the last line when the key 2C19 is depressed, it is reset to the beginning of the first line.

ERASE LOWER DISPLAY (COMMAND C20)

When the button 2C20 of the keyboard 51 is depressed, the lower display recorded in the tracks 84 and 85 is erased and the mark is reset in the lower store of the mark display track 88. The −C20 signal sets the flip-flop 8I8 in the control register 132. As illustrated in Table B above, during the sub-operation, when the +S1 signal is provided, the lower display is erased and during the +S3 signal, the mark is reset.

The +I8 signal in the control logic 118 permits the AND gate 934 to operate and develop the −K13 signal. The −K13 signal successively operates the gates 1447 and 1401 to set the flip-flop 14S1. When the flip-flop 14S1 operates, the +S1 signal enables an AND gate 1009 in the control logic 118. In FIGURE 9 of the control logic 118, the AND gate 943 is operated by the −K13 signal and the +I8 signal. The AND gate 943, in turn, operates the OR gate 945 to develop the +K62 erase signal. In FIGURE 10, the +K62 signal is provided to the AND gate 1009 enabled by the +S1 signal. When the +LOP lower origin pulse signal is provided from the generator 123 in FIGURE 24, the AND gate 1009 is operated to set the erase flip-flop 10Q4.

The erase flip-flop 10Q4 operates the OR gate 1004 to develop the +K41 gate signal which opens the eight gates 1801 through 1808 at the output of the read register 102. The +Q4 signal in FIGURE 18 also enables the AND gate 1814. The succeeding +Y clock pulses from the generator 122 in FIGURE 25 are provided from the AND gate 1815 and designated −P15 to reset the two flip-flops 18RF and 18R3. A reset pulse is provided during each bit. With the write gates 1801 through 1808 enabled by the +K41 signal, the succeeding +X and +Z clock pulses to these gates function to develop writing dipulses of a polarity to indicate a zero or an erase condition on the magnetic drum 64. The AND gates 1801 through 1808, as described above, are coupled by the switch 100 in FIGURE 29 to the heads 74 and 75 at the display tracks 84 and 85. The switch 100 is set to couple the writing drivers 2903 through 2906 of the switch 100 to the tracks 84 and 85 instead of the message tracks 86 and 87 because the +K38 signal is not present at this time.

The erasing sequence continues in this manner until the flip-flop 10Q4 is reset. When the +UOP pulse is received, it operates the AND gate 1050 to reset the erase flip-flop 10Q4 and to develop the −D3 erase-done signal at the output of the serially coupled gates 1011 and 1010. The −D3 signal is provided to trigger the multivibrator 14Q7 and shift the sequence counter 127 to the flip-flop 14S2. The +S2 signal develops a no-step signal for advancing the sequence to the flip-flop 14S3. The no-step signal is developed at the AND gate 1414 which successively operates the gates 1416, 1417 and 1419 to trigger the multivibrator 14Q7. When the flip-flop 14S3 is developed, it functions as indicated above, to reset the mark in the lower store of the mark display track 88 in FIGURE 16. The +S3 signal operates the AND gate 1012 in the central portion of FIGURE 10 to, in turn, operate the OR gate 1013 and develop the +K14 signal which permits writing the mark. The +K14 signal operates the AND gate 1042 to develop the +K37 lower mark signal, and the +K37 signal enables the mark counter 119.

When the +UOP pulse arrives it operates the AND gate 1506 to set the flip-flop 1505. When the +LOP pulse now arrives it successively operates the gates 1509, 1510 and 1511 to set the flip-flop 15C1 and to trigger the multivibrator 1501. The succeeding two shift pulses −P9 shifts the counter to the stage 15C3 where the new mark is recorded.

The mark-done pulse −D4B thereupon steps the sequence counter 127 to the flip-flop 14S4. A no-step signal is developed at the OR gate 1460 which successively operates the gates 1468, 1467, 1417 and 1419 to trigger the multivibrator 14Q7. The flip-flop 14Q15 is also operated at this time responsive to the −K13 signal. When the +S5 signal is provided the AND gate 1432 is operated to provide for a −P11 shift pulse. The shift pulse is developed as a no-step signal from the gates 1460, 1468, etc. The shift pulse, accordingly, operates the AND gate 1470 to provide for the −S6 clear pulse.

ERASE UPPER DISPLAY (COMMAND C21)

The sequence of operations for erasing the upper store of the display tracks 84 and 85 is exactly the same as that described above except that the +K36 signal is developed when the key 2C21 is depressed instead of the +K37 signal to indicate that it is the upper store and not the lower store which is to be erased and reset. The −C21 signal from the keyboard 51 operates the flip-flops 8I2 and 8I8, with the flip-flop 8I2 indicating that it is the upper store which is to be erased. The +K13 signal now operates the AND gate 947 instead of the AND gate 943 to, in turn, operate the gate 946 and develop the +K63 erase signal.

In FIGURE 10, the −K63 signal is provided to an OR gate 1001 which enables an AND gate 1002. The −K13 signal also operates the flip-flop 14S1 in a manner described above and when the +UOP, upper origin pulse, arrives at the AND gate 1002, it is operated to set the erase flip-flop 10Q4. The erase flip-flop 10Q4 remains operated to erase the upper store of the display tracks 84 and 85 until the lower origin pulse +LOP is received at the AND gate 1007 which thereupon resets the erase flip-flop 10Q4. The −D3 erase-done signal steps the sequence counter 127 to the flip-flop 14S2.

A no-step signal −L15 is generated and, when the flip-flop 14S3 sets the mark in the upper store of the track 88 is reset, again the +K36 upper mark signal is developed instead of the +K37 lower mark to indicate that the reset function is in the upper store. The sequence completes in exactly the same manner as described above for the command C20 to reset the mark in the upper store. When the counter 127 provides for the −S6 clear pulse the apparatus returns to its normal display condition.

Although this application has been disclosed and illustrated with reference to particular applications, the principles involved are susceptible of numerous other applications which will be apparent to persons skilled in the art. For example, three display tracks may be provided instead of two so that the shifting is in three parallel paths. Further additional message stores may be provided to provide additional prerecorded facilities. It is, accordingly, apparent that the invention is susceptible to other applications. The invention is, therefore, to be limited only as indicated by the scope of the appended claims.

We claim:

1. In combination for recording messages on a display member having properties of providing a visual display of such messages, means for receiving sequences of signals in a coded form to represent a message, means responsive to the signals in the sequence for converting such signals into the information represented by such signals, means operatively coupled to the converting means for displaying the information in the message on the display member, means operatively coupled to the display member for providing a visual marking as to the particular position on the display member wherein information is being received at each instant, and means operatively coupled to the display member for providing an advance of the visual marking to the next position on the display member upon the display of the received information at the particular position on the display member.

2. In combination for recording messages on a display member having properties of providing a visual display of such messages, a plurality of means each representing individual information and actuatable in a particular pattern to represent a first message, means operatively coupled to the first actuatable means for converting the actuation of such actuatable means into pluralities of signals representing such actuations in coded form to obtain a transmission of such pluralities of signals, means operatively coupled to the last mentioned means and to the display member for converting the sequence of signals into the individual information represented by the actuation of the actuatable means to obtain a display of the information as a first message on the display member, means operatively coupled to the display member for providing a visual marking as to the position to receive information in accordance with the actuation of the actuatable means, means operatively coupled to the display member for providing an advance of the visual marking on the display member to the next position in accordance with each actuation of the actuatable means, and means operatively coupled to the display member for providing a backspacing of the visual marking on the display member to any desired position for an insertion of individual information at that position in accordance with the actuation of the actuatable means.

3. In combination for recording messages on a display member having properties of providing a visual display of such messages, a plurality of means each representing individual information and actuatable in a particular pattern to represent a first message, means operatively coupled to the first actuatable means for converting the actuation of such actuatable means into pluralities of signals representing such actuation in coded form to obtain a transmission of such pluralities of signals, means operatively coupled to the actuatable means for displaying as a first message on a first portion of the display member the information represented by the actuation of the actuatable means, means for receiving second pluralities of signals in the coded form to represent a second message, means responsive to the second pluralities of signals for converting such signals into the information represented by such signals, means operatively coupled to the last mentioned means for displaying the information in the second message on a second portion of the display member, means operatively coupled to the display member for advancing the operative position on the display member to a particular position in the first and second messages, means operatively coupled to the display member for indicating the particular position on the display member, and means operatively coupled to the display member for obtaining the transfer to the first portion of the display member of the information recorded at the particular position in the second portion of the display member to alter the message displayed in the first portion of the display member.

4. In combination for recording messages on a display member having properties of providing a visual display of such messages, a plurality of means each representing individual information and actuatable in a particular sequence to represent successive words in a first message, means operatively coupled to the actuatable means for providing for a conversion of the successive words in the first message to first sequences of signals in a first code for transmission of such signals to a position removed from the display member, means operatively coupled to the actuatable means for providing for a display of the successive words in the first message on a first portion of the display member and for providing such display in a plurality of lines on the first portion of the display member, means operatively coupled to the display member and the actuatable means for providing a visual indication as to the position on the display member wherein information is to be recorded in accordance with the actuation of the actuatable means, and means operatively coupled to the display member and the last mentioned means for providing an advance of the visual indication to each successive position on the display member in accordance with the actuation of the actuatable means.

5. In combination for recording messages on a display member having properties of providing a visual display of such messages, a plurality of means each representing individual information and actuatable in a particular pattern to represent a first message, means operatively coupled to the actuatable means for providing for a conversion of the information in the first message to a first plurality of signals in coded form, means operatively coupled to the actuatable means for providing for a display of the first message in a first portion of the display member of the first message, means for receiving second signals in the coded form to represent a second message, means responsive to the second signals for converting such signals into the second particular information, means responsive to the second message for displaying such message on a second portion of the display member, and means operatively coupled to the display member for transferring particular portions of the second message in the second portion of the display member to particular positions in the first portion of the display member to alter the first message being displayed in the first portion of the display member and being transmitted.

6. In combination for recording messages on a display member having properties of providing a visual display of such messages, means for receiving sequences of signals in a coded form to represent a message, means responsive to the signals in the sequences for converting such signals into the information represented by such signals, means operatively coupled to the converting means for displaying the information in the message on the display member, marker means operatively coupled to the display member for providing a visual marking as to the particular position receiving information for display at each instant, means operatively coupled to the display member and to the marker means for advancing the position of the visual marking to the next position after the recording of information in the particular position, means operatively coupled to the display member and to the marker means for shifting the visual marking to any desired position to obtain a change in the information at the desired position, and means operatively coupled to the display member for changing the information being visually displayed at the desired position.

7. In combination for recording messages on a display member having properties of providing a visual display of such messages, means for receiving sequences of signals in a coded form to represent a message, means responsive to the signals in the sequences for converting such signals into the information represented by such signals, means operatively coupled to the converting means for displaying the information in the message on the display member, memory means for storing information in coded form to represent a fixed message, control means operatively coupled to the memory means for obtaining a transfer of the fixed message from the memory means for conversion into a form for display by the display member, and means operatively coupled to the control means and responsive to the information released from the memory means for providing a display of the fixed message by the display member in substitution for the received information displayed by the display member.

8. In combination for recording messages on a display member having properties of providing a visual display of such messages, means for receiving sequences of signals in a coded form to represent a message, means responsive to the signals in the sequence for converting such signals into the information represented by such signals, means operatively coupled to the converting means for displaying the information in the message on the display member, marker means operatively coupled to the display member for visually indicating the particular position in which information is to be received for display on the member, means operatively coupled to the display member and to the marker means for obtaining an advance of the particular position to the next position upon the reception of the information for the particular position and upon the display of the information for the particular position in the display member, storage means for providing a storage of fixed information, control means operatively coupled to the storage means for obtaining a release of a particular portion of the information stored in the storage means, and means operatively coupled to the display member and responsive to the particular portion of the information released from the storage means for obtaining a display of such information at the position visually indicated by the marker means and at the positions following such position in substitution for the display previously provided for such positions.

9. In combination for recording messages on a display member having properties of providing a visual display of such messages, a plurality of means each representing individual information and actuatable in a particular sequence to represent successive words in a first message, means operatively coupled to the actuatable means for providing for a conversion of the successive words in the first message to sequences of signals in a first code for transmission of such signals to a position removed from the display member, means operatively coupled to the actuatable means for providing for a display of the successive words in the first message on the display member, marker means operatively coupled to the display member for providing a visual marking as to the particular position at which information is being recorded in accordance with the actuation of the actuatable means, means operatively coupled to the display member and to the marker means for obtaining an advance of the visual marking from the particular position to the next position upon the actuation of the actuatable means, storage means for providing a storage of a fixed message in the coded form, and means operatively coupled to the display member and to the storage means for obtaining a display of the fixed message at the position indicated by the visual marking and at the subsequent positions in replacement of any message previously recorded in such positions.

10. In combination for recording messages on a display member having properties of providing a visual display of such messages, a plurality of means each representing individual information and actuatable in a particular sequence to represent successive words in a first message, means operatively coupled to the actuatable means for providing for a conversion of the successive words in the first message to first sequences of signals in a first code for transmission of such signals to a position removed from the display member, means operatively coupled to the actuatable means for providing for a display of the successive words in the first message on the display member, storage means for providing a storage of a fixed message in the first code, control means operatively coupled to the storage means for obtaining a transfer of the fixed message from the storage means, and means operatively coupled to the control means and the display member for obtaining an introduction of the fixed message from the storage means to the display member to provide a replacement for the information displayed by the display member.

11. In combination for recording messages on a display member having properties of providing a visual display of such messages, first means operatively coupled to the display member for providing a sequential recirculation of the information from the display member, second means operatively coupled to the display member for providing an introduction to the display member of the recirculated information to obtain a recording of such information by the display member for display, third means operatively coupled to the display member for providing a visual marking of the position at which the information is being recorded on the display member, and fourth means operatively coupled to the display member and the third means for obtaining an advance of the visual marking from each particular position to the next position upon the recording of information in each particular position.

12. The combination set forth in claim 11, in which fifth means are provided for producing information different from that being recirculated by the first means and in which sixth means are operatively coupled to the fifth means and the display member for obtaining a recording of the information from the fifth means at the position of the visual marking and in subsequent positions in place of the information being recirculated by the first means for such positions.

13. In combination for recording messages on a display member having properties of providing a visual display of such messages, first means operatively coupled to the display member for providing a sequential recirculation of the information from the display member, second means operatively coupled to the display member for providing an introduction to the display member of the recirculated information to obtain a recording of such information by the display member for display, a plurality of means each actuatable to represent individual information, means operatively coupled to the actuable means in the plurality for converting the actuation of such actuatable means to information in a form for display by the display member, and means operatively coupled to the last mentioned means for obtaining the introduction of the information from the last mentioned means to the display member to replace particular information being recirculated by the first means.

14. In combination for recording messages on a display member having properties of providing a visual display of such messages, first means operatively coupled to the display member for providing a sequential recirculation in coded form of the message stored in the display member, second means operatively coupled to the display member for providing an introduction to the display member of the recirculated message to obtain a recording of such information by the display member for display, storage means for providing a record of a fixed message in the coded form, third means operatively coupled to the storage means and to the second means for obtaining an introduction to the display member of any desired portion of the fixed message in the storage means, fourth means for receiving a second message in the coded form, fifth means operatively coupled to the receiving means and to the second means for obtaining an introduction to the second means of any desired portion of the second message, and control means operatively coupled to the third and fifth means for controlling the introduction of particular portions of the fixed message and the second message to the second means to obtain changes in the message recorded in the display member in accordance with the information represented by the particular portions of the fixed message and the second message.

15. In combination for recording messages on a display member having properties of providing a visual display of such messages, storage means for providing in a coded form a storage of a first plurality of words representing a fixed message, first means operatively coupled to the storage means for presenting the words in the storage means in sequence in the coded form at a first particular frequency, second means operatively coupled to the display member for providing a sequential recirculation at a second frequency different from the first frequency and in the coded form of the message displayed by the display member, third means operatively coupled to the display member and the second means for providing an introduction to the display member at the second frequency and in the coded form of the recirculated information to obtain a recording of such information by the display member for display, a plurality of means each actuatable to represent individual information, fourth means operatively coupled to the actuatable means in the plurality for presenting the information represented by the actuation of the actuatable means and for presenting such information in the coded form and at a third frequency different from the first and second frequencies, and control means operatively coupled to the display member and the first, third and fourth means for obtaining the controlled introduction of information from the first, third and fourth means to the display member at the second frequency to vary the message displayed by the display member.

16. In combination for recording messages on a display member having properties of providing a visual display of such messages, first means operatively coupled to the display member for providing a sequential recirculation in a coded form and at a first frequency of the information stored in the display member and representing a first message, second means operatively coupled to the first means and to the display member for obtaining a recording on the display member at the first frequency of the information recirculated by the first means, storage means for providing a storage in the coded form of a fixed message, third means operatively coupled to the storage means for providing a sequential recirculation in the coded form and at a second frequency different from the first frequency of the fixed message, fourth means for receiving a second message in the coded form and at a third frequency different from the first and second frequencies, and control means operatively coupled to the display member and to the second, third and fourth means for obtaining a transfer to the display member at the first frequency of particular portions of the fixed message and the second message in replacement for portions of the message being recirculated by the first means to vary the message being recorded by the display member.

17. In combination for recording messages on a display member having properties of providing a visual display of such messages, first means operatively coupled to the display member for providing a sequential recirculation in a coded form and at a first frequency of the information stored in the display member and representing a first message, second means operatively coupled to the first means and to the display member for obtaining a recording on the display member at the first frequency of the information recirculated by the first means, marker means operatively coupled to the display member for providing a visual marking as to the particular position at which information is being recorded on the display member at each instant, third means operatively coupled to the marker means and to the display member for obtaining an advance of the visual marking from each particular position to the next position upon the recording of information on the display member in the particular position, storage means for providing a storage in the coded form of a fixed message, fourth means operatively coupled to the storage means for providing a sequential recirculation in the coded form and at a second frequency different from the first frequency of the fixed message, fifth means for receiving a second message in the coded form and at a third frequency different from the first and second frequencies, and control means operatively coupled to the second, third, fourth and fifth means and to the display member for obtaining a transfer to the display member at the particular frequency of particular portions of the fixed message and the second message in replacement of the information recorded in the first message on the display member at the positions of the visual marking.

18. In combination for recording messages on a display member having properties or providing a visual display of such messages, a character generator constructed to provide a beam and to provide a deflection of the beam and to provide a visual record of individual ones of a plurality of characters in accordance with the deflection of the beam, first means for receiving sequences of signals representing individual ones of the plurality of characters in a particular pattern to constitute a message, second means operatively coupled to the receiving means for decoding the sequences of signals to identify the characters represented by the sequences of signals, third means operatively coupled to the second means and to the character generator for obtaining a deflection of the beam in the character generator in accordance with the identified character to provide a visual record of the identified character, and means operatively coupled to the character generator and the display member for displaying in sequence the successive characters visually displayed by the character generator to provide a visual display of the message.

19. In combination for recording messages on a display member having properties of providing a visual display of such messages, a character generator constructed to provide a beam and to provide a deflection of the beam and to provide a visual record of individual ones of a plurality of characters in accordance with the deflection of the beam, a plurality of means each actuatable to represent a different one of the characters in the plurality, means operatively coupled to the actuatable means in the plurality and to the character generator for obtaining a deflection of the beam in the character generator in accordance with the actuation of the actuatable means in the plurality, and means operatively coupled to the character generator and the display member for displaying in sequence the successive characters visually displayed by the character generator to provide a visual display of the message.

20. In combination for recording messages on a display member having properties providing a visual display of such messages, a character generator constructed to provide a beam and to provide a deflection of the beam and to provide a visual record of individual ones of a plurality of characters in accordance with the deflection of the beam, means operatively coupled to the display member for sequentially reading the information at successive positions in the message on the display member, means operatively coupled to the last mentioned means for converting the information read by the last mentioned means into signals having characteristics representing such information, means operatively coupled to the last mentioned means and to the character generator for obtaining a deflection of the beam in the character generator in accordance with the characteristics of the signals from the last mentioned means, and means operatively coupled to the character generator and to the display member for obtaining a recording on the display member of the successive characters visually displayed by the character generator and for providing the display of the successive characters in successive positions on the display member to provide a visual display of the message.

21. In a transmission system, terminal apparatus including means for displaying all incoming and all outgoing messages, said displaying means having a cathode ray tube including a screen upon which the incoming and outgoing messages are displayed, means for receiving incoming messages and for controlling said displaying means to introduce the incoming messages to a first predetermined portion of the screen of the cathode ray tube for display, and means for composing outgoing messages to be transmitted and for controlling said displaying means to introduce the outgoing message to be transmitted to a second predetermined portion of the screen of the cathode ray tube for display whereby incoming and outgoing messages are simultaneously displayed.

22. In a transmission system in accordance with claim 21, wherein said terminal apparatus includes, in addition, means for copying any part of a message displayed in the first predetermined portion of the screen to the second predetermined portion of the screen.

23. In a transmission system for sequential coded signals representing successive characters, terminal apparatus including means for displaying to an operator all incoming messages to said terminal apparatus and all outgoing messages from said terminal apparatus, receiving means for the sequential coded signals representing successive characters including a register having a capacity for registering the coded signals for one character, storage means coupled to said register for storing the coded signals for the successive characters one after another as they are registered in the register, means coupled to said register for recognizing the termination of the coded signals for each successive character and for transferring the coded signals registered in said register to said storage means, means coupled to said storage means and effective during the time coded signals are not being received by said receiving means for sequentially decoding the coded signals stored in said storage means, and means coupled to said decoding means for introducing the decoded signals from said decoding means to said displaying means for controlling a portion of the display thereat in accordance with the coded signals stored in said storage means.

24. In a transmission system for sequential coded signals representing successive characters, terminal apparatus including means for displaying to an operator all incoming messages to said terminal apparatus and all outgoing messages from said terminal apparatus, receiving means for the sequential coded signals representing successive characters including a register having a capacity for registering the coded signals for one character, storage means coupled to said register for storing the coded signals for the successive characters one after another as they are registered in the register, means coupled to said register for recognizing the termination of the coded signals for each successive character and for transferring the coded signals registered in said register to said storage means, means coupled to said storage means and effective during the time coded signals are not being received by said receiving means for sequentially decoding the coded signals stored in said storage means, means coupled to said decoding means for introducing the decoded signals from said decoding means to said displaying means for controlling a portion of the display thereat in accordance with the coded signals stored in said storage means, switching means having a first and a second operative condition, and means coupled to said switching means and responsive to said switching means in said first condition for enabling the operation of said displaying means between the received successive characters represented by said coded signals and responsive to said switching means in said second condition for disabling the operation of said displaying means between the received successive characters represented by said coded signals.

25. In a transmission system for sequential coded signals representing successive characters, terminal apparatus including means for displaying to an operator all incoming messages to said terminal apparatus, receiving means for the sequential coded signals representing successive characters including a register having a capacity for registering the coded signals for one character, first storage means coupled to said register for storing the coded signals for the successive character one after another as they are registered in the register, means coupled to said register for recognizing the termination of the coded signals for each successive character and for transferring the coded signals registered in said register to said storage means, means including second storage means associated with said first storage means for keeping track of the address in said first storage means for storing the coded signals for the next successive character, means coupled to said first storage means and effective during the time coded signals are not being received by said receiving means for sequentially decoding the coded signals stored in said first storage means, and means coupled to said decoding means for introducing the decoded signals from said decoding means to said displaying means for controlling a portion of the display thereat in accordance with the coded signals stored in said storage means.

26. In a transmission system for sequential coded signals representing successive characters, terminal apparatus including means for displaying to an operator all incoming messages to said terminal apparatus, receiving means for the sequential coded signals representing successive characters including a register having a capacity for registering the coded signals for one character, first storage means coupled to said register for storing the coded signals for the successive character one after another as they are registered in the register, means coupled to said register for recognizing the termination of the coded signals for each successive character and for transferring the coded signals registered in said register to said storage means, means including second storage means associated with said first storage means for keeping track of the address in said first storage means for storing the coded signals for the next successive character, means coupled to said first storage means and effective during the time coded signals are not being received by said receiving means for sequentially decoding the coded signals stored in said first storage means, means coupled to said decoding means for introducing the decoded signals from said decoding means to said displaying means for controlling a portion of the display thereat in accordance with the coded signals stored in said storage means, and means coupled to said second storage means for periodically introducing a predetermined signal to said displaying means for marking one of the character positions of said displaying means in accordance with the address stored in said second storage means.

27. In a transmission system in accordance with claim 26, wherein, said first storage means and said second storage means include different portions of a magnetic drum.

28. In a Teletype transmission system, Teletype terminal apparatus for receiving Teletype coded signals representing successive characters and functions, said Teletype terminal apparatus including binary shift register means for registering the received Teletype coded signals for each of the successive characters received at said terminal apparatus, said shift register means including a plurality of stages for registering the coded signals for each of the successive characters, and one stage for indicating the shift function of the character registered in said plurality of stages; decoding means coupled to said register means for recognizing coded signals received at said terminal apparatus which represents a change in shift function, and means responsive to said decoding means for setting said one stage of said register means to indicate the new shift function.

29. In a Teletype transmission system, Teletype terminal apparatus for receiving Teletype coded signals representing successive characters and functions, said Teletype terminal apparatus including binary shift register means for registering the received Teletype coded signals for each of the successive characters received at said terminal apparatus, said shift register means including a plurality of stages for registering the coded signals for each of the successive characters, and one stage for indicating the shift function of the character registered in said plurality of stages; decoding means coupled to said register means for recognizing coded signals received at said terminal apparatus which represents a change in shift function, means responsive to said decoding means for setting said one stage of said register means to indicate the new shift function, storage means coupled to said register means and effective after each character is registered therein for storing the coded signals registered by said register means, means effective during the time coded signals are not being received at said terminal apparatus for converting the coded signals stored in said storage means to video signals representing the characters stored in said storage means, and means coupled to said converting means and controlled by said video signals therefrom for displaying the characters represented by said video signals.

30. In a Teletype transmission system, Teletype terminal apparatus for receiving Teletype coded signals representing successive characters and functions, said Teletype terminal apparatus including binary shift register means for registering the received Teletype coded signals for each of the successive characters received at said terminal apparatus, said shift register means including a plurality of stages for registering the coded signals for each of the successive characters, and one stage for indicating the shift function of the character registered in said plurality of stages; decoding means coupled to said register means for recognizing coded signals received at said terminal apparatus which represents a change in shift function, means responsive to said decoding means for setting said one stage of said register means to indicate the new shift function, storage means coupled to said register means and effective after each character is registered therein for storing the coded signals registered by said register means, means effective during the time coded signals are not being received at said terminal apparatus for converting the coded signals stored in said storage means to video signals representing the characters stored in said storage means, means coupled to said converting means and controlled by said video signals therefrom for displaying the characters represented by said video signals, switching means having a first and a second operative condition, and means coupled to said switching means and responsive to said switching means in said first condition for enabling the operation of said display means between the received successive characters represented by said coded signals and responsive to said switching means in said second condition for disabling the operation of said display means between the received successive characters represented by said coded signals.

31. In a Teletype transmission system, Teletype terminal apparatus for receiving Teletype coded signals representing successive characters and functions, said Teletype terminal apparatus including binary shift register means for registering the received Teletype coded signals for each of the successive characters received at said terminal apparatus, said shift register means including a plurality of stages for registering the coded signals for each of the successive characters, and one stage for indicating the shift function of the character registered in said plurality of stages; decoding means coupled to said register means for recognizing coded signals received at said terminal apparatus which represents a change in shift function, means responsive to said decoding means for setting said one stage of said register means to indicate the new shift function, said terminal apparatus also including means coupled to said register means for sequentially transmitting the coded signals registered in said plurality of stages of said register means, storage means for storing coded signals representing successive characters and their shift functions, and means coupled to said storage means for successively reading the stored coded signals for the successive characters into said register means and for operating said transmitting means after each character is registered.

32. In a Teletype transmission system, Teletype terminal apparatus for receiving Teletype coded signals representing successive characters and functions, said Teletype terminal apparatus including binary shift register means for registering the received Teletype coded signals for each of the successive characters received at said terminal apparatus, said shift register means including a plurality of stages for registering the coded signals for each of the successive characters, and one stage for indicating the shift function of the character registered in said plurality of stages; decoding means coupled to said register means for recognizing coded signals received at said terminal apparatus which represents a change in shift function, means responsive to said decoding means for setting said one stage of said register means to indicate the new shift function, said terminal apparatus also including means coupled to said register means for sequentially transmitting the coded signals registered in said plurality of stages of said register means, storage means for storing coded signals representing successive characters and their shift functions, means coupled to said storage means for successively reading the stored coded signals for the successive characters into said register means and for operating said transmitting means after each character is registered, means coupled to said register means and to said storage means and responsive after each received character is registered in said register means for transferring the received and registered character to said storage means, means effective during the time that coded signals are neither being received or transmitted for converting the coded signals stored in said storage means to video signals representing the characters stored in said storage means, and means coupled to said converting means and controlled by said video signals therefrom for displaying the characters represented by said video signals whereby the incoming and outgoing signals are displayed.

33. In a Teletype transmission system, Teletype terminal apparatus for receiving Teletype coded signals representing successive characters and functions, said Teletype terminal apparatus including binary shift register means for registering the received Teletype coded signals for each of the successive characters received at said terminal apparatus, said shift register means including a plurality of stages for registering the coded signals for each of the successive characters, and one stage for indicating the shift function of the character registered in said plurality of stages; decoding means coupled to said register means for recognizing coded signals received at said terminal apparatus which represents a change in shift function, means responsive to said decoding means for setting said one stage of said register means to indicate the new shift function, first storage means coupled to said register means and effective after each character is registered therein for storing the coded signals registered by said register means, means effective during the time coded signals are not being received at said terminal apparatus for converting the coded signals stored in said first storage means to video signals representing the characters stored in said first storage means, means coupled to said converting means and controlled by said video signals therefrom for displaying the characters represented by said video signals, means including second storage means associated with said first storage means for keeping track of the address in said first storage means for storing the coded signals for the next successive character, and means coupled to said second storage means for generating video signals representing an address mark and for introducing said signals to said displaying means for providing a visual indication of the address mark.

34. In a Teletype transmission system, Teletype terminal apparatus for receiving Teletype coded signals representing successive characters and functions, said Teletype terminal apparatus including binary shift register means for registering the received Teletype coded signals for each of the successive characters received at said terminal apparatus, said shift register means including a plurality of stages for registering the coded signals for each of the successive characters, and one stage for indicating the shift function of the character registered in said plurality of stages; decoding means coupled to said register means for recognizing coded signals received at said terminal apparatus which represents a change in shift function, means responsive to said decoding means for setting said one stage of said register means to indicate the new shift function, said terminal apparatus also including means coupled to said register means for sequentially transmitting the coded signals registered in said plurality of stages of said register means, storage means for storing coded signals representing succvessive characters and their shift functions, means coupled to said storage means for successively reading the stored coded signals for the successive characters into said register means and for operating said transmitting means after each character is registered, and encoding means coupled to said one stage of said register means and to said plurality of stages of said register means and effective when the stored coded signals are being read into said register means for recognizing a change of shift status in said one stage and for setting said plurality of stages in accordance with the changed shift status.

35. In a Teletype transmission system, Teletype terminal apparatus for receiving Teletype coded signals representing successive characters and functions, said Teletype terminal apparatus including binary shift register means for registering the received Teletype coded signals for each of the successive characters received at said terminal apparatus, said shift register means including a plurality of stages for registering the coded signals for each of the successive characters, and one stage for indicating the shift function of the character registered in said plurality of stages; decoding means coupled to said register means for recognizing coded signals received at said terminal apparatus which represents a change in shift function, means responsive to said decoding means for setting said one stage of said register means to indicate the new shift function, said terminal apparatus also including means coupled to said register means for sequentially transmitting the coded signals registered in said plurality of stages of said register means, storage means for storing coded signals representing successive characters and their shift functions, means coupled to said storage means for successively reading the stored coded signals for the successive characters into said register means and for operating said transmitting means after each character is registered, means coupled to said register means and to said storage means and responsive after each received character is registered in said register means for transferring the received and registered character to said storage means, means effective during the time that coded signals are neither being received or transmitted for converting the coded signals stored in said storage means to video signals representing the characters stored in said storage means, means coupled to said converting means and controlled by said video signals therefrom for displaying the characters represented by said video signals whereby the incoming and outgoing signals are displayed, said displaying means including a cathode ray tube having a display screen, and means coupled to said cathode ray tube for controlling said cathode ray tube to concurrently display incoming messages at one predetermined portion of said screen and outgoing messages at a second predetermined portion of said screen.

36. In a transmission system, terminal apparatus including means for displaying all incoming and all outgoing messages, said displaying means having a cathode ray tube including a screen upon which the incoming and outgoing messages are displayed, means for receiving incoming messages and for controlling said displaying means to introduce the incoming messages to a first predetermined portion of the screen of the cathode ray tube for display, means for composing outgoing messages to be transmitted and for controlling said displaying means to introduce the outgoing message to be transmitted to a second predetermined portion of the screen of the cathode ray tube for display whereby incoming and outgoing messages are simultaneously displayed, means for copying any part of a message displayed in the first predetermined portion of the screen to the second predetermined portion of the screen, said composing means includes means for storing pre-recorded messages, and means coupled to said storing means for introducing the stored pre-recorded messages to the second predetermined portion of the screen of said cathode ray tube for display.

37. In a transmission system in accordance with claim 36, in addition, means coupled to said displaying means for transferring the message displayed in either said first or said second predetermined portions of said screen to said storing means.

38. Data composer apparatus including means for displaying all incoming and all outgoing messages, said displaying means having a cathode ray tube including a screen upon which the incoming and outgoing messages are displayed, means for receiving incoming messages and for controlling said displaying means to introduce the incoming messages to a first predetermined portion of the screen of the display, a keyboard for composing outgoing messages to be transmitted and for controlling said displaying means to introduce the outgoing message to be transmitted to a second predetermined portion of the screen of the cathode ray tube for display whereby incoming and outgoing messages are simultaneously displayed, storage means coupled to said displaying means and to said receiving means for storing all incoming and outgoing messages and for controlling said displaying means in accordance with the stored messages, and control means coupled to said keyboard and to said storage means and responsive to the operation of said keyboard for changing any part of the messages stored in said storage means.

39. Data composing apparatus including a keyboard for initiating control functions, a rotating magnetic drum having a plurality of tracks for storing a number of different messages, each consisting of a plurality of characters, a cathode ray tube for displaying messages being composed, circuit means coupled to said cathode ray tube for synchronizing the scanning cycle of said cathode ray tube with the rotation of said magnetic drum, first means coupled to some of said tracks for reading the message recorded in said some tracks and for generating video signals in accordance therewith for introduction to said cathode ray tube for display, circuit means coupled to said first means and to said cathode ray tube for introducing the generated video signals to said cathode ray tube, and second means controlled by said keyboard for recording in said some tracks whereby the displayed message is changed.

40. Data composing apparatus including a keyboard for initiating control functions, a rotating magnetic drum having a plurality of tracks for storing a number of different messages, each consisting of a plurality of characters, a cathode ray tube for displaying messages being composed, circuit means coupled to said cathode ray tube for synchronizing the scanning cycle of said cathode ray tube with the rotation of said magnetic drum, first means coupled to some of said tracks for reading the message recorded in said some tracks and for generating video signals in accordance therewith for introduction to said cathode ray tube for display, circuit means coupled to said first means and to said cathode ray tube for introducing the generated video signals to said cathode ray tube, second means controlled by said keyboard for recording in said some tracks whereby the displayed message is changed, and means responsive during the operation of said second means for inhibiting the operation of said first means whereby the display is interrupted during the time a displayed message is being changed.

41. Data composing apparatus including a keyboard for initiating control functions, a rotating magnetic drum having a plurality of tracks for storing a number of different messages, each consisting of a plurality of characters, a cathode ray tube for displaying messages being composed, circuit means coupled to said cathode ray tube for synchronizing the scanning cycle of said cathode ray tube with the rotation of said magnetic drum, first means coupled to some of said tracks for reading the message recorded in said some tracks and for generating video signals in accordance therewith for introduction to said cathode ray tube for display, circuit means coupled to said first means and to said cathode ray tube for introducing the generated video signals to said cathode ray tube, second means controlled by said keyboard for recording in said some tracks whereby the displayed message is changed, said cathode ray tube having a screen having a plurality of character positions for the plurality of characters of the displayed message, said magnetic drum also having additional tracks, and third means including said additional tracks for determining which character of the message is to be read by said first means from said some tracks and for selecting the character position of said screen of said cathode ray tube.

42. Data composing apparatus including a keyboard for initiating control functions, a rotating magnetic drum having a plurality of tracks for storing a number of different messages, each consisting of a plurality of characters, a cathode ray tube for displaying messages being composed, circuit means coupled to said cathode ray tube for synchronizing the scanning cycle of said cathode ray tube with the rotation of said magnetic drum, first means coupled to some of said tracks for reading the message recorded in said some tracks and for generating video signals in accordance therewith for introduction to said cathode ray tube for display, circuit means coupled to said first means and to said cathode ray tube for introducing the generated video signals to said cathode ray tube, second means controlled by said keyboard for recording in said some tracks whereby the displayed message is changed, said cathode ray tube having a screen having a plurality of character positions for the plurality of characters of the displayed message, said magnetic drum also having additional tracks, third means including said additional tracks for determining which character of the message is to be read by said first means from said some tracks and for selecting the character position of said screen of said cathode ray tube, and means responsive to each operation of said second means for adjusting said third means to advance its selection to the next character position of the screen of said cathode ray tube.

References Cited by the Examiner

UNITED STATES PATENTS

| | | | |
|---|---|---|---|
| 1,992,401 | 2/35 | Steenck | 178—42 X |
| 2,188,896 | 2/40 | Eitzen | 178—42 X |
| 2,220,885 | 11/40 | Burcky | 178—24 |
| 2,284,681 | 6/42 | Potts | 178—24 X |
| 2,405,168 | 8/46 | Schuler | 178—24 X |

ROBERT H. ROSE, *Primary Examiner.*

NEWTON LOVEWELL, *Examiner.*

Notice of Adverse Decision in Interference

In Interference No. 95,614 involving Patent No. 3,166,636, D. F. Rutland, B. F. Ambrosio and R. Turn, DATA COMPOSER, final judgment adverse to the patentees was rendered Dec. 19, 1968, as to claims 7 and 10.

[*Official Gazette August 5, 1969.*]